United States Patent
Scoullar et al.

(10) Patent No.: US 10,962,485 B2
(45) Date of Patent: Mar. 30, 2021

(54) SYSTEM AND METHOD FOR MATERIAL CHARACTERIZATION

(71) Applicant: SOUTHERN INNOVATION INTERNATIONAL PTY LTD, Carlton North (AU)

(72) Inventors: Paul Scoullar, Fitzroy North (AU); Christopher McLean, Kangaroo flat (AU); Shane Michael Tonissen, Kensington (AU); Syed Khusro Saleem, Fitzroy North (AU)

(73) Assignee: Southern Innovation International Pty Ltd, Carlton North (AU)

( * ) Notice: Subject to any disclaimer, the term of this patent is extended or adjusted under 35 U.S.C. 154(b) by 0 days.

(21) Appl. No.: 16/305,801

(22) PCT Filed: May 30, 2017

(86) PCT No.: PCT/AU2017/050512
§ 371 (c)(1),
(2) Date: Nov. 29, 2018

(87) PCT Pub. No.: WO2017/205912
PCT Pub. Date: Dec. 7, 2017

(65) Prior Publication Data
US 2019/0212272 A1     Jul. 11, 2019

(30) Foreign Application Priority Data
May 30, 2016 (AU) ................................ 2016902060

(51) Int. Cl.
*G01N 21/85* (2006.01)
*G01N 23/087* (2018.01)
(Continued)

(52) U.S. Cl.
CPC ............ *G01N 21/85* (2013.01); *E21B 49/005* (2013.01); *G01N 21/255* (2013.01); *G01N 21/93* (2013.01);
(Continued)

(58) Field of Classification Search
CPC ........... G01N 21/3577; G01N 21/3504; G01N 21/61; G01N 21/3563; G01N 21/4738;
(Continued)

(56) References Cited

U.S. PATENT DOCUMENTS

| 3,865,736 | A | * | 2/1975 | Fries | ....................... E21B 12/02 |
| | | | | | 508/539 |
| 4,388,530 | A | * | 6/1983 | Lubecki | ............... G01N 23/223 |
| | | | | | 250/434 |

(Continued)

FOREIGN PATENT DOCUMENTS

| WO | WO 2011/106463 A1 | 9/2011 |
| WO | WO 2013/016774 A1 | 2/2013 |

OTHER PUBLICATIONS

International Search Report received in PCT/AU2017/050512 dated Aug. 8, 2017.

*Primary Examiner* — Hoa Q Pham
(74) *Attorney, Agent, or Firm* — Knobbe, Martens, Olson & Bear, LLP

(57) ABSTRACT

Provided are a material characterization system and method for characterizing a stream of material emanating from a material identification, exploration, extraction or processing activity, the system including: a source of incident radiation configured to irradiate the stream of material in an irradiation region, one or more detectors configured to detect radiation emanating from within or passing through the stream of material as a result of the irradiation by the incident radiation and thereby produce a detection signal, and one or more digital processors configured to process the (Continued)

detection signal to characterize the stream of material. The source of incident radiation and the one or more detectors are configured to be disposed relative to the stream of material so as to irradiate the stream of material and detect the radiation emanating from within or passing through the stream as the stream passes through the irradiation region.

13 Claims, 32 Drawing Sheets

(51) Int. Cl.
  *E21B 49/00* (2006.01)
  *G01N 21/25* (2006.01)
  *G01N 21/93* (2006.01)
(52) U.S. Cl.
  CPC ... *G01N 23/087* (2013.01); *G01N 2021/8557* (2013.01); *G01N 2021/8592* (2013.01); *G01N 2021/933* (2013.01); *G01N 2223/316* (2013.01); *G01N 2223/345* (2013.01); *G01N 2223/423* (2013.01); *G01N 2223/501* (2013.01); *G01N 2223/505* (2013.01); *G01N 2223/616* (2013.01)
(58) Field of Classification Search
  CPC ........... G01N 25/14; G01N 2021/8592; G01N 33/24; E21B 21/066; E21B 49/00; E21B 49/005; E21B 49/003; E21B 49/02
  USPC ........... 356/432–440, 70, 301–326; 250/225, 250/256, 269.1, 265, 301, 573; 436/30, 436/31; 73/152.04, 152.18, 152.19; 378/53, 88
  See application file for complete search history.

(56) References Cited

U.S. PATENT DOCUMENTS

| | | | | |
|---|---|---|---|---|
| 5,018,905 | A * | 5/1991 | Kinder | E02D 27/48 |
| | | | | 405/230 |
| 8,750,454 | B2 * | 6/2014 | Gozani | G01N 23/10 |
| | | | | 378/57 |
| 8,855,809 | B2 | 10/2014 | Spencer et al. | |
| 10,295,700 | B2 * | 5/2019 | Beekman | G01V 5/12 |
| 10,416,342 | B2 * | 9/2019 | Scoullar | G01V 5/0041 |
| 10,473,802 | B2 * | 11/2019 | McCleskey | G01T 7/005 |
| 2005/0287252 | A1 * | 12/2005 | Schrock | G01N 23/06 |
| | | | | 426/231 |
| 2007/0205312 | A1 * | 9/2007 | Pierri | B02C 4/28 |
| | | | | 241/6 |
| 2011/0288787 | A1 | 11/2011 | Pidcock et al. | |
| 2012/0211650 | A1 * | 8/2012 | Jones | E21B 47/102 |
| | | | | 250/269.1 |
| 2013/0032411 | A1 * | 2/2013 | John | E21B 17/1085 |
| | | | | 175/320 |
| 2014/0077007 | A1 | 3/2014 | Sommer, Jr. et al. | |
| 2014/0355737 | A1 | 12/2014 | Korkin et al. | |
| 2015/0068806 | A1 * | 3/2015 | Duran Toro | E21B 49/00 |
| | | | | 175/50 |
| 2015/0176407 | A1 * | 6/2015 | Indo | G01N 21/31 |
| | | | | 702/6 |
| 2015/0354352 | A1 * | 12/2015 | Ezzat | G01N 33/24 |
| | | | | 73/152.05 |
| 2016/0178793 | A1 * | 6/2016 | Vijayakumar | E21B 49/088 |
| | | | | 356/409 |
| 2017/0131224 | A1 * | 5/2017 | Paulus | G01N 23/20083 |
| 2019/0212273 | A1 * | 7/2019 | Scoullar | G01J 3/02 |
| 2019/0346586 | A1 * | 11/2019 | Scoullar | G01V 5/0041 |
| 2019/0376386 | A1 * | 12/2019 | Wright | E21B 7/04 |

* cited by examiner

SYSTEM AND METHOD FOR MATERIAL CHARACTERIZATION

CROSS-REFERENCE TO RELATED APPLICATIONS

This application is a U.S. National Phase of International Application No. PCT/AU2017/050512, filed May 30, 2017, which claims the benefit of Australian Patent Application No. 2016902060, filed, May 30, 2016, the contents of which are respectively incorporated herein by reference in their entirety.

BACKGROUND

This invention relates to a material characterisation system and method applied to characterisation of a stream of material emanating from a material identification, exploration, extraction or processing activity. The invention has particular application to exploration and mining drilling rigs including but not limited to mobile drilling rigs for sampling subsurface mineral deposits, rock, soil or groundwater physical properties. In a broader aspect the invention may be applied to many different types of other drilling activity, including but not limited to the drilling of water wells, oil wells or natural gas extraction wells, or drilling activities associated with soil assessment for environmental remediation, or surveying of land. In the broadest aspect, the invention may be applied to characterising any stream of material, for example, within a processing facility, in a pipe, falling off a conveyor, or material sampled from a larger volume of material and presented to the system.

In exploration and mining drilling such as the reverse circulation method, samples of chip and rock, ranging from dust to 25 mm chips, are obtained directly from the drill bit and delivered to a cyclone which serves to reduce the speed of the stream of material, separating the material from the compressed air and allowing it to be collected. Beneath the cyclone is a splitter which may be a cone splitter which works to divert a percentage, typically 1-20% through one or more side chutes into assay bags which are then sent to a laboratory for analysis. This is an off-line process taking substantial time, and the splitting process may introduce inaccuracies and unrepresentative samples.

While there are automated analysis systems attachable to drill rigs in the prior art, such as for example as described in WO 2013/162400, WO2010/000055 and CA2824297A1, prior systems involve collecting samples representing a small fraction of the cuttings and utilising a mechanical transfer system to transfer the samples to the analysis systems. Such mechanical transfer systems are complex and prone to unreliability, and only measure a small sample of the material which may or may not be representative of the whole stream.

There is therefore a need for an improved materials characterisation system which overcomes one or more of the above-mentioned disadvantages of prior systems and techniques.

SUMMARY OF THE INVENTION

In accordance with a first broad aspect of the invention there is provided a material characterisation system for characterising a stream of material emanating from a material identification, exploration, extraction or processing activity, the system comprising:

a source of incident radiation configured to irradiate the stream of material in an irradiation region;

one or more detectors adapted to detect radiation emanating from within or passing through the stream of material as a result of the irradiation by the incident radiation and thereby produce a detection signal; and one or more digital processors configured to process the detection signal to characterise the stream of material;

wherein the source of incident radiation and the one or more detectors are adapted to be disposed relative to the stream of material so as to irradiate the stream of material and detect the radiation emanating from within or passing through the stream as the stream passes through the irradiation region.

In accordance with a second broad aspect of the invention there is provided a method for characterising a stream of material emanating from a material identification, exploration, extraction or processing activity, the method comprising the steps of:

irradiating the stream of material in an irradiation region using a source of incident radiation;

detecting radiation emanating from within or passing through the stream of material as a result of the irradiation by the incident radiation;

producing a detection signal;

processing the detection signal to characterise the stream of material; and disposing the source of incident radiation and the one or more detectors relative to the stream of material so as to irradiate the stream of material and detect the radiation emanating from within or passing through the stream of material as the stream passes through the irradiation region.

Features of embodiments of the broad aspects are set out in the accompanying claims and the following description.

Throughout this specification including the claims, unless the context requires otherwise, the words "energy resolved photon counting X-ray transmission spectroscopy" are synonymous with "multi energy X-ray transmission spectroscopy" and "multiple X-ray absorptiometry". Further, the words "photon counting" means processing and analysing individual packets of radiation, in particular, X-ray photons, in the course of processing the detection signal, and does not necessarily imply obtaining an actual enumeration.

Throughout this specification including the claims, unless the context appears otherwise, the term "packets" in relation to incident radiation includes individual massless quantum particles such as X-rays, gamma-rays or other photons; neutrons, electrons, muons or other massive particles and also extends in its broadest aspects to any other corpuscular radiation for which an energy of each corpuscle may be defined and detected.

Throughout this specification including the claims, unless the context requires otherwise, the words "energy spectrum" in relation to a particular detector refers to a generation of energy values of the individual packets of radiation emanating from or passing through the part of the items under investigation as detected over a time interval from the particular detector, which energy values can comprise values over a range, typically continuous, and may be represented as a histogram of detection counts versus a plurality of defined energy bins, the number of bins representing the desired or achievable energy resolution and constituting at least 10 bins but preferably more than 50, 100 or 1000 energy bins.

Throughout this specification including the claims, unless the context requires otherwise, the word "stream" in relation to the material includes within its scope streams of material falling, rolling or sliding under gravity, or being propelled by or within a fluid such as a liquid or compressed air, typically through a conduit such as a pipe. "Stream" includes a stream of material falling off the end of a conveyor or other material handling system, but does not include material passively sitting on a moving conveyor belt. "Stream" includes both a continuous and non-continuous volume of material, wherein the "stream" may comprise individual particles passing intermittently, or a continuous bulk flow of material. "Stream" also includes within its meaning a stream which is part of a larger stream selectively measured or sampled by the system of the invention, whether or not the part is divided off, diverted or otherwise differentiated from the larger stream.

Throughout this specification including the claims, unless the context requires otherwise, the word "characterisation" means measurement, classification, assessment, or analysis of one or more features or properties of said material, including but not limited to physical, chemical, optical, magnetic or other material properties.

Throughout this specification including the claims, unless the context requires otherwise, the word "material" refers to any material of solid, liquid or gaseous composition, including but not limited to material emanating from material identification, exploration, extraction or processing activities, in particular, from mineral ore, water, oil or natural gas drilling activities, drilling activities associated with soil assessment for environmental remediation, drilling associated with surveying of land, or any other material identification, exploration, extraction or processing activities in which a material sample is characterised.

DETAILED DESCRIPTION OF EMBODIMENTS

Figure 1:
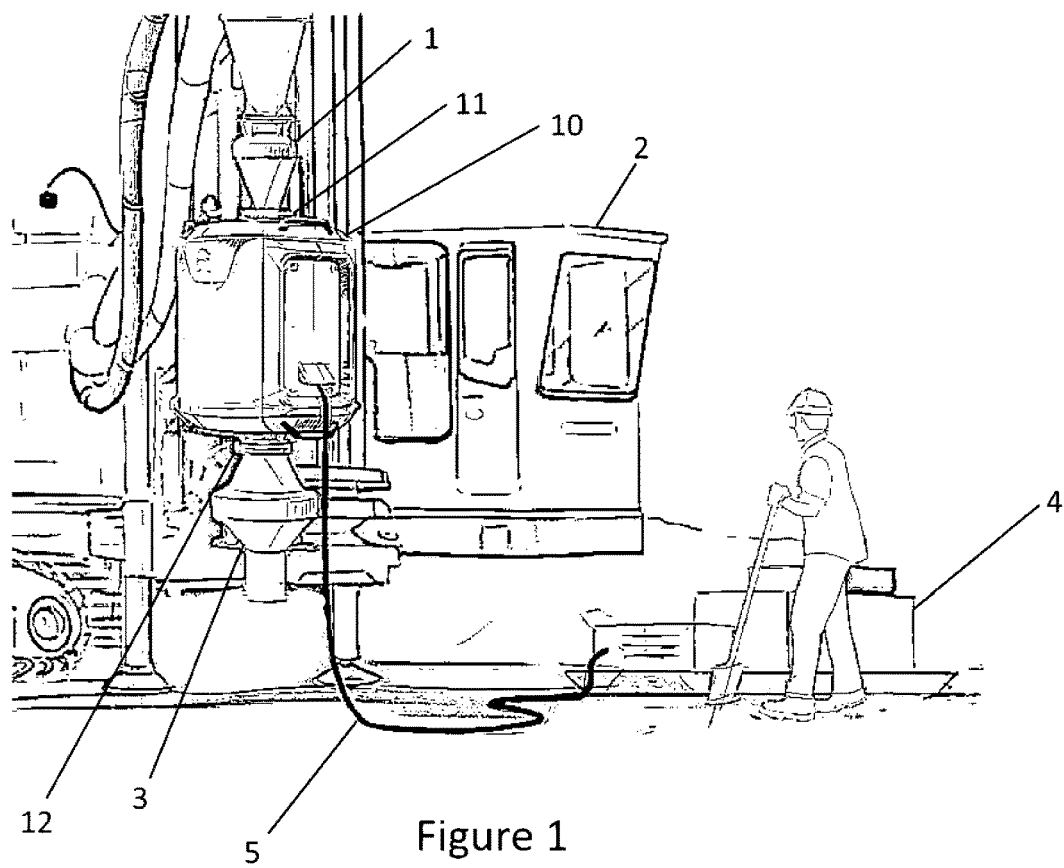
FIG. 1 shows a high level overview of a material characterisation system according to an embodiment of the invention, applied to a drill rig.

It is convenient to describe the invention herein in relation to particularly preferred embodiments. However, the invention is applicable to a wide range of methods and systems and it is to be appreciated that other constructions and arrangements are also considered as falling within the scope of the invention. Various modifications, alterations, variations and or additions to the construction and arrangements described herein are also considered as falling within the ambit and scope of the present invention.

This invention relates to a method and apparatus for material characterisation using a range of radiation types for analysis. In particular, the apparatuses and methods exemplified herein may be applied to X-ray analysis, however, it will be appreciated that the apparatuses and methods could readily be modified for other types of incident radiation such as microwaves, infrared radiation, neutrons, electrons, muons or gamma rays, or to other types of emanating radiation, particularly by substituting a different form of detector unit, to detect for example electromagnetic, neutron, gamma-ray, light, acoustic, infrared, microwave or otherwise. For example, gamma rays may be produced by a natural radioisotope or electric switchable source, and detected by a semiconductor detector, such as a high purity germanium detector. Such modifications are within the broadest aspect of the invention. Further, the apparatuses and methods exemplified herein are described in relation to analysis using energy resolved photon counting X-ray transmission spectroscopy (sometimes known as "multi-energy X-ray transmission"), but the invention may be applicable with the substitution of known detectors and processors to X-ray diffraction, dual energy X-ray transmission or X-ray fluorescence.

A preferred embodiment will now be described, applicable to analysis of sample streams of material emanating from exploration drill rigs using energy resolved photon counting X-ray transmission spectroscopy.

In addition to X-rays being attenuated when transmitted through matter, X-rays passing through matter interact with that matter via a number of modalities including: scattering off crystal planes, causing fluorescence X-ray emission from within the electron structure of the elements; and, scattering off nano-scale structures within the material being scanned. These forms of interaction slightly modify the energy spectrum of the transmitted X-ray beam and by detecting and analyzing this change in energy spectrum it is possible to deduce elemental specific information about the item through which the X-ray beam passed.

The system of one of the embodiments described below provides for a detection system capable of estimating the energy of the individual X-ray photons received at the detector. This is achieved using a single detector array per X-ray source, with each of the detectors in the array constructed from an appropriate detector material coupled to a photomultiplier, producing an analog signal comprising a series of pulses—one pulse for each detected X-ray, which may or may not be overlapping when received at the detector.

A pulse processing system is then used to generate a histogram for each single detector. This histogram comprises of a count of the number of X-rays falling into each histogram bin in a given time interval. The histogram bins represent a range of energies of the received X-rays, and the histogram is therefore the energy spectrum of the received X-ray beam. There may be a large number of histogram bins—for example 1024 or more separate energy bands.

The system of the described embodiment uses this full high resolution energy spectrum to obtain a highly accurate estimate of the screened material's effective atomic number (effective Z), resulting in a vastly superior characterisation of the material. Effective Z may be used to distinguish different contents in a mineral sample, enabling assessment of ore quality or waste material characteristics.

The system may also extract other information from the energy spectrum, for example material density, in order to aid in characterisation of the material, which may be implemented in software in the digital processors.

High Level Overview

FIG. 1 shows a high level overview of a materials characterisation system according to an embodiment of the invention, applied to a mobile drill rig. The system comprises a housing 10 coupled when in use by an inlet coupling 11 to a cyclone 1 (with or without an associated drop box, not shown) producing a slowed stream of material originating from a borehole drilled by mobile drill rig 2. An outlet coupling 12 is connected to a cone splitter 3 of conventional design to allow manual collection of samples according to the prior art in order to collect samples into bags for other manual analyses as desired by a rig operator. Housing 10 houses an X-ray source and detector electronics as described below, which are in electrical and environmental connection with auxiliary equipment 4 via an umbilical connection 5 capable of transmitting electrical power, data and also coolant for maintenance of internal environmental conditions of sensitive components such as an X-ray generator to be described below. Auxiliary equipment 4 comprises the electrical power supply and heat pump for supplying and circulating coolant, and may also contain control electronics which alternatively may be housed within housing 10. The system may optionally include visual or sound generating means for indicating system status (on, off, error, and so forth), and/or material characterisation results (for example, green for target material, red for non-desirable material, or an alarm sound for non-desirable material).

Figure 2:
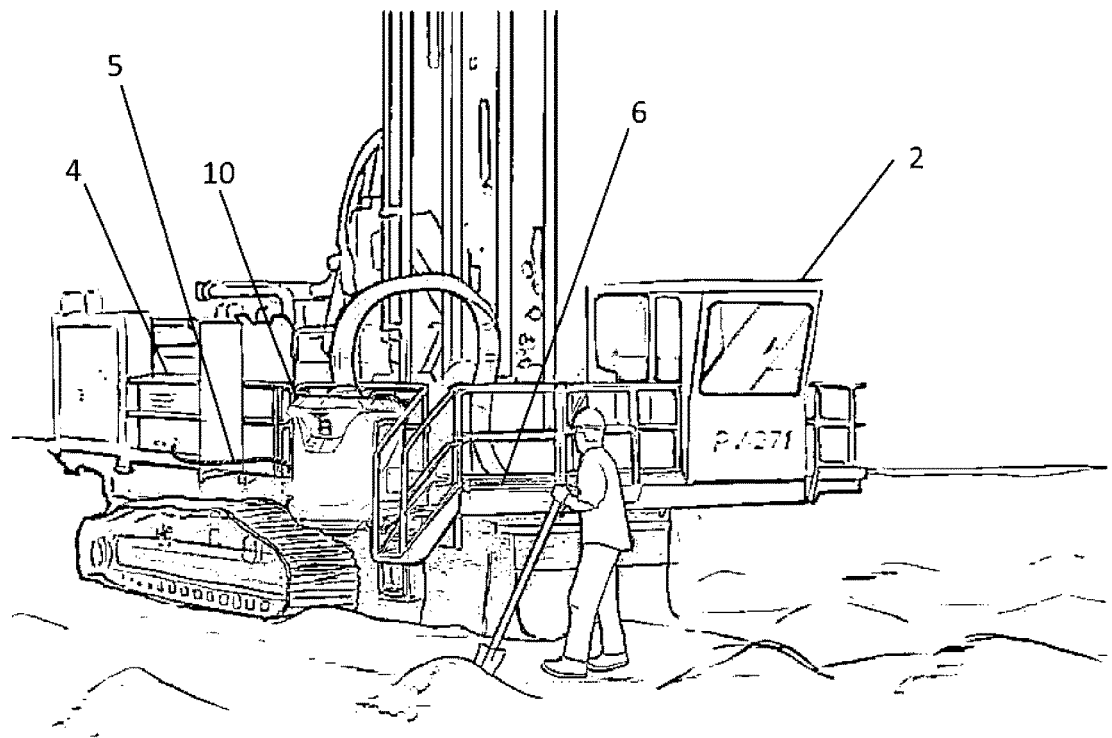
FIG. 2 shows application of the system of FIG. 1 in a different configuration.

FIG. 2 shows application of the system of FIG. 1 in a different configuration, with the housing 10 attached to a side of platform 6 of drill rig 2 coupled directly to an output hose of the drill rig, with auxiliary equipment 4 also located on platform 6 connected to housing 10 via umbilical connection 5. This may be applicable for larger drill rigs or for semi-permanent installation on a drill rig.

Figure 3:
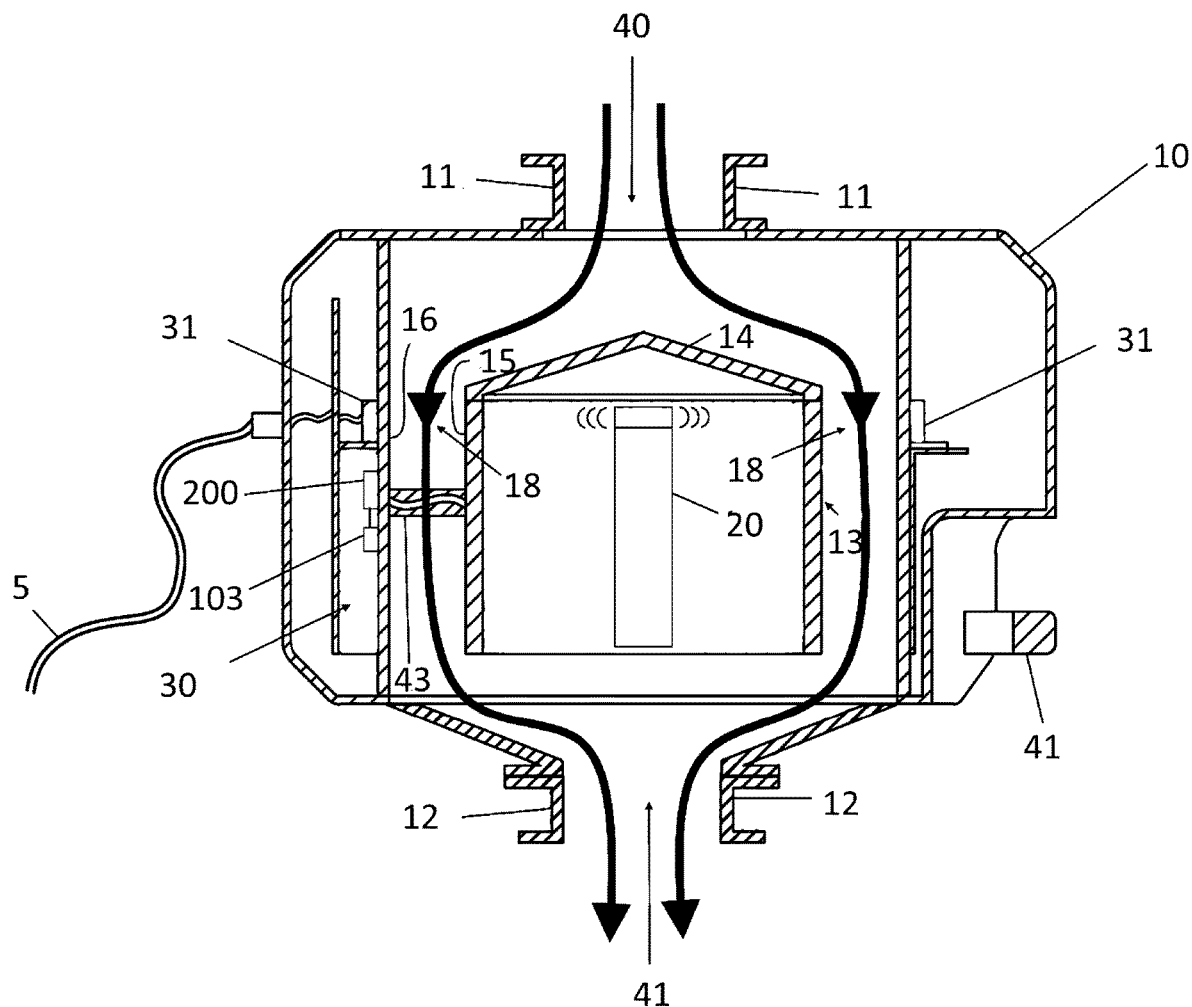
FIGS. 3, 4 and 5 show vertical cross-section, horizontal cross-section and cutaway perspective views of a housing 10 in an embodiment similar to that shown in FIGS. 1 and 2, having a slightly different external shape.
Figure 4:
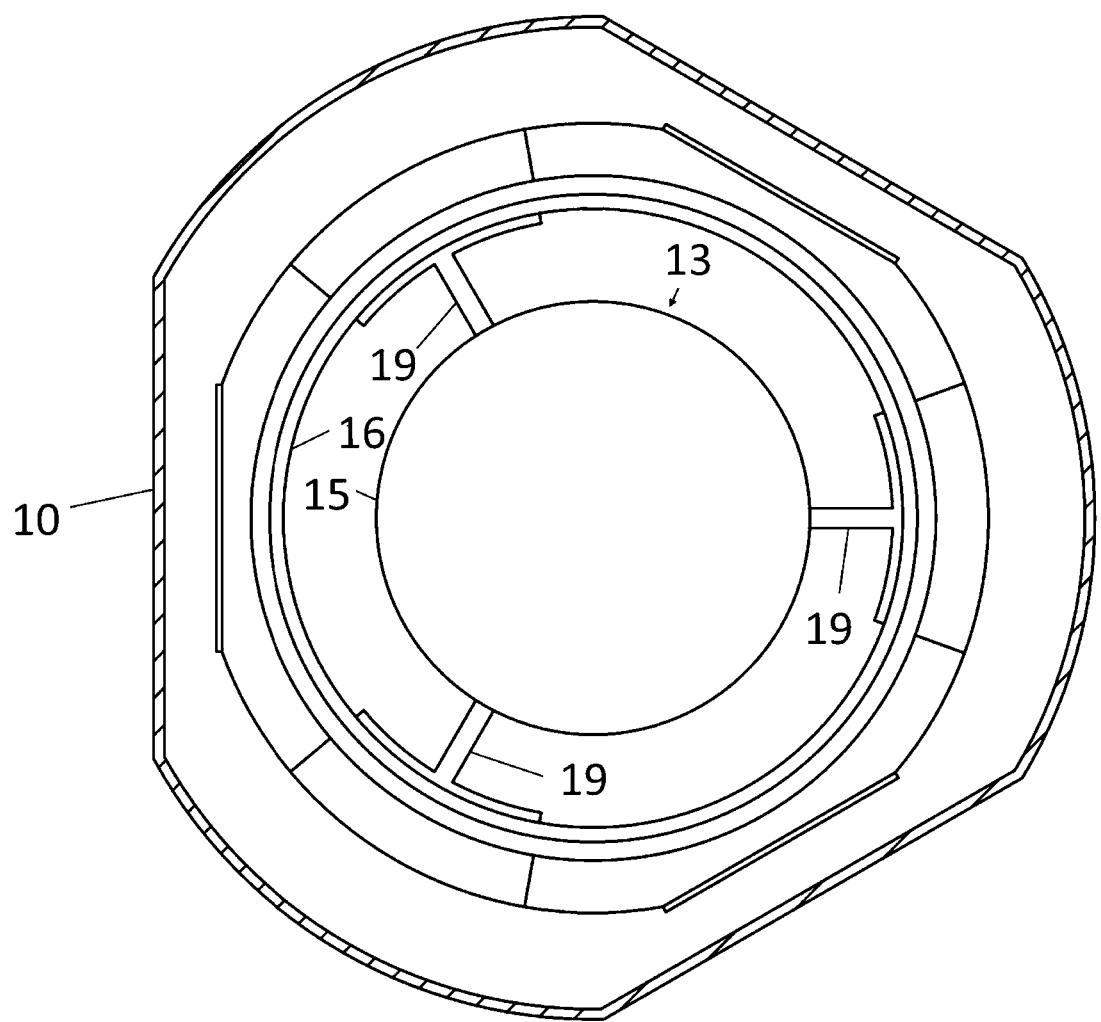
Figure 5:
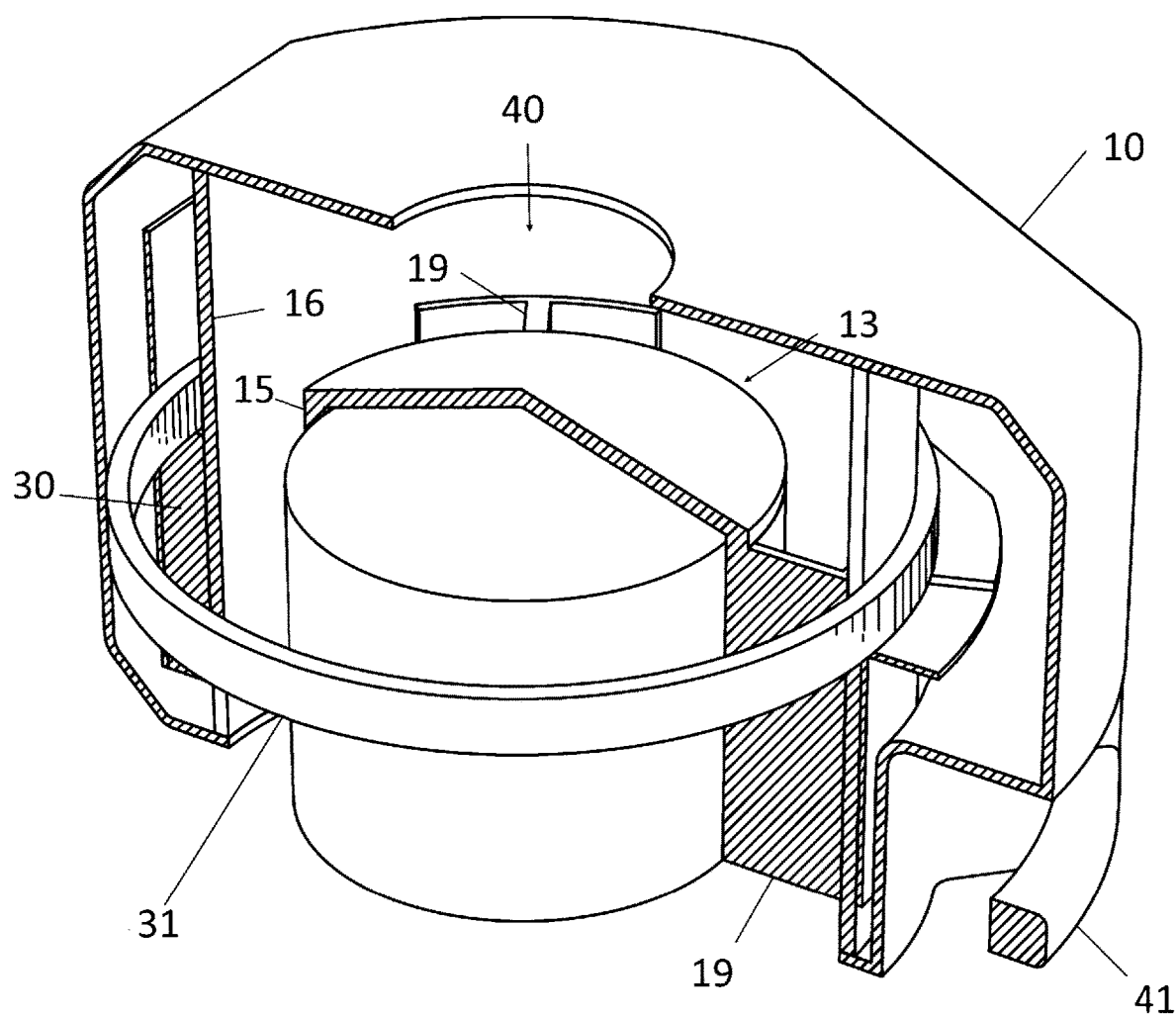

FIGS. 3, 4 and 5 show vertical cross-section, horizontal cross-section and cutaway perspective views of a housing 10 in an embodiment similar to that shown in FIGS. 1 and 2, having a slightly different external shape. Inside housing 10 between inlet 40 and outlet 41 is a stream deflection element 13 comprising cylindrical sidewalls 15 and a tapering end 14 facing inlet 40. A chamber defined in part by outer cylindrical sidewall 16 and inner cylindrical sidewall 15 defines a region of annular cross-section and irradiation region 18. The stream of chips and rocks enters through inlet 40 and is deflected around stream deflection element 13 by tapering surface 14 falling under gravity through the annular cross-section irradiation location 18, and ultimately exits housing 10 through outlet 41. Located and environmentally protected within a sealed chamber inside the stream deflection element 13 is an X-ray generator 20, which is disposed centrally with respect to the annular irradiation region 18 and is capable of generating a panoramic narrow circular emission of X-rays into annular irradiation region 18. Transmitted X-rays impinge on detectors housed within detector ring housing 31. A suitable X-ray generator 20 in this embodiment for effective Z determination is obtainable from Industrial Control Machines SA (www.icmxray.com), for example the Sitex™ range. Suitable X-ray generators may be selected for their power and physical design according to the application to specific material and integration requirements. X-ray generator 20 is provided with electrical power, control signals and coolant through conduit 43. Stream deflection element 13 is secured in position by three vertical support vanes 19. A host controller and digital processor 200 is housed within a side chamber 30 adjacent detector ring housing 31.

X-ray generator 20, digital processors 200 and detector ring housing 31 or the detectors disposed therein may be provided in plug-in modular construction, allowing easy removal and replacement on-site.

A width of the annular irradiation region between sidewalls 15 and 16 is sufficiently large to allow for throughput of the stream of material and sufficiently narrow to facilitate the appropriate degree of penetration of the X-rays through the stream of material for analysis, typically about 100 mm. The positioning of the components inside housing 10 is illustrative only, and does not indicate a specific requirement for number of sources or detectors, and nor does it specify a requirement for placement of sources or detectors, or relative dimensions of any system components. The detection and processing system described in this disclosure will operate successfully with any number of sources and detector arrays, and regardless of how those sources are placed.

The one or more digital processors 200 processes the received X-ray pulses from the detector array within the detector ring housing 31. Depending on the implementation architecture, the digital processors may:
i. Reside on the same boards as the detectors within the detector ring housing 31.
ii. Reside on separate hardware, housed within side chamber 30 or outside the housing 10 in the auxiliary equipment 4
iii. Form part of a host controller 103 responsible for overall operation of the system housed within side chamber 30 or outside the housing 10 and the auxiliary equipment 4
iv. A combination of the above.

Figure 8:
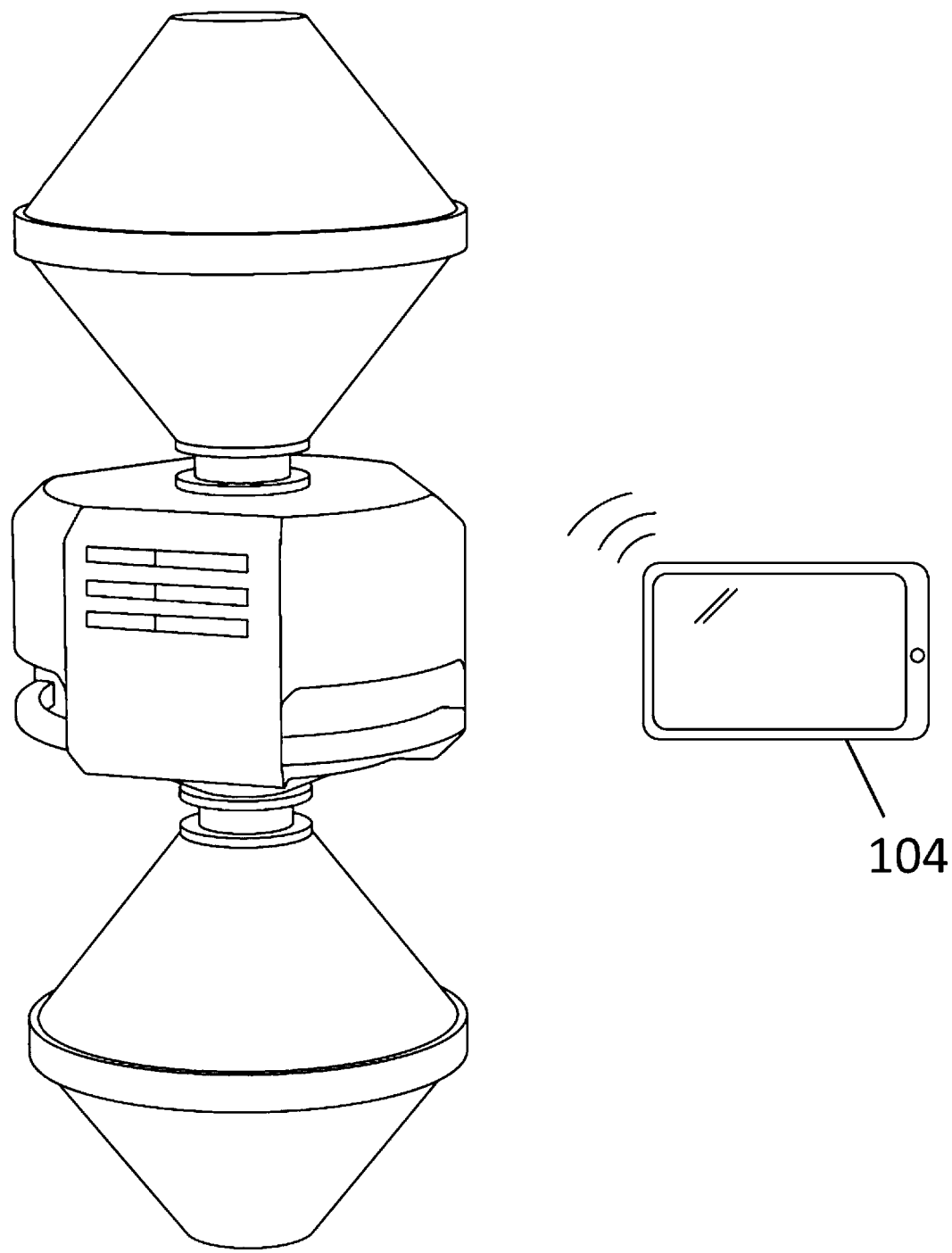
FIG. 8 shows wireless operation of the system using a tablet.

Wireless control via portable computer, tablet or smartphone 104 as shown in FIG. 8 is envisaged whereby application running on the portable computer, tablet or smartphone 104 enables communication with the host controller 103 (see FIG. 3), so that an operator may control the system and easily capture and view results. Alternatively, an operator may communicate with the host controller 103 from a remote location, for example, a control centre, enabling operation of the system from longer distances. The control centre may be on-site, or off-site and connected over a remote communication system such as the Internet.

Figure 6:
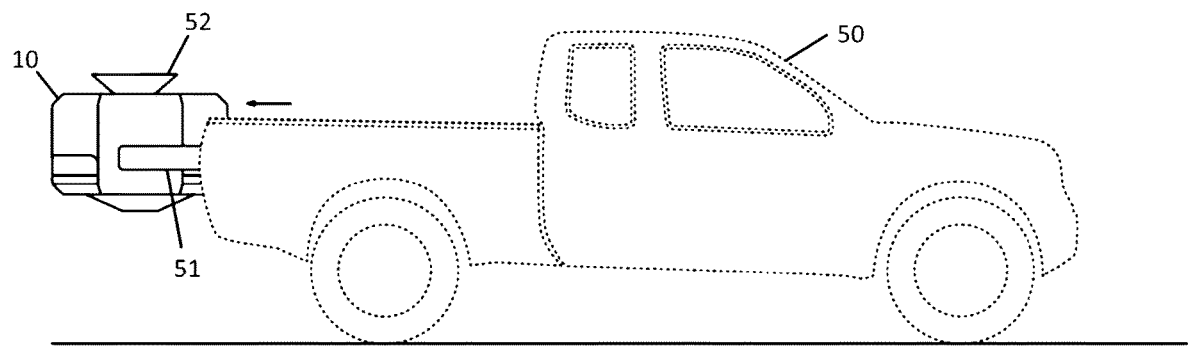
FIGS. 6 and 7 show other applications of this embodiment which are not directly connected to a drill rig.
Figure 7:
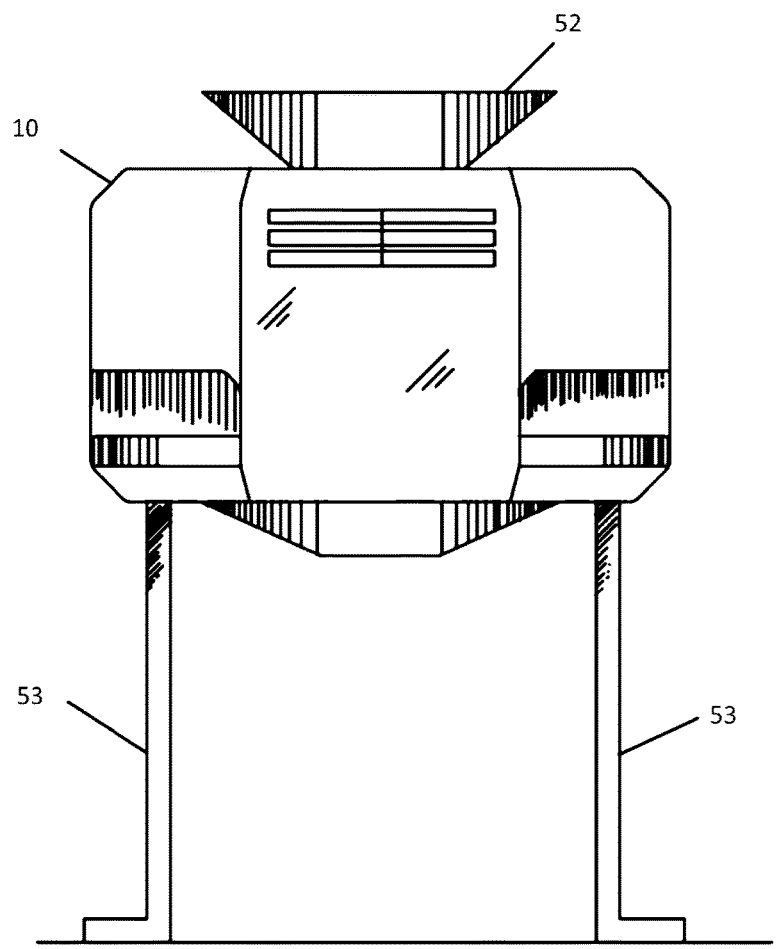

FIGS. 6 and 7 show other applications of this embodiment which are not directly connected to a drill rig. In FIG. 6, the system may be installed in the tray of a utility truck 50 and housing 10 may be slidable on a bracket 51 into an operating position behind utility truck 50. Truck 50 may then be maneuvered into position under a stream of material and the stream of material may enter fluted chute 52 and fall through the analysis system. Alternatively, a stream of material may be produced manually by shoveling of a sample into fluted chute 52. In FIG. 7, housing 10 may be disposed on legs 53 and used as described above in any chosen location.

While the above-described embodiments utilise a particular convenient housing geometry with a central radiation source and apertures of circular cross-section, is to be understood that in the broadest aspect of the invention many other geometries are possible. For example, an incomplete annulus or a linear slot may be used as the geometry of the irradiation region, where the X-ray source may alternatively be a fan beam X-ray source, or a panoramic X-ray source with a collimating aperture providing an X-ray beam through the irradiation region.

Further, while the embodiments described below contemplate a large number of detectors each producing signals for analysis, the system in principle is operable with a single detector and in its broadest aspect there are any number of detectors.

Further still, while one advantage of the present embodiment is the ability to process an unsplit stream of material exiting a drill rig, in its broadest aspect the invention includes analysis of a stream split from a larger stream. In an alternative embodiment, the system may be connected directly to a drill rig splitter, thereby processing a split stream of material.

FIG. 31-36 show an alternative embodiment conceived from identifying some shortcomings of the embodiment of FIGS. 1-5. Particularly, the stream deflection element 13, while it allows central location of the X-ray generator and thereby maximal use of the emitted X-rays, also impedes the flow of the stream of material and depending on the material type and velocity can be impractical. The alternative embodiment of FIGS. 31-36 allows unimpeded flow of the stream through the instrument.

Figure 31:
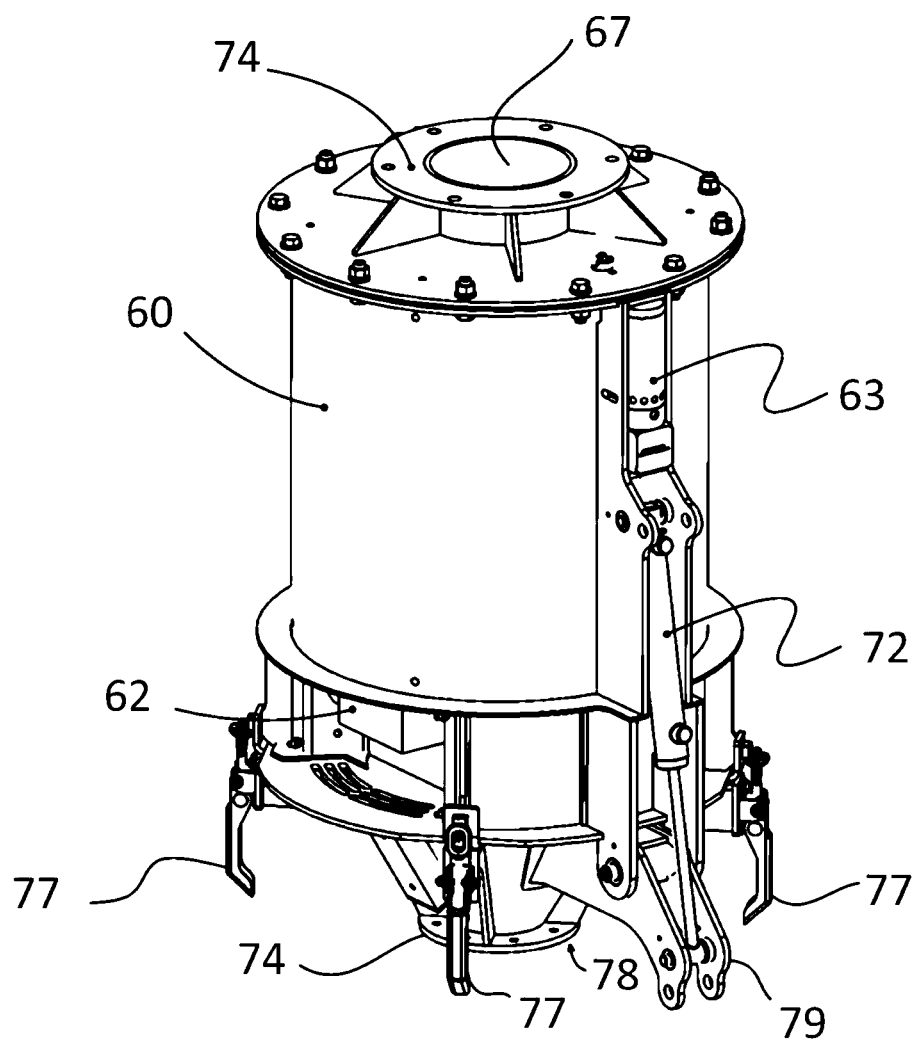
FIG. 31-36 illustrate details of an alternative embodiment to that shown in FIG. 1-36 having a straight-through path for the stream.
Figure 32:
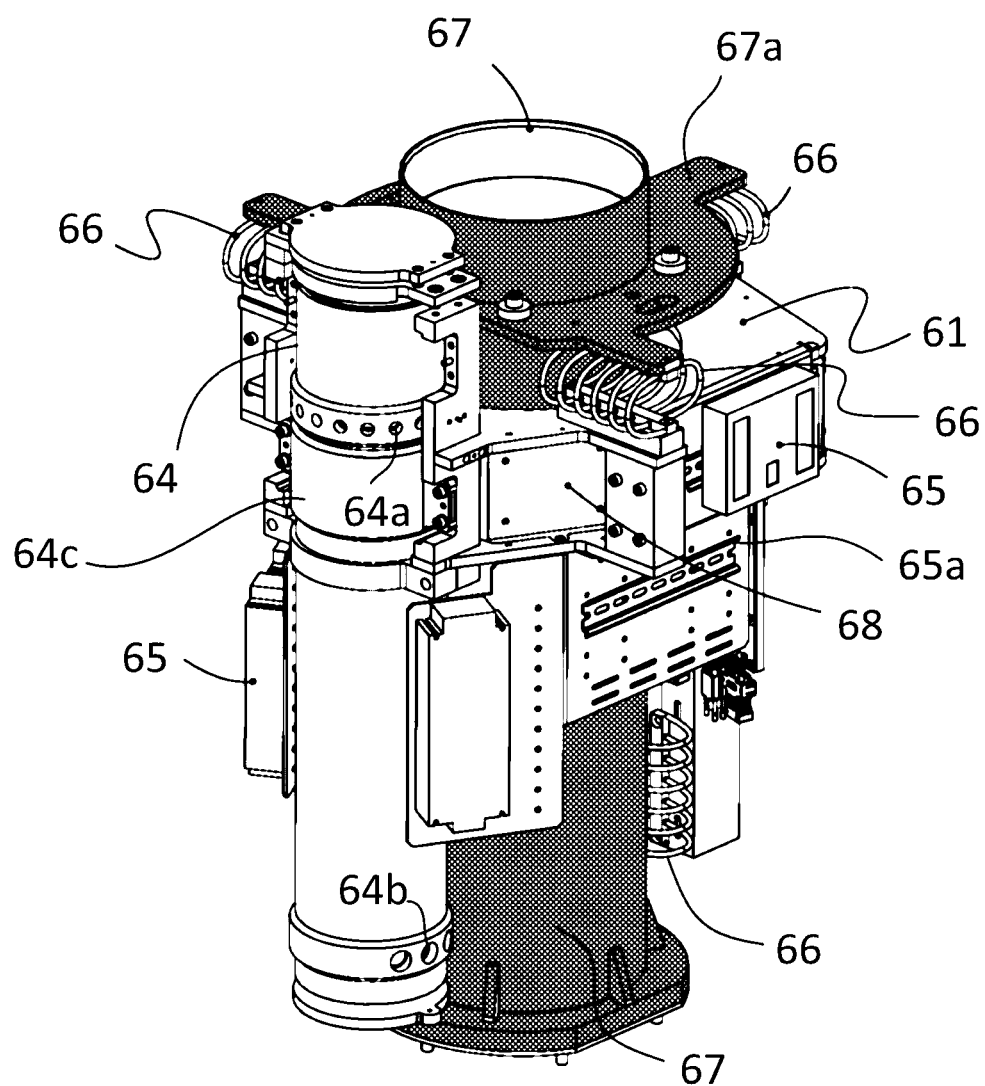

Referring now to FIG. 31, the alternative embodiment is illustrated in isometric external view, applicable to the drilling rig operations as described above, and also specially adapted to measuring fluid material flowing in a pipe. The housing is in form of an external steel chassis 60 enclosure providing an internal environmentally controlled space, using cooling apparatus such as a compressed air vortex cooler 63 for high heat removal capacity or thermoelectric cooler 62 for modest heat removal capacity. Passing through external chassis 60 is a chamber comprising an X-ray translucent pipe 67 constructed from HDPE. Pipe 67 is bordered by connecting flanges 74 at entry and exit ends thereof, for connection to drilling rig components as described above or to a similarly dimensioned transport pipe as described below. At the exit end 78 a conical base of the chassis 60 is openable through quick release levers 77 to allow access, being rotatable by operation of pneumatic piston 72 bearing on pivot arm 79. This allows rapid clearance of blocked material if necessary.

referring now to FIG. 32, internal componentry housed within chassis 60 is shown. Central pipe 67 and attached internal chassis suspension plate 67a are shown with hatched shading, and form of a rigid base connected to external chassis 60. The dimension and vibration sensitive source and detector componentry are housed on a precision engineered internal chassis 61. Internal chassis 61 is mounted to internal chassis suspension plate 67a and pipe 67 through four wire rope isolators 66, providing significant shielding of internal chassis 61 against vibrations and shocks caused by passage of material through pipe 67 and caused by shocks and vibrations passing through external chassis 60 from connected equipment. The X-ray source is contained within an enclosure 64 composed of 5 mm thick lead walls to provide X-ray shielding cast over an internal aluminium pipe to provide rigidity. A thicker 10 mm region 64c is provided surrounding the beam exit point of the contained X-ray source of and incorporating a collimating slit on an internal side (not shown) to provide a substantially planar beam of source X-rays exiting enclosure 64 for irradiation of the stream of material passing through the central pipe 67, as described below. Cooling holes 64a, 64b provide internal cooling through a flow of conditioned air. Electronic componentry is located in sealed boxes 65 where required abutting source and detector and easily swappable for maintenance, modification or replacement through DIN rail mountings 65a. Beam shielding 68 as described below.

Figure 33:
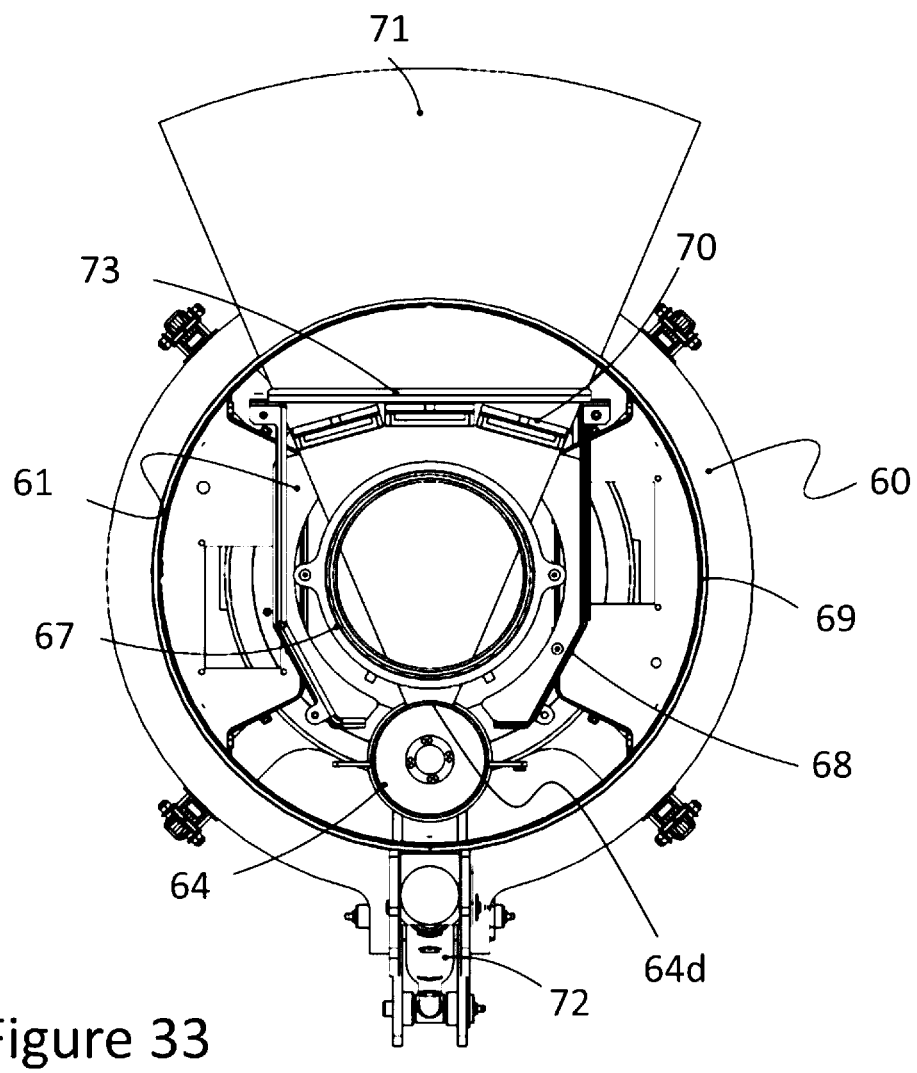

Referring now to FIG. 33, a top view through the device as shown revealing internal componentry positioning. Source 64 projects a substantially planar segment-shaped beam 71 from collimating slit 64d through a majority of the internal cross-sectional area of pipe 67, intersecting detectors arranged in three perpendicularly oriented detector cards 70 each comprising a linear detector array as described below. A beam stop 73 composed of 8 mm thick lead plate prevents further travel of beam 71 (shown outside in dotted lines). Primary shielding plates 68 composed of 4 mm thick lead plate are provided on side of beam 71 to contain X-rays scattered from material in pipe 67. Secondary shielding in the form of a cylindrical lining 69 of external chassis 60 may also be provided.

Figure 34:
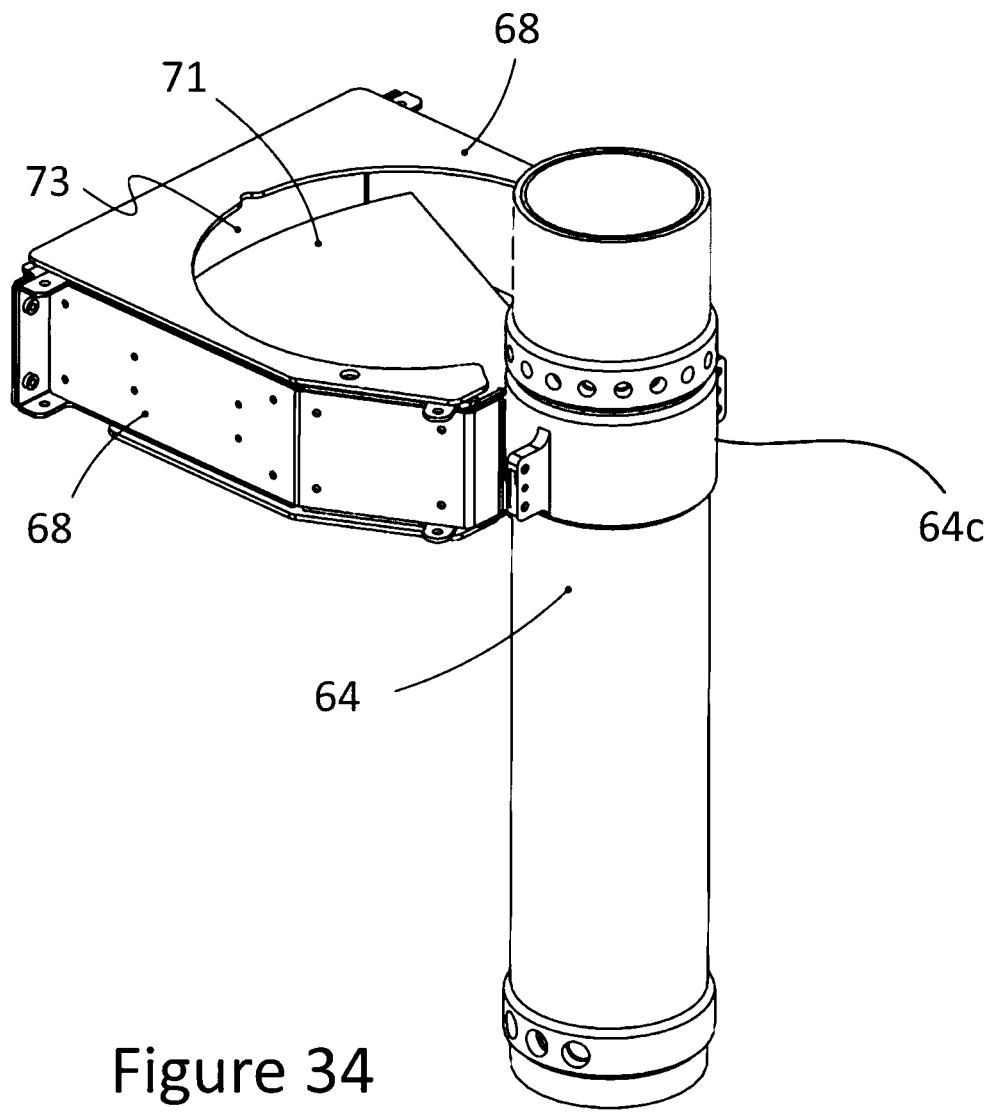

Referring now to FIG. 34, an isometric view of source 64 and shielding plates 68, beam stop plate 73 and beam 71 are shown, showing upper and lower primary shielding plates also of 4 mm thick lead plate are included within primary shielding 68.

Figure 35:
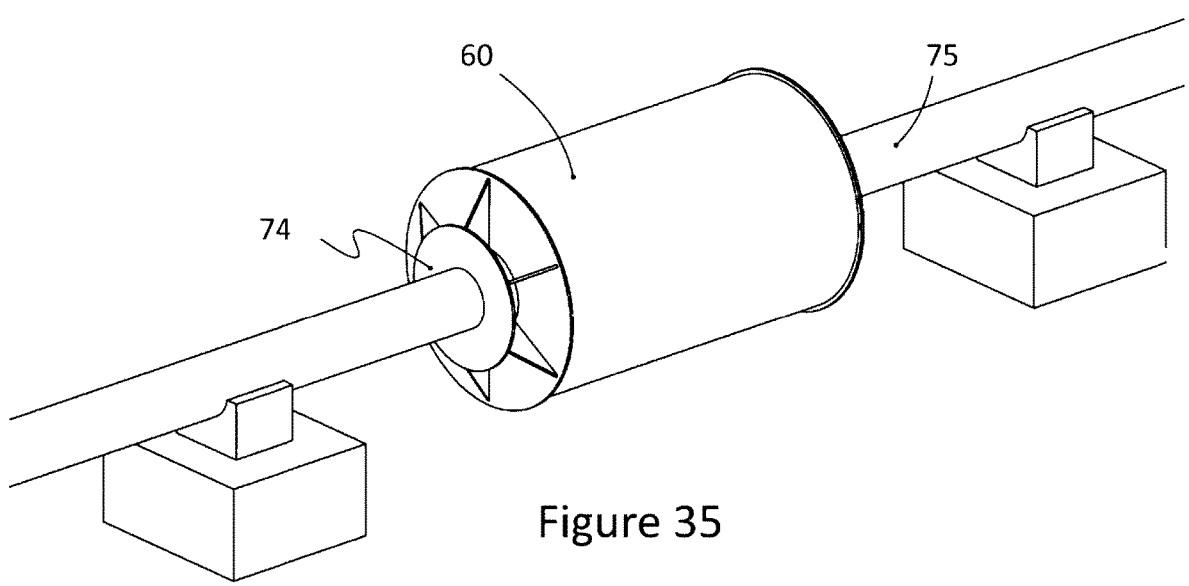

Referring now to FIG. 35, a variant of the above external chassis 60 is shown suitable for installation inside a material transport pipe 75, installed by cutting out a section of material transport pipe 75 and to which are welded appropriate connection flanges for mating with the system through connection flanges 74 of chassis 60. Ideally, an internal cross-sectional shape of the material transport pipe 75 is identical or less than the cross-sectional shape of pipe 67, allowing unimpeded transport of material through the system.

Figure 36:
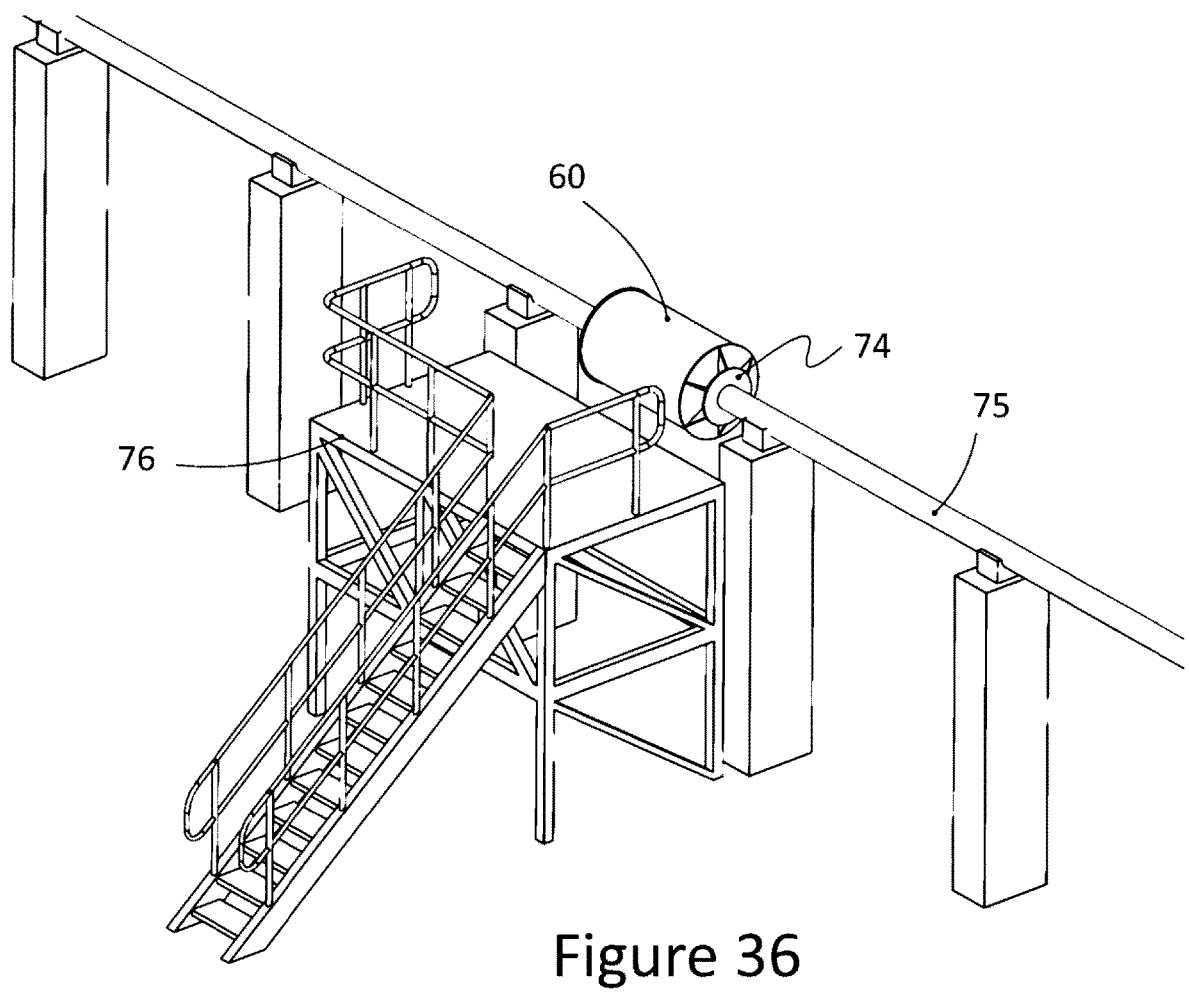

Referring now to FIG. 36, for an elevated pipe and access platform 76 can be provided to which may be attached and interface control system (not shown).

Figure 9:
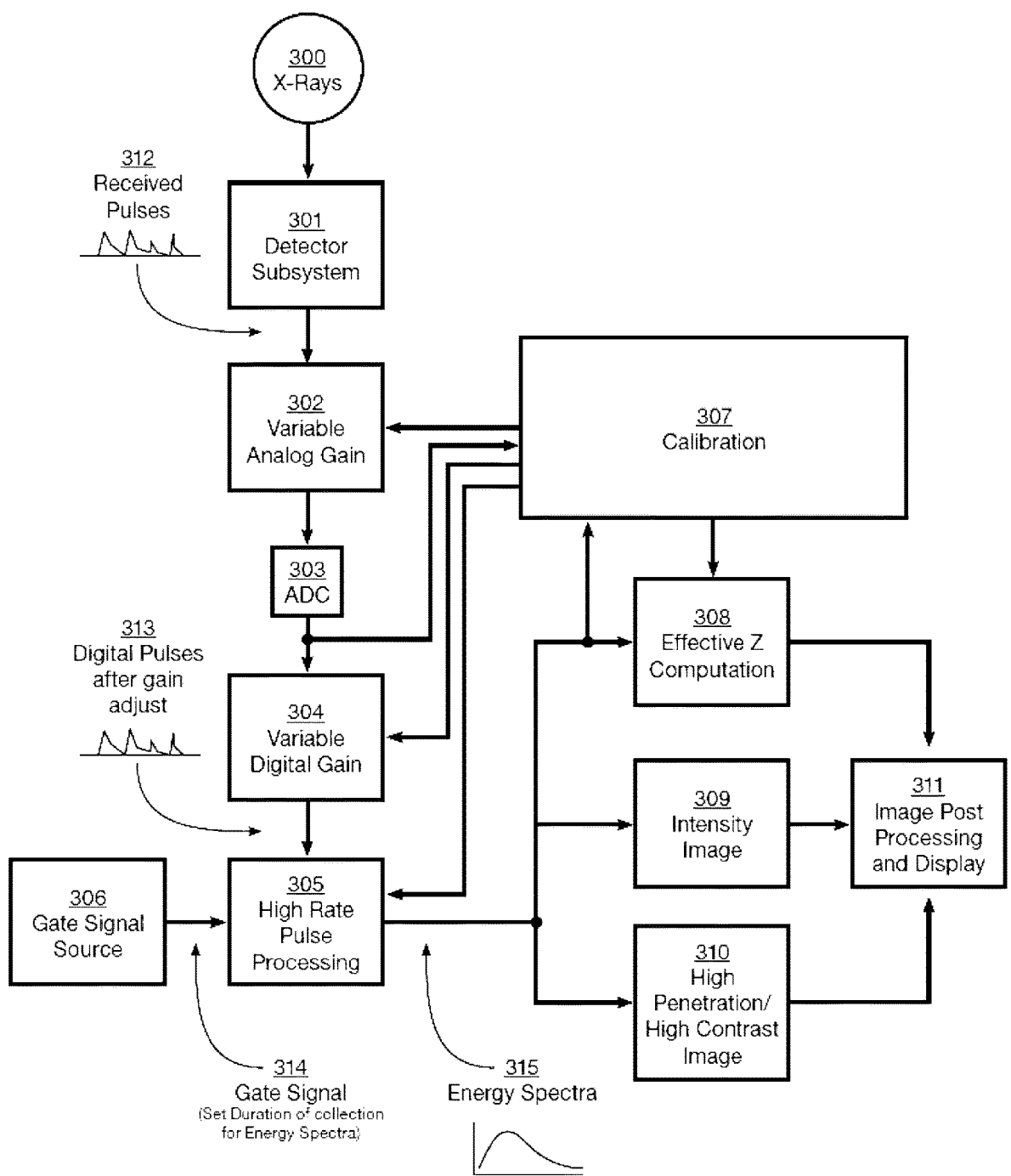
FIG. 9 shows a more detailed view of the detection system and processing electronics according to an embodiment.

FIG. 9 shows a more detailed view of the detection system and processing applicable to the above embodiments. This figure shows the steps for a single detector. The effective Z may utilise, and image post processing will require, access to the spectra from all detectors.

In this embodiment, there are three detector arrays disposed around and inside detector ring housing 31, each having multiple individual detectors, to be described below. Typically, the arrangement of the detector arrays produces approximately equally spaced detectors around the ring, but equal spacing is not essential for effective operation of the system. Also in this embodiment, an image of the rock and chip material is formed from rows of pixels as the stream passes through the detector region. In its broadest aspect, the invention does not require the formation of an image and a system comprising a single detector is within the scope of the broadest aspect. The detection system and processing electronics comprise:

1. A detector subsystem (301) for each individual detector (with N such subsystems for a 1×N detector array), the detector subsystem comprising:
   a. Detector material for detecting the incident X-rays (300) and converting each detected X-ray to a light pulse
   b. A photomultiplier for receiving and amplifying the incident light pulses into an analog signal comprising pulses (312) that may or may not overlap
   c. Appropriate analog electronics, which may include filtering
   d. An optional variable gain amplifier (302). Fixed analog gain may also be used, or it may not be desirable to use additional gain to the photomultiplier
2. An analog to digital converter (303) for each individual detector, to convert the analog signals into digital values (313).
3. A variable digital gain (304) for each individual detector to appropriately adjust the digital signal levels prior to processing.
4. High rate pulse processing (305) for each detector subsystem (301), for example the pulse processing systems disclosed in U.S. Pat. Nos. 7,383,142, 8,812,268 and WO/2015/085372, wherein the pulse processing comprises:
   a. Baseline tracking and removal, or fixed baseline removal.
   b. Detection of incoming pulses.
   c. Computation of the energy of each detected pulse.
   d. Accumulation of the computed energy values into an energy histogram (energy histogram) (315).
   e. Output of accumulated histogram values each time a gate signal is received.
   f. Reset of the histogram values for the next collection interval.
5. A gate signal source (306) which outputs a gate signal (314) at a regular pre-configured interval. The gate interval is a constant short interval that determines the histogram accumulation period.
6. This gate interval also determines the pixel pitch in the resulting X-ray image. In the absence of a gate signal source, and gate signal, another appropriate means may be used to control and synchronise the timing of energy histogram collection across all detectors. For example, a suitably precise network timing signal may be used instead of the gate signal.
7. Calibration System (307), which receives input from appropriate analog and digital signals and then communicates the desirable calibration parameters back to the various processing blocks. The calibration system performs:
   a. Pulse parameter identification
   b. Gain calibration
   c. Energy calibration
   d. Baseline offset calibration (where fixed baseline is used)
   e. Count rate dependent baseline shift
8. Effective Z computation (308), which takes the computed energy spectra in each detector during each gate interval and determines the effective Z of the sample. This in turn leads to the production of an effective Z image.
9. Intensity image generation including:
   a. Intensity image (309), based on total received energy across the energy spectrum.
   b. High penetration or high contrast image (310) determined by integration of selected energy bands from the full energy spectrum.
10. Image post processing and display (311), with features that may include one or more of the following:
    a. Image sharpening
    b. Edge detection and/or sharpening
    c. Image filtering
    d. Application of effective Z color map to color the image pixels based on identified material.
    e. Selection, display and overlay of 2D images for each detector array
       i. Effective Z
       ii. Intensity
       iii. High Penetration/High Contrast images
    f. Display of images on an appropriate monitor or other display device.

As described above, and illustrated in FIG. 15, the images produced for display comprise a number of data elements recorded for each of N detector elements (501) and for each gate interval (500).

The data obtained for detector i during gate interval j is used in the production of effective Z, intensity and high penetration/high contrast images as shown in FIG. 9. During the processing, a number of elements are recorded in each pixel (502), including one or more of:
1. The X-Ray energy spectra.
2. The computed effective Z value
3. The intensity value (full spectrum summation)
4. High Penetration/High Contrast intensity values computed from integration of one or more energy bands.

Figure 15:
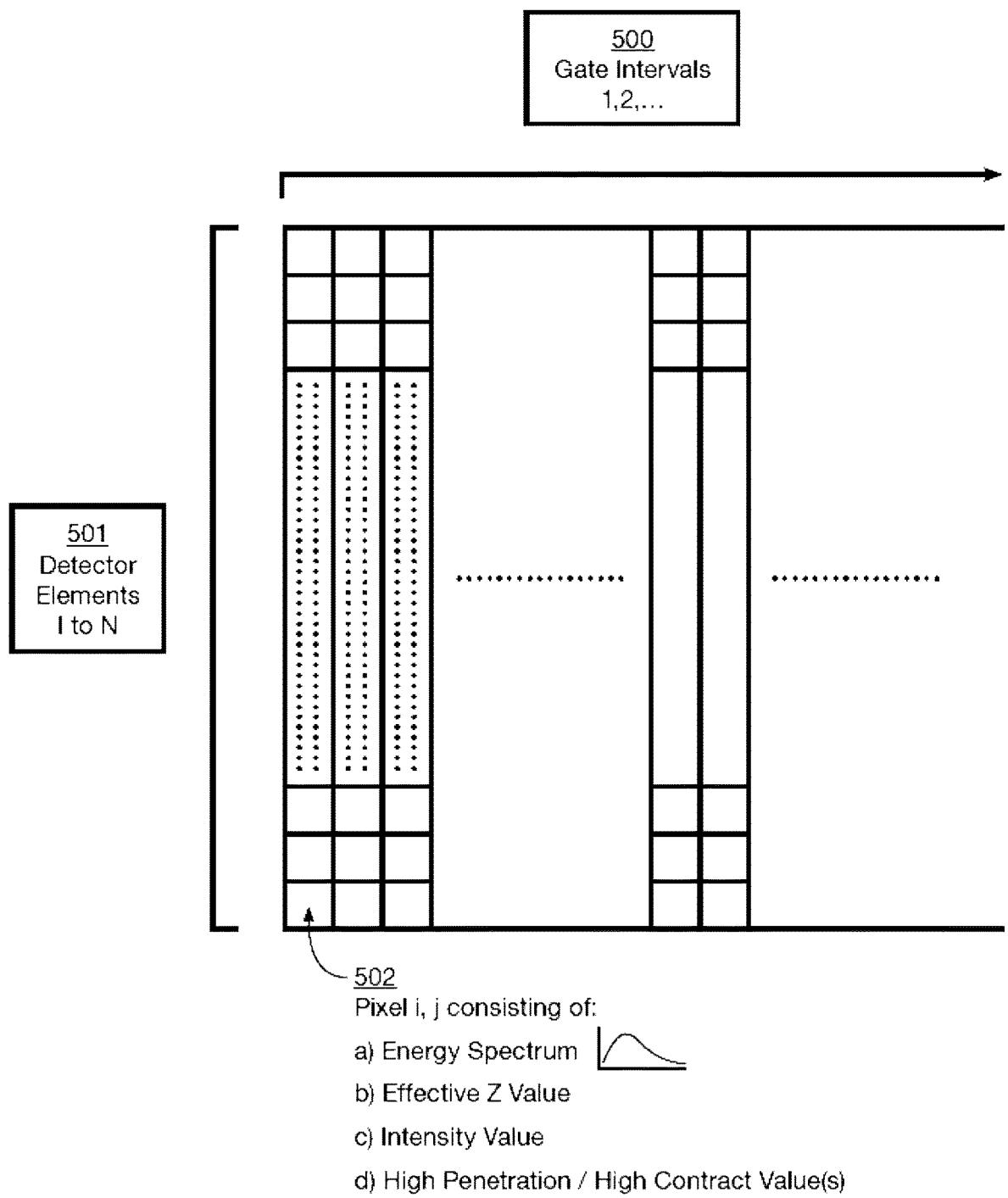
FIG. 15 illustrates how data is arranged and built up into an image of a scanned sample, prior to further post processing and image display according to an embodiment.

FIG. 15 illustrates how this data is arranged and built up into an image of the scanned sample, prior to further post processing and image display.

Detector Subsystem

The detector subsystem utilises a scintillator (such as phosphor) coupled to an array of PIN diodes to convert the transmitted X-ray into light, and subsequently into an electrical signal.

When an X-ray impacts the detector it produces an electron charge in the detector proportional to energy of the X-ray, wherein the higher the energy is the more charge is induced in the detector. However, more detailed examination of prior art detector arrays have illustrated that detector systems do not have the resolution to detect individual X-ray photons, and instead they integrate all the charge produced by the detector pixel over a given time period and convert this into a digital value. Where the instantaneous flux of X-rays on the detector pixel is large, a large digital value is produced (a bright pixel in the image) and where few X-rays impact the detector a small digital value is produced (a dark pixel in the image).

The detector subsystem of this embodiment comprises:
a) A detector material
b) A photomultiplier material coupled to the detector material using an appropriate means
c) Analog electronics The detector material may be of dimensions X by Y by Z, or some other shape. The photomultiplier may be a silicon photomultiplier (SiPM) and the coupling means may be a form of optical grease or optical coupling material. It may be desirable to use a form of bracket or shroud to hold the detector in position relative to the photomultiplier. The photomultiplier requires appropriate power supply and bias voltage to generate the required level of amplification of the detected signal. In this embodiment, typically each detector dimensions approximately 1-3 mm in width and depth, with a height of approximately 2-6 mm, and inter-detector pitch of approximately 2-200 mm.

In an X-ray scanning application, a large number of single element detector subsystems may be required to produce each detector array. It may be desirable to group these in an appropriate way, depending on the specific X-ray scanner requirements. Individual elements of detector material may be grouped into a short array of M detectors. Small groups of M detector elements may be mounted onto a single detector board, for example 2, 4 or more groups of M onto one board. The full detector array is then made up of the number of detector boards required to achieve the total number N of detector elements per array.

In various embodiments, detector subsystems can be arranged in a number of different configurations including: curved arrays of 1×N devices; linear arrays of 1×N devices; square or rectangular arrays of N×M devices; or L-shaped, staggered, herringbone or interleaved arrays. In this embodiment, three curved arrays of 1×24 devices are utilised, disposed within the detector ring housing 31, however, any chosen distribution of detectors and detector boards may be used according to the desired geometry of the system and population of detectors around the detector ring housing 31.

One example of a detection device, used to convert incoming radiation photons into and electrical signal, is the combination of a scintillation crystal, coupled to a silicon photomultiplier (SiPM) or multi-pixel photon counter (MPPC).

In such a detection device a scintillation crystal such as LSYO (1701) is used to convert the incoming radiation photon (1700) into UV photons (1703). In the case of LYSO scintillation material the peak emission of UV photons occurs at 420 nm, other scintillation material such as those listed in Table 1 may have different emission peaks. Subsequent to the interaction of the radiation photon (1700) with the scintillation crystal (1701) to produce UV photons (1703) a multi-pixel photon counter, or silicon photomultiplier (1704) with sensitivity in the UV region (such as one with the performance metrics in Table 2) may be used to detect these photons and produce an electrical signal.

Figure 21:
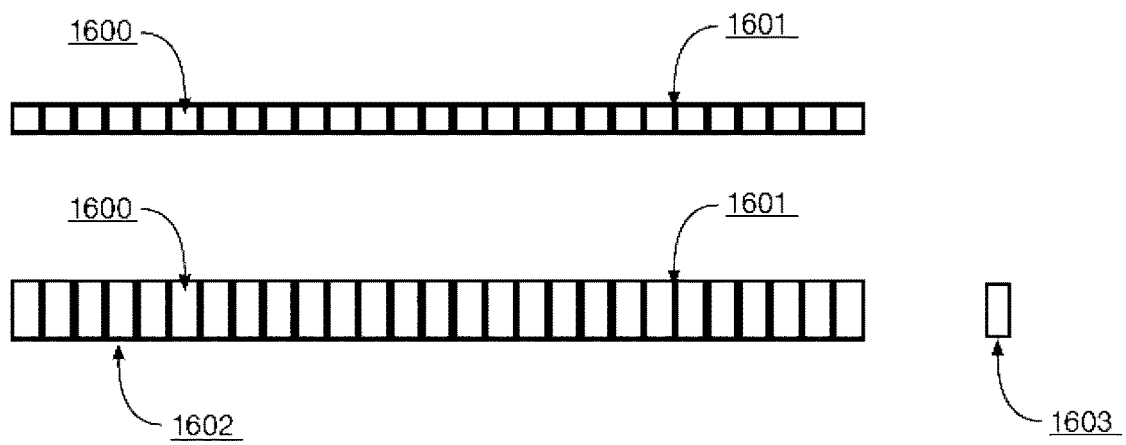
FIG. 21, 22, 23 illustrate a detector array and detector subsystem according to embodiments in which a linear (or curved) array of scintillation crystals is coupled to an array of pulse producing elements in the form of silicon photomultipliers.

FIG. 21 depicts a linear array of LYSO scintillation crystals (1600), indicative of how single detection devices can be joined together to form a linear array. In this indicative example the individual LYSO crystals (1600) have a cross section of 1.8 mm and a height of 5 mm, the individual LYSO crystals (1600) are wrapped around the sides in a reflective material to assist in collecting all the UV photons. The pitch of this exemplary array is 2.95 mm, the length is 79.2 mm and the width of the array is 2.5 mm.

Figure 22:
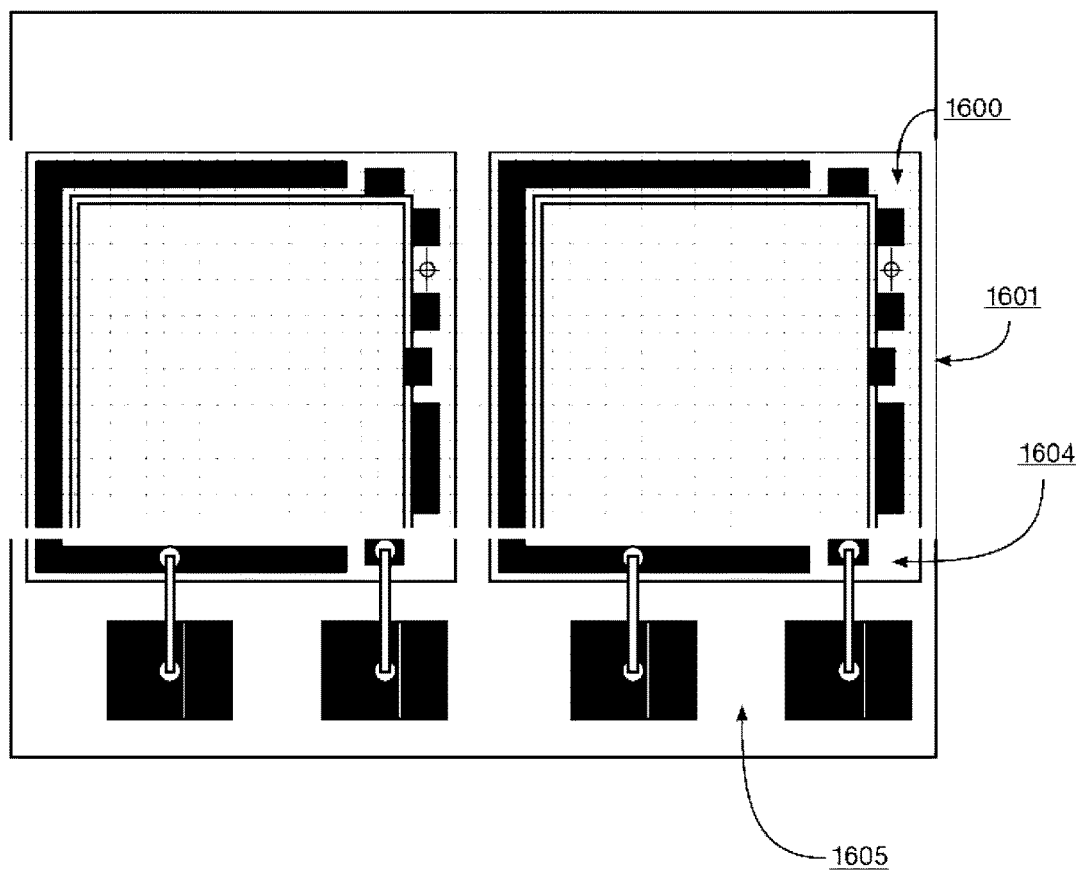
Figure 23:
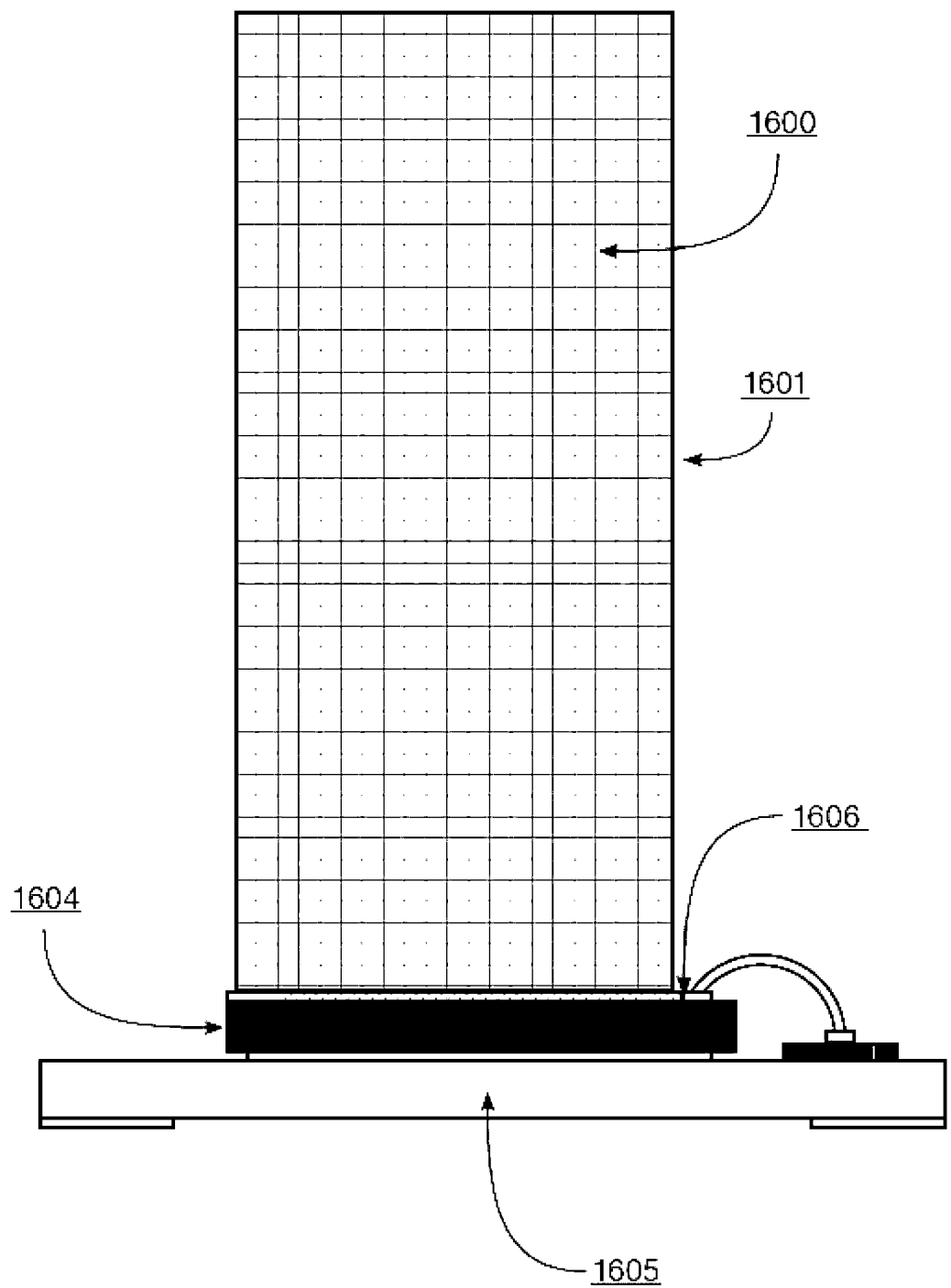

FIGS. 22 and 23 depict a detector array from a top view and side view respectively, comprising the linear array of LYSO crystals depicted in FIG. 21 coupled to an electrical pulse producing element (1604) on substrate (1605). The electrical pulse producing element may comprise a silicon photomultiplier (SiPM). Enhanced specular reflector (ESR) or aluminium or other reflective foil (1601) is disposed around side surfaces of the scintillation crystals to direct the scintillation photons onto the silicon photomultiplier material (1604) and prevent light leakage (cross-talk) between adjacent detection devices. Optionally, optical coupling (1606) may be interposed between the LYSO crystals and SiPM, and may comprise any number of known suitable materials, for example, a thin layer of optically transparent adhesive.

In the current invention, the detector arrays may be curved rather than linear as shown in FIGS. 21 and 23 to appropriately fit inside detector ring housing 31.

Figure 24:
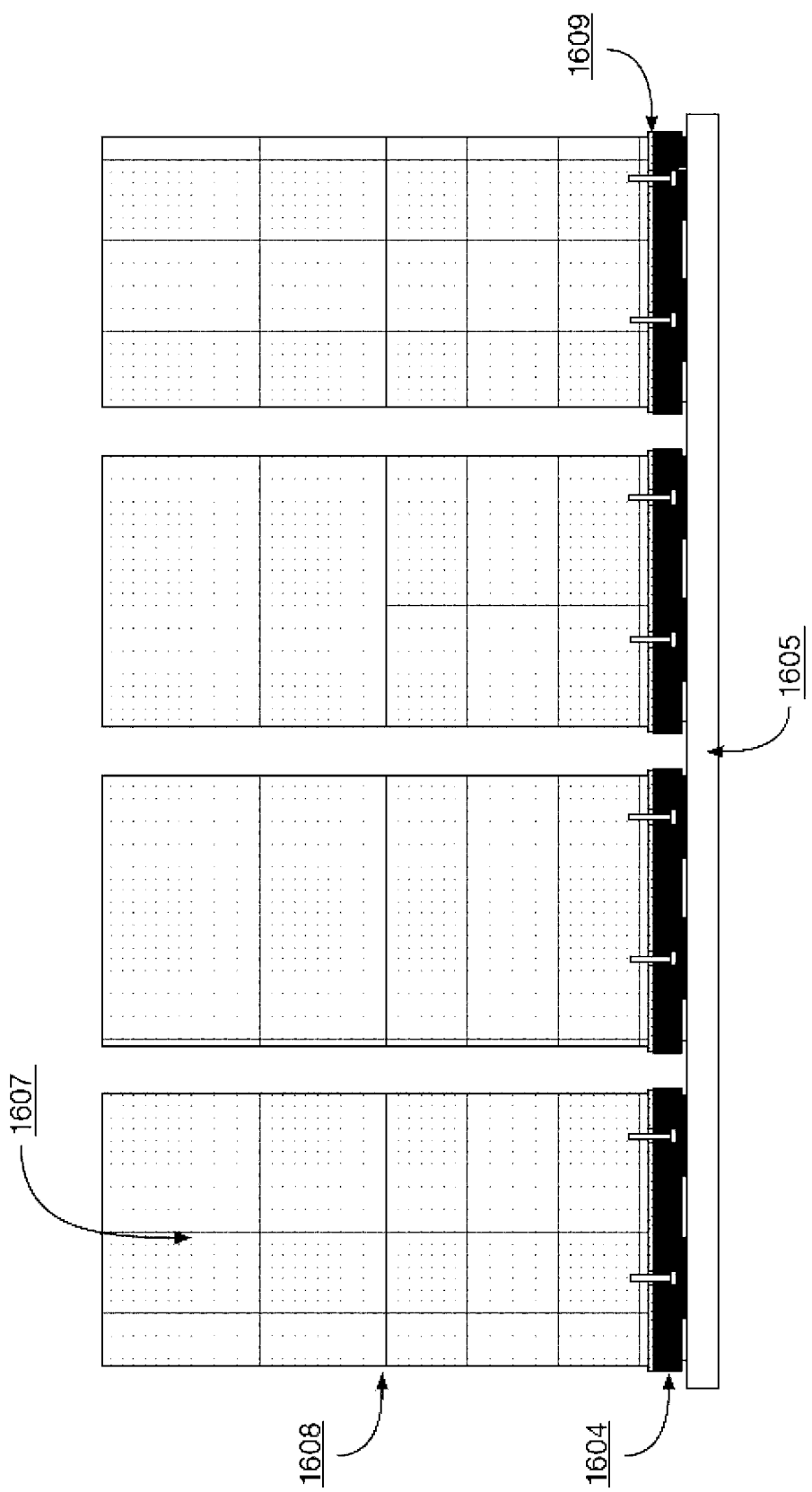
FIGS. 24 and 25 illustrate a detector array and subsystem comprising single scintillation crystals individually coupled to an array of pulse producing elements in the form of silicon photomultipliers by means of an optical coupling layer interposed between the scintillation crystals and silicon photomultipliers according to an embodiment.
Figure 25:
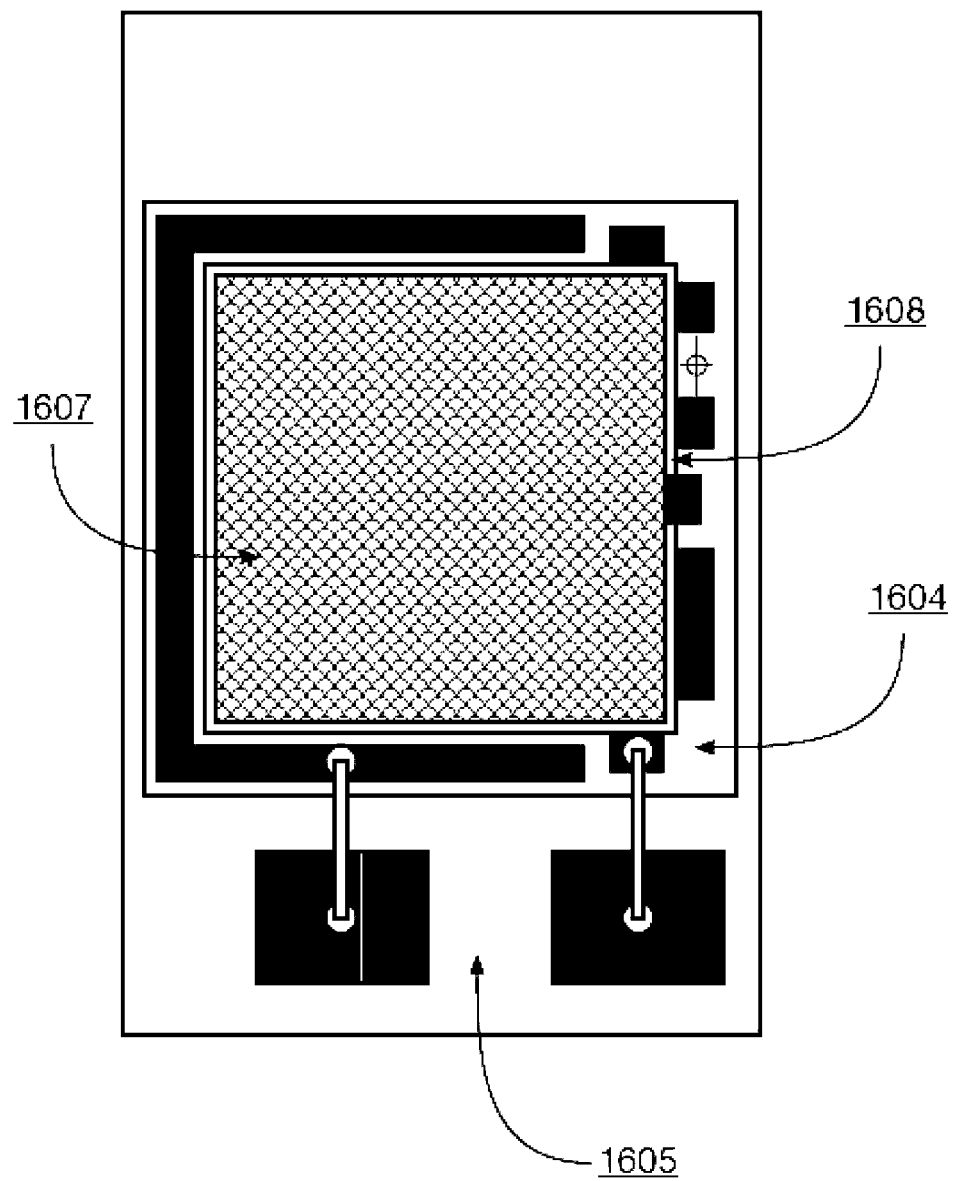
Figure 26:
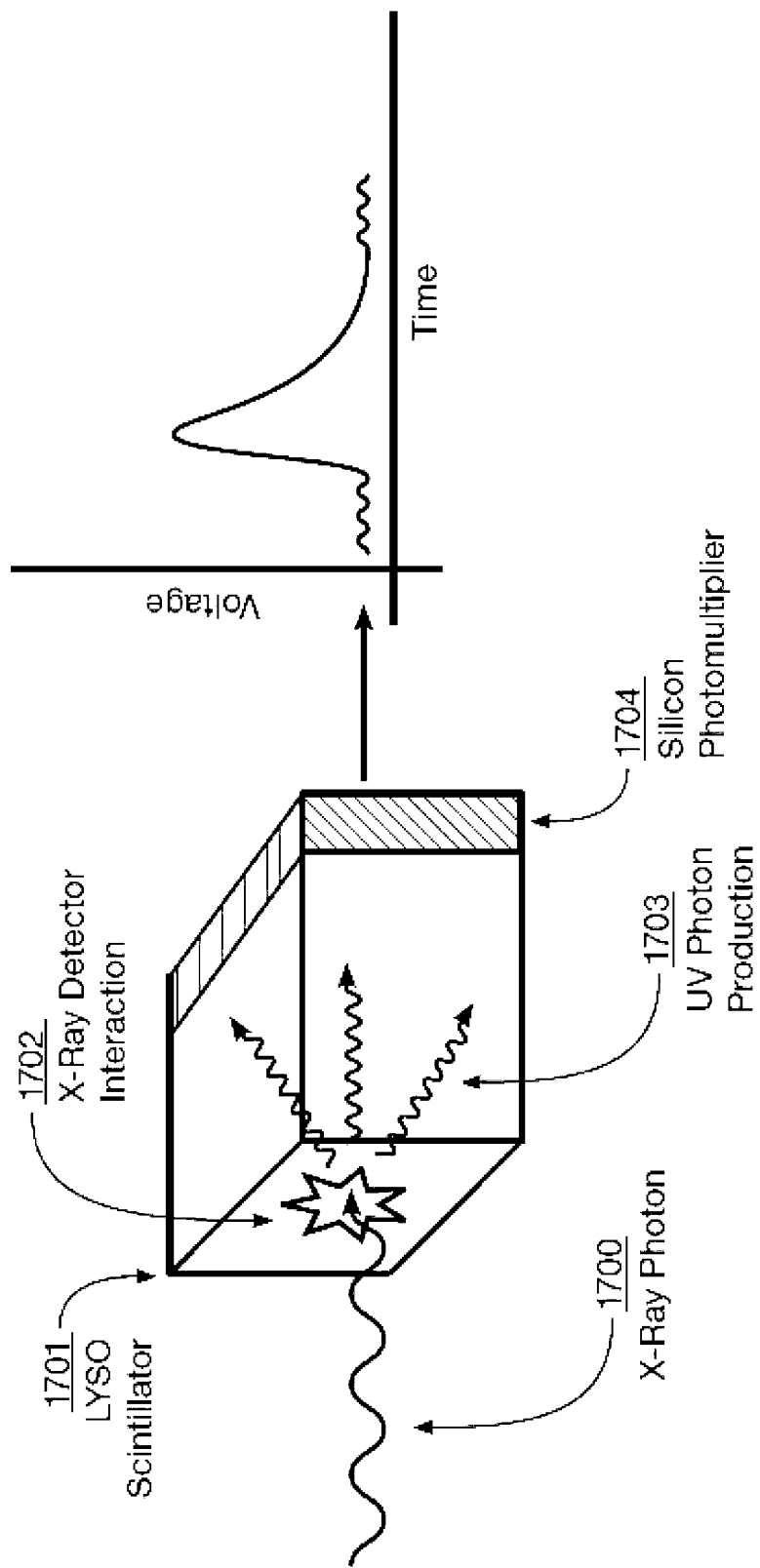
FIG. 26 illustrates a detector subsystem converting photons into voltage pulses for pulse processing according to an embodiment.

In another embodiment, scintillation crystals (1607) may be individually coupled to electrical pulse producing elements (1604), as depicted in FIGS. 23 and 24. Coupling may be achieved by a number of methods, for example interposing an optically transparent adhesive film (1609) or optical coupling material between the scintillation crystals (1607) and electrical pulse producing elements (1604), where the electrical pulse producing elements (1604) may comprise SiPMs or an MPCC. Coupling may be performed by a 'pick and place' assembly machine to individually align and couple components and coupling material. Scintillation crystals may be wrapped in a reflective material such as a foil or ESR material (1608) to aid in the capture of photons.

In any of the embodiments, the LSYO crystals (1600, 1607) may typically have a cross-section (width) approximately 1-2 mm, a depth of approximately 1-2 mm, and height of approximately 3-5 mm, where the reflective or ESR film (1601, 1608) is approximately 0.05 mm-0.1 mm thick. In a preferred embodiment of the detectors shown in FIG. 23 the cross-section is 1.62 mm, the depth is 1.24 mm, the height is approximately 4.07 mm, and the ESR film is 0.07 mm thick. The cross sectional area of the scintillator material is preferably greater than 1 mm square, and may be greater than 2 mm square and less than 5 mm square.

While the exemplar detector subsystem design uses a scintillator which is compact, robust, cost effective and non-hygroscopic, in the broadest aspect of the invention other detector subsystems can be considered. These include detector subsystems which use alternate inorganic or inorganic scintillator materials, the characteristics of some such material are provided in Table 1. Other mechanisms for converting radiation photons into electrical signals could also be considered for the detector subsystem. Some examples of other detector materials options include:

a) High Purity Germanium (HPGe): Achieves 'gold standard' resolution of 120 eV for the Fe55 X-ray line at 5.9 keV, detectors can be made >10 mm thick thus detect high energy X-rays up to many 100s of keV.
b) Silicon Drift Diode (SDD): SDD detectors measuring relatively low energy radiation. For the same Fe55 line at 5.9 keV SDD detectors have a resolution of approximately 130 eV. Also, these detectors can be operated at higher count rates than HPGe detectors and just below room temperature.
c) PIN Diodes: The detection efficiency for X-rays up to 60 keV is substantially higher than SDD detectors and falls off to approximately 1% for X-ray energies above 150 keV. These detectors can be operated at room temperature, however, resolution improves with cooling, resolution of the 5.9 keV line is ~180 eV,
d) Cadmium Zinc Telluride: Is a room temperature solid state radiation detector used for the direct detection of mid-energy X-ray and Gamma-ray radiation. It has a detection efficiency for 60 keV X-ray very close to 100% and even for X-rays photons with energies of 150 eV the detection efficiency remains greater than 50%.
e) Cesium Iodine (CsI(Tl)): This is a scintillation material used for detection of X-rays in medical imaging and diagnostic applications. The scintillation material is used to convert the X-ray into photons of light which are generally then converted into an electrical signal either by a photomultiplier tube. CsI is a cheap and dense material and has good detection efficiency of X-rays and Gamma-ray to many 100s of keV.

TABLE 1 properties of a range of scintillator materials.

| Scintillator | Density | Emission Max. (nm) | Refractive Index | Primary Decay Time (ns) | Light Yield (Ph/MeV) |
|---|---|---|---|---|---|
| NaI(Tl) | 3.67 | 415 | 1.85 | 230 | 38,000 |
| CsI(Tl) | 4.51 | 540 | 1.8 | 680 | 65,000 |
| CsI(Na) | 4.51 | 420 | 1.84 | 460 | 39,000 |
| Li(Eu) | 4.08 | 470 | 1.96 | 1400 | 11,000 |
| BGO | 7.13 | 480 | 2.15 | 300 | 8,000 |
| CdWO4 | 7.9 | 470 | 2.3 | 1100 | 15,000 |
| PbWO4 | 8.3 | 500 | — | 15 | 600 |
| GSO | 6.71 | 440 | 1.85 | 56 | 9,000 |
| LSO | 7.4 | 420 | 1.82 | 47 | 25,000 |
| LSYSO | 7.2 | 420 | 1.52 | 42 | 28,000 |
| YAP(Ce) | 4.56 | 370 | 1.82 | 27 | 18,000 |
| YAG | 4.55 | 350 | 1.94 | 27 | 8,000 |
| BaF2(fast) | 4.88 | 220 | 1.54 | 0.6 | 1,400 |
| LaCl3(Ce) | 3.79 | 330 | 1.9 | 28 | 46,000 |
| LaBr3(Ce) | 5.29 | 350 | — | 30 | 61,000 |
| CaF2(Eu) | 3.19 | 435 | 1.47 | 900 | 24,000 |
| ZnS(Ag) | 4.09 | 450 | 2.36 | 110 | 50,000 |

TABLE 2 performance data for LYSO scintillators.

| Geometrical Data | | |
|---|---|---|
| Active Sensor Area | 3.0 × 3.0 | mm² |
| Micropixel Size | 50 × 50 | μm² |
| Number of Pixels | 3600 | |
| Geometrical Efficiency | 63% | |
| Spectral Properties | | |
| Spectral Range | 300 to 800 | nm |
| Peak Wavelength | 420 | nm |
| PDE at 420 nm [2] | >40% | |

TABLE 2-continued performance data for LYSO scintillators.

| Gain M [1] | ~ 6 × 10⁶ | |
|---|---|---|
| Temp. Coefficient [1] | $\left\|\frac{1}{M} \cdot \frac{\partial M}{\partial T}\right\| < 1\%$ | °C⁻¹ |
| Dark Rate [1] | <500 | kHz/mm² |
| Crosstalk [1] | ~24% | |
| Electrical Properties | | |
| Breakdown Voltage | 25 ± 3 | V |
| Operation Voltage | 10 - 20% | Over-voltage[1] |

[1] at 20% Overvoltage and 20°C.
[2] PDE measurement based on zero peak Poisson statistics; value not affected by cross talk and afterpulsing.

Processing Steps

The following sections outline the steps involved in processing each particular stage of the various algorithms.

1. Calibration

The material characterisation system comprises a large number of individual detectors. While each detector and associated electronics is ideally designed to have identical response to incident radiation, in practice this will not be possible. These variations between detectors result in detector to detector variation in energy spectrum output. By properly and fully calibrating the detection system, the energy spectra output from the pulse processing digital processors can be appropriately calibrated so they represent received X-ray intensity in known narrow energy bins.

1.1. Detector Pulse Calibration

Detector pulse calibration is used to identify the pulse characteristics for each detector required by the pulse processing system. The exact parameters required may vary, depending on the detection system. For typical applications using the pulse processing method disclosed in U.S. Pat. Nos. 7,383,142 and 8,812,268, the pulse is modelled as an averaged dual exponential of the form:

$$p(t) = \int_{t-T_a}^{t} A[\exp(-\alpha(\tau-t_0)) - \exp(-\beta(\tau-t_0))] d\tau \quad \text{(Equation 1)}$$

where $\alpha$ and $\beta$ are the falling edge and rising edge time constants respectively, $t_0$ is the pulse time of arrival, $T_a$ is the pulse averaging window, and A is a pulse scaling factor related to the pulse energy.

The processing requires the two parameters $\alpha$ and $\beta$, and the pulse form p(t) which can be obtained via an appropriate calibration method, or from knowledge of the design of the detection subsystem. A suitable method for estimating $\alpha$, $\beta$ and p(t) from received pulses is described below.

1.2. Detector Gain Calibration

Each detector subsystem, combined with an analog to digital converter, will have slightly different characteristics due to manufacturing variations. As a result of such component variations, the energy spectra will be scaled differently. Variations other than gain scaling are handled within the Baseline Offset Calibration or the Energy Calibration.

The objective of the gain calibration is to achieve alignment of the energy spectra output by the pulse processing electronics across all detectors. The need for absolute accuracy may be reduced or eliminated if per detector energy calibration is applied.

Gain calibration may be achieved in a number of ways. The following approach may be applied:
 1. Setup a known X-Ray source.
  a. A material with particular characteristics can be inserted into the beam. For example, lead (Pb) has a known absorption edge at 88 keV.

b. Make use of the known radiation of the detector material (e.g. LYSO), detected by itself (the self spectrum).
2. Measure the energy spectrum on each detector, as output by the pulse processing electronics.
3. Ensure sufficient data is obtained in order to achieve a smooth spectrum with minimal noise.
4. Select a feature or features on which to perform the alignment. For example,
   a. A specific peak in the spectrum
   b. An absorption edge (for the case of Pb)
   c. The entire spectrum shape (appropriate for LYSO self spectrum)
5. Compute the histogram bin corresponding to the feature location for each detector.
6. Compute the median of these feature location bins across all detectors.
7. The required gain for each detector is then computed as the ratio of median location to the specific detector feature location. Note: The median or other suitable reference (e.g. maximum or minimum) is chosen. Median is chosen so some channels are amplified, and some are attenuated, rather than attenuating all channels to the minimum amplitude.
8. The gains are then applied to each detector channel. The gain may be applied as an analog gain, digital gain, or combination of the two, depending on particular system functionality. For best results, at least part of the gain is digital gain, where arbitrarily fine gain variation can be achieved.
9. Re-measure the energy spectrum on each detector and confirm that the required alignment has been achieved.
10. If desirable, compute an updated/refined gain calibration for each detector, and apply the updated calibration to each detector.
11. Repeat steps 9 and 10 as often as desirable to achieve the required correspondence between spectra from all detectors.

For the methods of effective Z computation outlined in this disclosure, it has been found that spectral alignment to within 1-2% can be achieved and is desirable for accurate and consistent effective Z results.

In a practical implementation of the detection subsystem there may be a number of detector cards, each with a number of detectors. The total number of detectors may be several thousand or more. Results from one example of such a detector board are presented here. The example board comprises 108 detectors, with LYSO used as the scintillator material in this case. These detectors are packed into linear arrays of 27 detectors. Each detector board then uses 4×27 detector arrays to achieve a total of 108 detectors.

When X-rays are incident upon a detector, photons are emitted by the LYSO based on the energy of the incident X-ray. Each detector is placed above a SiPM, and it is the SiPM that detects and amplifies the emitted photons. The detectors are coupled to the SiPM via an optical grease. The gain of each SiPM is determined by the bias voltage applied, and the SiPM breakdown voltage. As a result of variations in the LYSO material, quality of coupling between the LYSO and the SiPM, and also variations in the SiPM gain and SiPM material properties, there can be considerable difference in the received pulse energy for a given incident X-ray energy.

Figure 16:
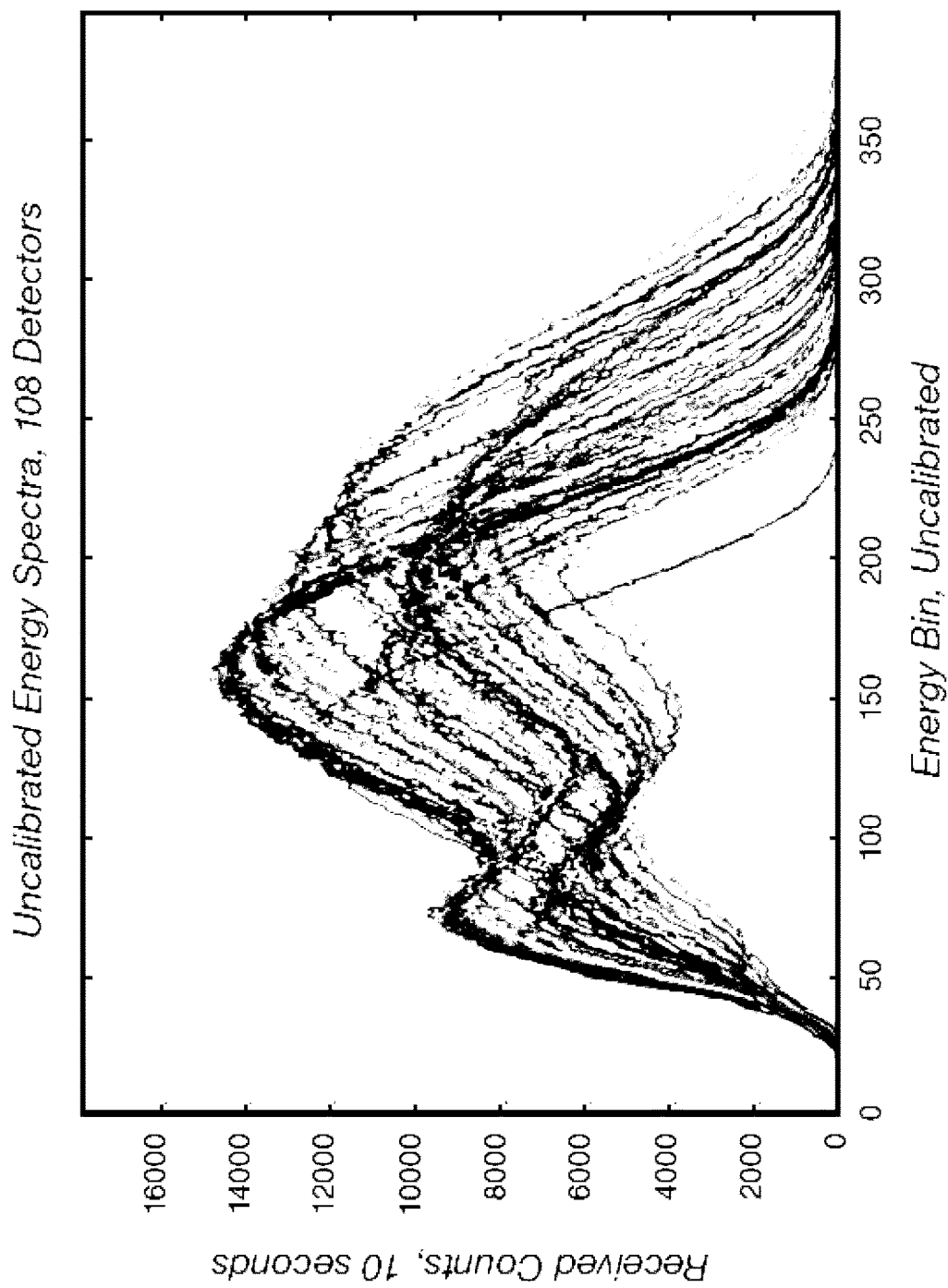
FIG. 16 is a graph illustrating the un-calibrated received spectra from a plurality of detectors according to an embodiment.

The effect of the variation in detected pulse energy is that the energy spectra from all detectors are not the same. This can be seen in FIG. 16, where the uncalibrated received spectra from all 108 detectors are plotted. These energy spectra are measured where a sample of lead (Pb) is in the X-ray beam, and the structure of the Pb spectrum is clearly seen. It can be seen that the tail of the energy spectrum spreads across a range of approximately 150 histogram bins. This means the actual energy per bin is quite different for each detector.

Figure 17:
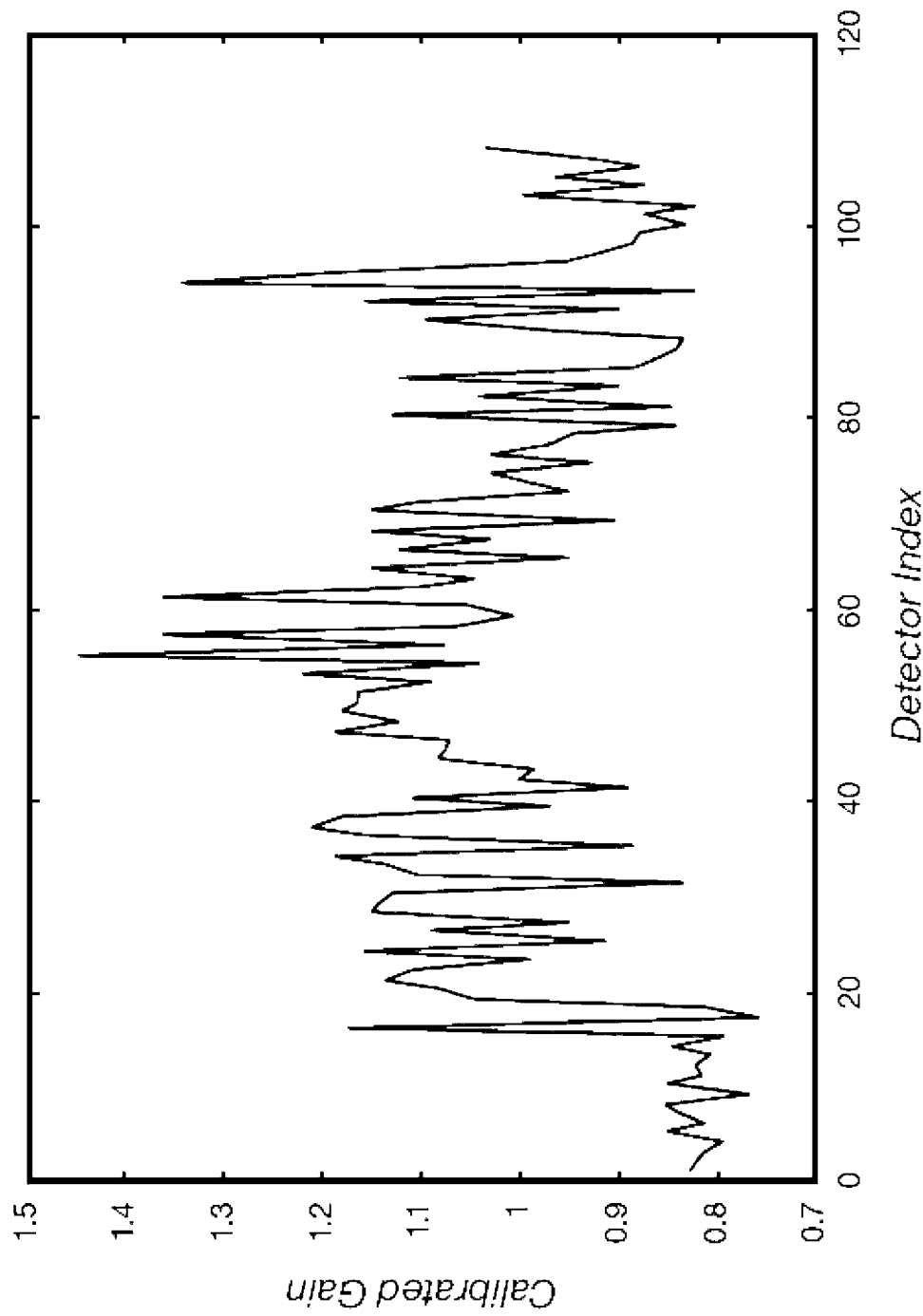
FIG. 17 is a graph illustrating a set of detector gains calculated based on a calibration procedure according to an embodiment.

By following the gain calibration procedure outlined above, a set of detector gains was computed, as shown in FIG. 17. From the figure, the calibrated gain value ranges from approximately 0.75 to 1.45.

Figure 18:
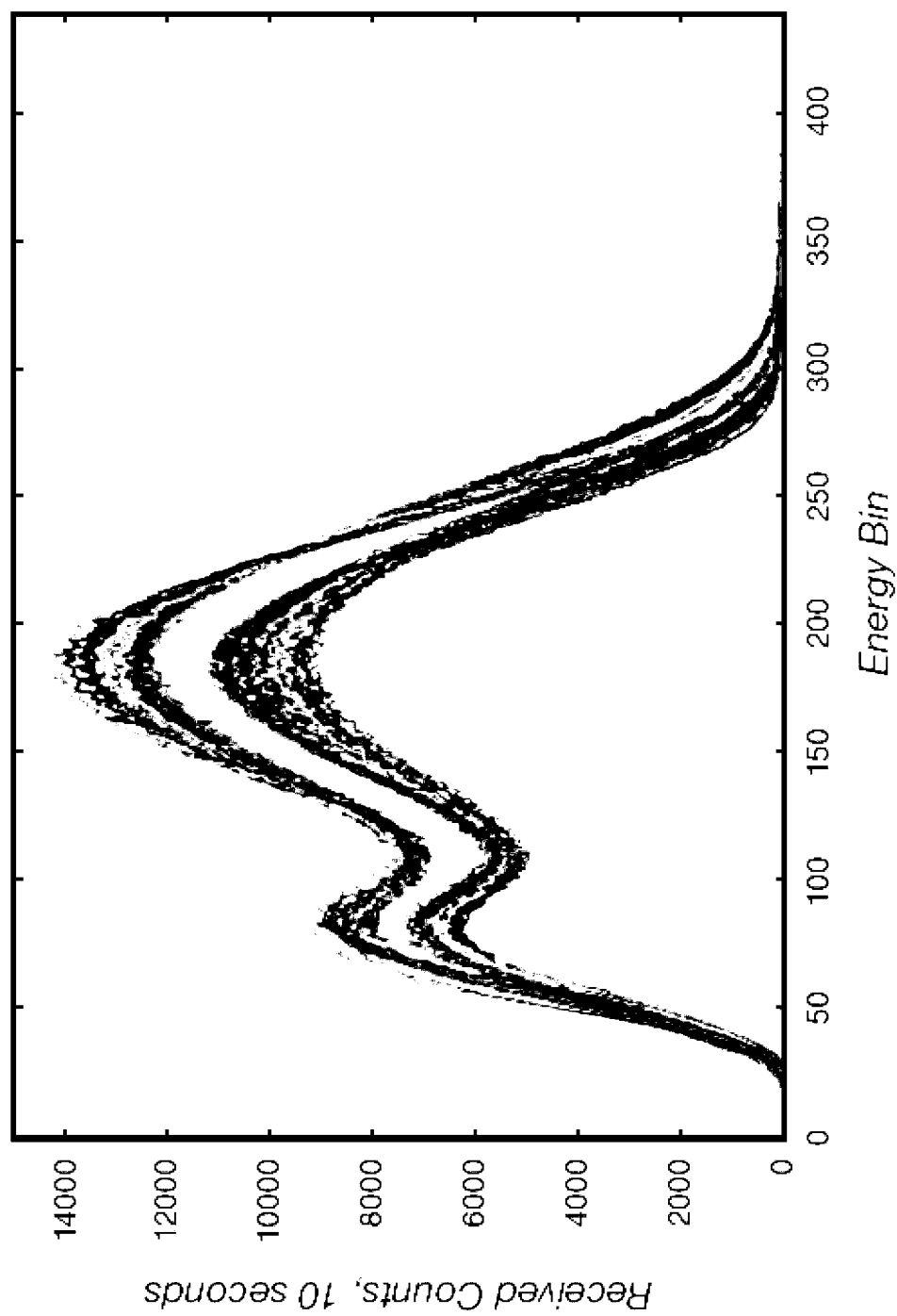
FIG. 18 is a graph illustrating the received spectra from a plurality of detectors after setting the digital gain of the detectors based on the detector gains illustrated in FIG. 17.

After setting the digital gain to be equal to the detector gains in FIG. 17, the Energy spectra from the 108 detectors were re-measured, as shown in FIG. 18. It is clear the energy spectra are now well aligned, indicating the success of the gain calibration. The different spectrum amplitude levels reflect the range of factors discussed above that can affect the resulting energy spectrum. In this case, some detectors are capturing an overall greater number of X-rays than others, indicated by the higher spectrum amplitude. Nonetheless, the alignment of the spectral features is very good as required.

1.3. Baseline Offset Calibration

Each detector subsystem may have a slightly different baseline level, as measured at the output of the analog to digital converter. In order for the pulse processing electronics to accurately estimate the energy of received pulses, the baseline is estimated and removed. Any suitable method can be used including, for example:
1. Offline measurement of baseline offset (with X-rays off):
   a. Record and average a series of samples from the detector
   b. Use this average as the baseline offset to be subtracted from all data
2. Online baseline offset tracking and adaptation:
   a. Use the pulse processing output to estimate and track baseline offset
   b. Filter the (noisy) tracked baseline values and update the baseline offset register accordingly
   c. Use an initial period of convergence with X-rays off, followed by continuous adaptation while X-rays are on 1.4. Energy Calibration The pulse processing electronics will produce an energy spectrum that is uncalibrated. That is, the output will comprises a number of counts in a set of histogram bins, but the exact energy of those histogram bins is unknown. In order to achieve accurate effective Z results, knowledge of the energy of each bin is required.

This is achieved as follows:
1. Use a source with known spectrum peaks. One suitable example is a Ba133 source, with spectral peaks at 31, 80, 160, 302 and 360 keV
2. Measure the uncalibrated energy spectrum.
3. Determine the histogram bins corresponding to the known spectrum peaks Instead of using a single source with multiple peaks, it is also possible to use a narrow band source with variable (but known) energy, and measure the histogram bin as a function of energy for a range of energies.

Once a relationship between histogram bins and energy has been measured, it is possible to either:
1. Create a lookup table for the energy of each histogram bin.
2. Estimate parameters of a suitable functional form. For a LYSO/SiPM combination it has been found a quadratic model fits the observed parameters very well. This gives a result of the form:

$$\text{Histogram Bin} = A*\text{Energy}^2 + B*\text{Energy} + C \quad \text{(Equation 2)}$$

where A, B and C are constants determined from the measured Ba133 spectrum. This formula is inverted to define Energy as a function of Histogram Bin expressed in terms of the same A, B and C.

If the variation between detectors is sufficiently small (requiring good component matching and good gain calibration), then a single energy calibration can be applied to all detectors. In this case, averaging the calibration parameters across a number of detectors exposed to the Ba133 source will yield a superior estimate of the Energy Calibration parameters.

Alternatively, individual calibration table/calibration parameters can be generated for each detector.

1.5. Count Rate Dependent Baseline Shift

Depending on detector/photomultiplier combination, it may be desirable to compensate for a count rate dependent baseline shift. The consequence of this shift is a right shift of the energy spectrum as count rate increases. To properly apply the energy calibration, the spectrum is moved back to the left by a specified number of bins/energy. The calibration required is either:

a) A lookup table, defining baseline shift for each count rate, with intermediate results obtained via interpolation.

b) A functional form, where baseline offset is expressed as a function of count rate.

Any suitable method can be used for this calibration, including injecting a known source spectrum of variable count rate, and recording the spectrum shift as count rate increases. Ideally the source has a narrow energy band so the shift can be clearly measured, and also variable energy so the offset can be calibrated as a function of energy if desirable.

The need for removal of count rate dependent baseline shift can be diminished or even eliminated if online baseline offset tracking and removal is used.

1.6. Residual Spectrum Calibration

The residual spectrum is measured with a large mass of material in the beam, sufficient to completely block the X-ray beam, such as a large thickness of steel. In practice, a small level of energy still reaches the detector array, whether from scatter or other mechanisms, and this residual spectrum must be measured so it can be removed from the received spectra during normal operation.

The residual spectrum is then measured by averaging the received spectra for a number of gate intervals with the blocking mass in the beam.

1.7. Pileup Parameters

The pileup parameters can be calibrated in several ways, for example:

a) Estimation of pileup parameters from the nature of the received spectra.

b) Estimation of pileup parameters from knowledge of the signal, the received pulse count rate, the ADC sampling rate and the pulse detection method.

c) Measurement of the pileup parameters as follows:
 i. Use a narrow energy source, where the energy and count rate can be varied.
 ii. Measure the received spectrum as the source energy and count rate are varied.
 iii. Directly measure the ratio of received 2-pulse and 3-pulse pileup to the main signal peak.
 iv. Form a lookup table of 2-pulse and 3-pulse pileup as a function of count rate and energy.

2. High Rate Pulse Processing

A high rate pulse processing system (305), such as those disclosed in U.S. Pat. Nos. 7,383,142, 8,812,268 or WO/2015/085372, is allocated to each detector subsystem, to perform the following operations on the digitised pulse signal output from the analog to digital converter:

a) Baseline tracking and removal, or fixed baseline removal.

b) Detection of incoming pulses.

c) Computation of the energy of each detected pulse.

d) Accumulation of the computed energy values into an energy histogram (energy histogram)

e) Output of the accumulated histogram values each time a gate or other timing signal is received f) Reset of the histogram values for the next collection interval.

3. Intensity Image

The intensity value, or more specifically transmission value, is computed from the energy spectrum generated for each detector i at each gate interval j according to:

$$R(i, j) = \frac{\sum_B I(B)}{\sum_B I_0(B)} \quad \text{(Equation 3)}$$

where the summations are performed over all histogram bins B (or equivalently, over all energies E), for the received energy spectra (I(B)) and reference energy spectra ($I_o$(B)).

Elements within the intensity image may be classified as:

a) Impenetrable, if $R(i,j) < R_{low}$, and set to 0.

b) Empty, or nothing in beam, if $R(i,j) > R_{high}$, and set to 1.

The thresholds $R_{low}$ and $R_{high}$ may be pre-set or user configurable.

4. High Contrast Images

Through use of a full energy spectrum, intensity images with varying contrast are generated based on integrating the received spectrum across different energy bands. In existing dual energy X-ray scanners, the system can only utilise the broad energy range inherent in the detector material. When a full energy spectrum is available, arbitrary energy ranges can be used to generate associated intensity images in that energy range. Specific energy ranges can then be defined in order to best isolate and display particular material types, with energy ranges tuned, for example, for organic material, inorganic material, or light, medium or heavy metals.

The high contrast/high penetration images are generated for each detector i at each gate interval j according to:

$$R_{E12}(i, j) = \frac{\sum_{E1}^{E2} I(E)}{\sum_{E1}^{E2} I_0(E)} \quad \text{(Equation 4)}$$

where E1 and E2 are the lower and upper limits of energy range E12. The energy band may be user defined or pre-configured. One, two or more different energy bands may be configured to enable the user to select between images of interest.

5. Effective Z Processing

The effective Z processing involves the use of full energy spectra computed by the pulse processing electronics, combined with the energy calibration, to compute an estimate of the effective Z of the sample material. The effective Z processing is performed for every detector, and for each detector proceeds as follows (so for a 1×N detector array, this process is repeated N times). To reduce computational requirement, the effective Z processing is only performed for received detectors i and gate intervals j that are not declared either impenetrable or empty.

Figure 10:
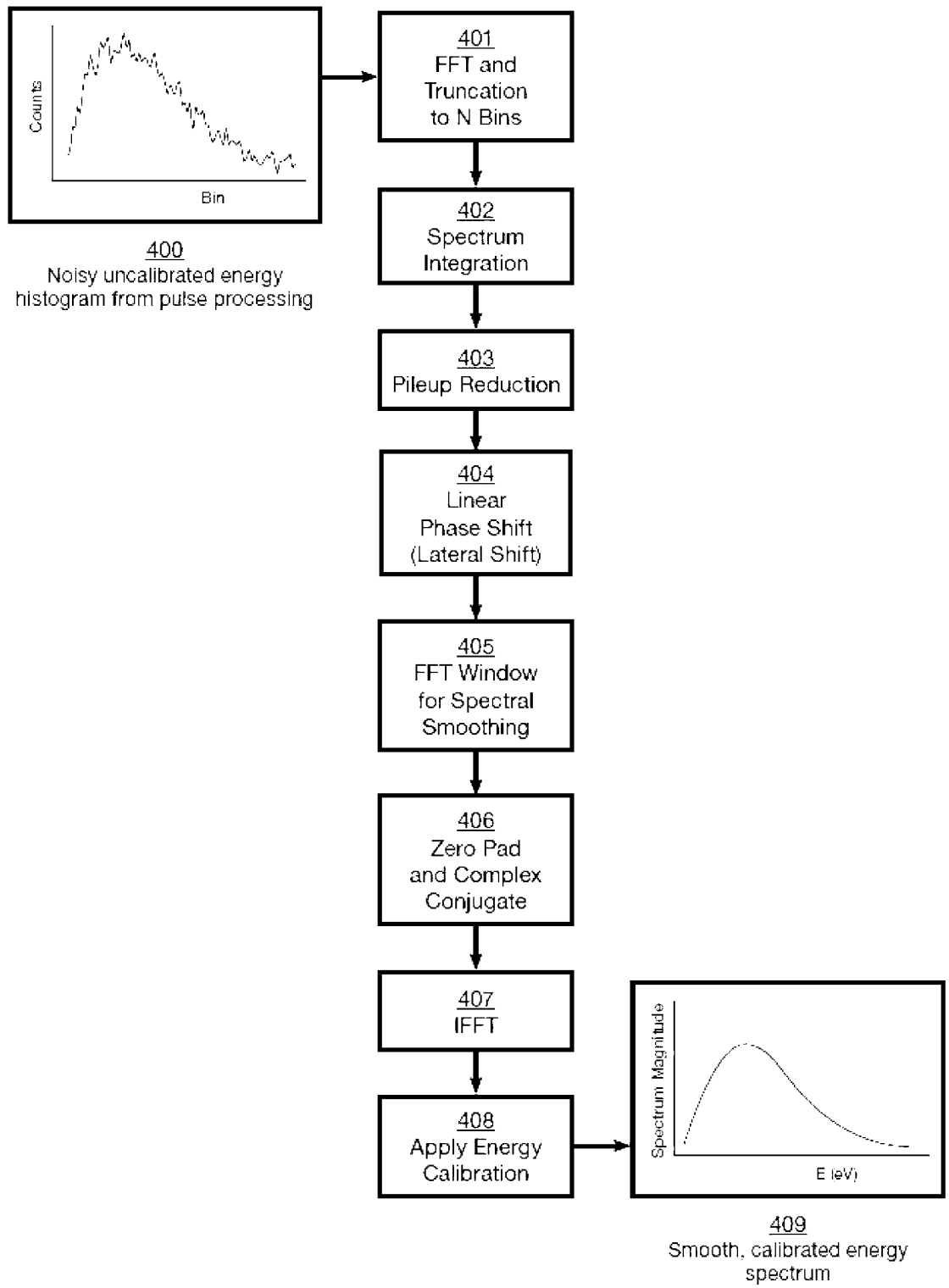
FIG. 10 illustrates a flowchart for a method of effective Z processing of the full energy spectra computed by the pulse processing electronics according to an embodiment.

5.1. Preliminary Operations.
1. With reference to FIG. 10, compress the energy spectrum data (400) using an FFT, and discard all but the first N bins (which are selected such that the discarded bins contain little or no signal). Note: this step is optional, but for a system configuration where effective Z is computed on a central processing computer, it enables a significant communication bandwidth reduction. Transfer of 32 complex FFT bins for a 512 point histogram requires only ⅛ of the communication bandwidth.
2. Perform spectrum integration (402), by averaging a number 2S+1 of received FFT'ed energy spectra. This spectrum integration increases the measurement time available for computing the effective Z without reducing the spatial resolution at which the intensity image is computed. The integration is done across gate intervals j−S≤j≤j+S, so as to perform a moving average centered on gate interval j. If no integration is required, set S=0.
3. Perform pileup reduction (403). The FFT is the first stage of the pileup reduction, which is not required if data compression has already been achieved using an FFT. The pileup reduction can be achieved with a suitable algorithm as outlined below.
4. If desirable, apply a FFT domain phase shift (404) in order to achieve a desired lateral shift of the energy spectrum. This step has been found to be desirable where a count rate specific baseline shift exists. Note: multiplication by a linearly increasing (with FFT bin) phase term in the FFT domain results in a lateral shift after iFFT. The extent of the lateral shift is determined by the slope of the linear increase.
5. Prior to iFFT, apply a frequency domain window (405). This window can be used to design a desired smoothing of the energy spectrum. The window design process is outlined below. A good window has been designed to achieve a smooth filtering of the energy spectrum. Filtering of the noise in the energy spectrum allows the possibility of using a reduced number of energy bins in the effective Z computation for overall improvement in computational efficiency.
6. Zero pad the FFT data, insert the complex conjugate into the second half of the FFT buffer (406), and apply iFFT (407). At this point a smoothed energy spectrum is obtained in the form of a histogram.
    The zero padding inserts data that was truncated after the FFT. It is not essential to insert zeros for all truncated bins. For example, padding less zeros can produce a smaller FFT buffer which it is more computationally efficient to compute the IFFT. For a real vector x, and FFT size 2N, the elements N+2 to 2N of the FFT output are the complex conjugate of the elements 2 to N. Here N+1 will be one of the elements set to zero by the zero padding.
7. Subtract the residual spectrum for each detector. As noted previously, this removes any spectrum that would be present even in the presence of a completely blocking material.
8. Apply the energy calibration curve/function (408) to convert the histogram bins into energy values. Note: Alternatively the energy calibration can be applied within the effective Z routine itself. At this stage the output is a smooth calibrated energy spectrum (409).
9. If required, perform spectrum integration across adjacent detectors so integration over 2P+1 energy spectra for detectors i−P≤i≤i+P. While integration over gate intervals can be performed in the FFT domain, integration over adjacent detectors can only be performed after energy calibration has been applied, since the raw histogram bins of adjacent detectors may not correspond to the same energy. By performing 2D spectrum integration the material identification performance can be improved compared to performing the effective Z processing on a single pixel.

5.2. Reference Spectrum Measurement.

In order to compute effective Z (and also the intensity/high contrast images), a reference spectrum is obtained with X-rays on, but before the sample reaches the X-ray beam. Within a given machine design, there will be a delay between the time X-rays are turned on and when the sample reaches the X-ray beam during which the reference spectrum can be collected.

The process is as follows:
1. Turn on X-rays.
2. Wait for X-ray beam to stabilise. This can be achieved by a time delay or by filtering X-ray counts until the variation diminishes below a specified threshold.
3. Collect and sum N X-ray energy spectra $I_0(E, n)$ (that is, collect the energy spectrum recorded at the end of N successive gate intervals) at the output of pulse processing electronics.
4. Divide the sum of spectra by N to compute an average reference spectrum so $$I_0(E) = \frac{1}{N} \sum_{n=1}^{N} I_0(E, n) \quad \text{(Equation 5)}$$

where $I_0(E)$ is the reference number of counts at energy E, N is the number of gate intervals, and E is the energy level of the X-rays.

If at any time during the reference collection a sample is detected in the X-ray beam, then the accumulation of reference spectra ceases and the average of M collected spectra can be used for the reference, or the measurement terminated if M is insufficient.

5.3. Load or Create a Table of Mass Attenuation Constants

The mass attenuation constants for a given effective Z and given energy define the extent to which the given material Z will attenuate X-rays of energy E. In particular, the intensity of received energies at a particular energy will be given by:

$$I(E) = I_0(E) \exp(ma(Z,E)\rho x) \quad \text{(Equation 6)}$$

where I(E) is the received number of counts at energy E, $I_0(E)$ is the reference number of counts at energy E, ma(Z,E) is the mass attenuation constant for material with effective atomic number Z at energy E, ρ is the material density and x is the material thickness relative to the reference thickness used in the creation of the mass attenuation data.

Mass attenuation data is available at a finite (small) number of energies, perhaps every 10, 20 or 50 keV, whereas the energy spectra created by the method disclosed in this disclosure may be generated at energy spacing as little as 1 keV or even less. In practice a finite number of these energy values will be selected for use in the effective Z computation.

In order to achieve a smooth mass attenuation table at all energies in the energy spectrum, data for intermediate energies for each Z are obtained using cubic spline interpolation or other suitable interpolation method. The mass attenuation values as a function of energy are considered sufficiently smooth that a cubic spline is a good interpolation method to apply.

5.4. Effective Z Computation

The effective Z processing then proceeds as follows:

1. For each detector, and each gate period (a specified detector at a specified gate period defining a pixel in the resultant image), a calibrated energy spectrum will be measured as outlined elsewhere. Effective Z processing is not performed for energy spectra classified as impenetrable or empty.
2. Determine a set of energy bins to be used for effective Z computation.
   a. Based on the received spectrum, identify the energy region where sufficient counts are received.
   b. These will be the spectrum bins where the counts exceed some predetermined threshold.
   c. Alternatively, determine the energies where the transmission (ratio of received to reference spectrum) exceeds a threshold.
3. For each Z value for which mass attenuation data is available at each of the energy bins, perform the following operations:
   a. Estimate the material thickness for the assumed Z. One possible method is to estimate the thickness at one energy value E according to $$\overline{\rho x}(Z) = -\log\left(\frac{I(E)}{I_0(E)}\right)\frac{1}{ma(Z,E)} \quad \text{(Equation 7)}$$

where $I(E)$ is the received number of counts at energy E, $I_0(E)$ is the reference number of counts at energy E, $ma(Z,E)$ is the mass attenuation constant for material with effective atomic number Z at energy E, $\rho$ is the material density and x is the material thickness relative to the reference thickness used in the creation of the mass attenuation data.

An improved thickness estimate can be obtained by averaging the thickness estimate at a number of energies to reduce the impact of noise at the single energy. It is not desirable to estimate x explicitly, the combined parameter $\rho x$ is sufficient.

b. Compute a predicted spectrum for this Z, based on the reference spectrum recorded previously, the thickness parameter and the ma table according to $$\hat{I}(Z,E) = I_o(E)\exp(\rho \overline{x(Z)} ma(Z,E)) \quad \text{(Equation 8)}$$

computed at all selected energies E, where $\hat{I}(Z,E)$ is the predicted spectrum.

c. Compute a cost function for this Z as the sum of the squared errors between the received spectrum and the predicted spectrum under the assumption of material Z $$C(Z) = \Sigma_E w(E)[I(E) - \hat{I}(Z,E)]^2 \quad \text{(Equation 9)}$$

where $C(Z)$ is the cost function, and $w(E)$ represents weights for each sum of the squared errors between the received spectrum and the predicted spectrum.

The weights $w(E)$ can be chosen to be unity, or alternatively $w(E) = I(E)$ will result in a cost function that gives lower weight to regions of the received spectrum where the number of counts is small, and greater weight to regions where more counts are received.

4. For this pixel (constituting an energy spectrum received from a specific detector during a specific gate period), compute the estimated effective Z as the Z value which minimises the cost function:

$$\hat{Z} = \min_{Z} C(Z) \quad \text{(Equation 10)}$$

It should be noted that there is no particular requirement for effective Z to be integer, and in fact the mass attenuation table may contain values for non-integer values of Z representing composite materials. However, it is clearly not possible to represent a continuum of possible Z values in a finite table. In order to compute Z to arbitrary precision, it is possible to interpolate the cost function to the required resolution using an appropriate interpolation algorithm. The value of Z chosen is then the value which minimises the interpolated cost function. The cost function $C(Z)$ is a smooth function, and therefore an actual floating point or continuous value of Z which minimises this smooth function can be reliably predicted from the curve via some form of interpolation.

In addition, it is also noted that step 3 above indicates the cost function is computed for all available Z values in the mass attenuation table. In practice, depending on the behavior of the cost function, efficient search methods can be applied to reduce the computational requirements. Such methods include one or more of the following:

1. Gradient search
2. Best first search
3. Some form of pattern search

The cost function form has been chosen so as to be relatively insensitive to noise on the spectrum.

6. Effective Z Processing Using Material Calibration

In practice, due to detector and processing characteristics that can be difficult to characterise, it can be difficult to achieve accurate energy calibration across all detectors, all count rates and all spectrum bins.

An alternative method has been developed whereby the system is calibrated using varying thickness samples of known materials. The aim is to calibrate the expected received spectra as a function of material, material thickness, and energy histogram bins. This avoids the requirement for absolute energy calibration, and also largely avoids the effect of spectrum shift with count rate (if present). The need for pileup removal may also be eliminated.

6.1. Material (Self) Calibration Process

Ideally, with good gain calibration, the received spectra from all detectors are consistent with each other, and so it is only desirable to obtain calibration data at one detector for use at all detectors. In practice, it is likely to be desirable to obtain calibration data for groups of adjacent detectors or possibly every detector, depending on the consistency between detectors.

The first step in the calibration process is to obtain a reference spectrum $I_0(B)$ at each histogram bin B, with no material in the X-ray beam for the detector(s) to be calibrated. Histogram bins will now be denoted by B rather than E to denote that there is no requirement to calibrate the bins in terms of their exact energy.

Then, for each material, to calibrate:
1. Ascertain the effective Z of the material (either by independent measurement, or by specification of material purity).
2. Obtain a "step wedge" of the material. That is, a sample of the material that comprises a series of steps of known thickness x. The largest step is ideally sufficient to reduce the X-ray beam to a level where it can be considered impenetrable. Note: other material samples can be used, but such a step wedge is a convenient form to calibrate against.
3. Scan the step wedge at the required detector location. The result will be a series of uncalibrated energy spectra recorded along each step of the material (the number of spectra will depend on the sample dimensions, the scanning speed and the gate period).
4. Sum the spectra received on each step to minimise the noise in the spectra. These spectra are denoted $I(Z, B, x)$, since they are a function of the material, the histogram bin and the material thickness. Note also that $I(Z, B, 0)$ is just the reference spectrum $I_0(B)$.
5. Compute the transmission characteristic for all materials, histogram bins and thickness as $$Tx(Z, B, x) = \frac{I(Z, B, x)}{I_0(B)} \quad \text{(Equation 11)}$$

6. Compute the total transmission as a function of Z and x as $$R(Z, x) = \frac{\sum_B I(Z, B, x)}{\sum_B I_0(B)} \quad \text{(Equation 12)}$$

again noting that $R(Z, 0)=1$ for all Z

The tables of $Tx(Z, B, x)$ and $R(Z, x)$ together form the calibration tables that are used to estimate effective Z at each pixel (detector/gate interval). As previously stated, they may or may not be a function of detector also, depending on the equivalence of data from all detectors.

Clearly it is desirable to calibrate against samples of all possible materials, however in practice only a subset of the full continuum of materials and mixtures can be sampled. To achieve table entries for intermediate Z values it is desirable to interpolate both Tx and R functions to intermediate values of Z to expand the table coverage.

Having obtained the calibration tables, it is now possible to estimate effective Z for an unknown material sample as follows.

6.2. Preliminary Operations.

Preliminary operations are substantially the same as described above, with the following comments:
1. It may not be desirable to perform pileup removal.
2. It may not be desirable to perform lateral spectrum shift to compensate for count rate dependent baseline shift.
3. The frequency domain window is still required prior to iFFT.
4. The energy calibration curve is not applied, as there is no requirement for absolute energy calibration with this method, but removal of residual spectrum may still be required.
5. Integration of spectrum can be performed across gate intervals, and across detectors as described below.
6. The received spectrum will be denoted $I(B)$, the intensity in a series of histogram bins B. The use of B differentiates from the use of E for the previous section where the histogram bins are calibrated in terms of their actual energy.

6.3. Reference Spectrum Measurement.

The reference spectrum is obtained in exactly the same manner as described above, but is now denoted $I_0(B)$, denoting the use of histogram bins, rather than energy.

6.4. Effective Z Computation.

The effective Z processing then proceeds as follows:
1. For each detector, and each gate period (a specified detector at a specified gate period defining a pixel in the resultant image), an uncalibrated energy spectrum $I(B)$ will be measured as outlined in the "preliminary operations" section. Again, effective Z processing is not performed for energy spectra classified as impenetrable or empty.
2. Determine a set of histogram bins to be used for effective Z computation:
   a. Based on the received spectrum, identify the region where sufficient counts are received.
   b. These will be the spectrum bins where the counts exceed some predetermined threshold. Choose B: $I(B) > I_{min}$
   c. Alternatively, determine the bins where the transmission (ratio of received to reference spectrum) exceeds a threshold.
   d. Alternatively, use all available histogram bins and apply a weighting in the cost function to remove undesired bins from the cost calculation.
   e. Note: ultimately reducing the total number of histogram bins processed will achieve improved computational efficiency, so use of every bin is not ideal.
3. Compute the total received X-rays as a ratio to the reference.

$$R = \frac{\sum_B I(B)}{\sum_B I_0(B)} \quad \text{(Equation 13)}$$

4. For each Z value for which calibration data is available, perform the following operations:
   a. Estimate the material thickness from the total received transmission R and the calibration table values of $R(Z, x)$ for this material Z. This achieved via
      i. Interpolation of the curve of $R(Z, x)$ at the measured value of R to obtain a corresponding R, via for example cubic spline interpolation.
      ii. From the calibrated $R(Z, x)$ obtain a functional form $x=f(R, Z)$ to compute x as a function of material and transmission.
   b. From the table of $R(Z, x)$ find $x_1$ and $x_2$ such that $R(Z, x_1) \leq R < R(Z, x_2)$. Note that $x_1=0$ corresponds to the reference spectrum, and if the received transmission R is smaller than a table entry then use the final 2 entries for $x_1$ and $x_2$, and the result will be an extrapolation to a thicker material.
   c. Now use the calibrated transmission tables $Tx(Z, B, x)$ to determine local mass attenuation coefficients for each histogram bin according to:

$$\widehat{ma}(Z, R, B) = \log\left(\frac{Tx(Z, B, x_2)}{Tx(Z, B, x_1)}\right) \quad \text{(Equation 14)}$$

d. Then compute an expected received spectrum according to $$\hat{I}(Z, B) = Tx(Z, B, x_1)I_o(B)\exp\left(\left[\frac{\hat{x}-x_1}{x_2-x_1}\right]\widehat{ma}(Z, R, B)\right) \quad \text{(Equation 15)}$$

This expected received spectrum is an interpolated received spectrum between the nearest two calibration spectra, but based on the different attenuation observed at each bin. Other forms of interpolation between spectra could be used, but the material specific interpolation used here provides a superior interpolation result.

e. Compute a cost function C(Z) for this Z as the sum of the squared errors between the received spectrum and the predicted spectrum under the assumption of material Z $$C(Z) = \Sigma_B w(B)[I(B) - \hat{I}(Z, B)]^2 \quad \text{(Equation 16)}$$

The weights w(B) can be chosen to be unity, or alternatively w(B)=I(B) will result in a cost function that gives lower weight to regions of the received spectrum where the number of counts is small, and greater weight to regions where more counts are received.

5. For this pixel (constituting an energy spectrum received from a specific detector during a specific gate period), compute the estimated effective Z as the Z value which minimises the cost function:

$$\hat{Z} = \min_Z C(Z) \quad \text{(Equation 17)}$$

It should be noted that there is no particular requirement for effective Z to be integer, and in fact the self calibration table may contain values for non-integer values of Z representing composite materials. However, it is clearly not possible to represent a continuum of possible Z values in a finite table. In order to compute Z to arbitrary precision, it is possible to interpolate the cost function to the required resolution using an appropriate interpolation algorithm. The value of Z chosen is then the value which minimises the interpolated cost function. The cost function C(Z) is a smooth function, and therefore an actual floating point or continuous value of Z which minimises this smooth function can be reliably predicted from the curve via some form of interpolation.

The same form of efficient search methods can be used to reduce computation and avoid an exhaustive search over all materials Z in the calibration table.

6.5. System Adaptation

Some system parameters will vary over time, so the system adapts in order to maintain calibration over time:

1. Gain calibration update.
   a. Calibration spectra are measured during periods when X-rays are off
   b. Gain is updated according to changes observed in the measured spectra
   c. Gain is A*old gain+B*new gain, where A+B=1, and B will be small to avoid noise and allow slow adaptation.
2. Pulse calibration update.
   a. Periodically a new pulse calibration may be performed, although pulse parameters have been found to remain sufficiently constant over time that at most daily or perhaps weekly or monthly recalibration of pulse parameters may be required.
3. Baseline offset update
   a. This may be done during periods when X-rays are off, in the same way as the initial calibration is performed—a short dataset is required for baseline offset.
   b. Adapted continuously via a baseline tracking algorithm as described below.
4. Energy calibration, count rate dependent spectrum shift, pileup parameters and residual spectrum may require occasional off-line recalibration. It may also be found that for a given machine these rarely, if ever, require recalibration.

7. Effective Z Processing Example

The following is an overview of the process used to calibrate detector boards, in particular implementing a self calibrating process and with the option of using 'floating point' effective Z computation:

1. Obtain calibration wedges of known material, ideally pure or close to pure elements. For the current calibration, 3 materials were used:
   a. Carbon (Z=6)
   b. Aluminium (Z=13)
   c. Stainless steel (Z=approximately 26)
2. The step dimensions are chosen with the following in mind:
   a. A width of 30 cm is used to ensure a large number of detectors could be calibrated with 1 calibration scan.
      i. Projection mode is used to effectively increase the number of pixels that could be calibrated in
      ii. With 30 cm wedges, 2 calibration heights can cover the 5 detector boards with sufficient overlap to avoid edge effects.
   b. Step heights were determined to achieve a reasonably uniform transmission spacing from approximately <0.5% up to 95%.
      i. For carbon, achieving less than 0.5% transmission required approximately 300 mm of material.
      ii. For heavier metals, achieving 95% transmission required very thin samples, 0.5 mm and less. For metals such as tin (not used here) this was extremely difficult.
   c. Step length is 50 mm. When scanned at 4% normal speed, the scan speed is 8 mm per second, so approximately 6 seconds of data could be collected from each step. This is necessary to ensure very accurate calibration spectra, given the accuracy required from the eventual effective Z processing.
3. The material wedges are scanned, and the resulting data is processed offline in Matlab as follows:
   a. For each pixel of each scan, determine the start and end locations of the step.
   b. Allow some margin, to avoid any effects near the step edges.
   c. For each step identified:
      i. Extract the binary data corresponding to the measured spectrum at each slice of the step.
      ii. Integrate all data, so as to establish a very accurate spectrum (with >5 seconds of data)

iii. Compute the corresponding total intensity (relative to a long term average of the source spectrum measured during the same calibration run with nothing in beam)
d. Create a table for each step (intensity) of each material, containing:
i. A mapping of step thickness to step intensity. This table is used to interpolate any measured spectrum into an equivalent material thickness.
ii. A series of calibration spectra, including a reference spectrum. Each spectrum represents a material thickness, from which spectra for intermediate material thicknesses can be interpolated.

The calibration data for the 3 materials with Z=6, 13, 26 is adequate for the production of a 3 colour image, classifying the material as either organic (close to Z=6), inorganic/light metal (close to Z=13) or metal (close to Z=26). In order to achieve accurate effective Z estimation to separate materials down to +/−0.2 Z or better, it is necessary to obtain calibration data from a much larger set of materials, from which a continuous estimate of Z could then be obtained. It is not practical to run calibration scans for all materials from Z=3 to Z=92, so a range of additional calibration data sets were obtained by interpolation. Calibration sets for Z=3 to Z=13 were obtained from interpolation/extrapolation of the carbon and aluminium data sets. Calibration sets for effective Z=13 to Z=50 may be obtained from interpolation of the aluminium and stainless steel data sets.

For every pixel in the scanner, the procedure for obtaining the additional calibration data sets is as follows:

1. For each of Z=6, 13, and 26, interpolate the calibration spectra to a new set of intensities. For the current demonstration, the intensities (in percent) used were: 95, 90, 80, 70, 60, 50, 40, 30, 20, 15, 10, 6, 4, 2, 1, 0.5, 0.2. At this point there is now a calibration table for each material at a common set of intensities. The process now is to create calibration tables for other materials at those same set of common intensities.
2. For the current embodiment the set of required materials is Z=3, 4, 5, 6, 7, 8, 9, 10, 11, 12, 13, 14, 16, 18, 20, 22, 24, 26, 30, and 35. The spectrum for material Z, at histogram B, at thickness x (which here corresponds to one of the defined transmission levels) is denoted $I(Z,B,x)$. For each required material, for each intensity, the new interpolated material spectrum is obtained as follows:

a. If Z_new <= 13

$$I(Z_{new}, B, x) = I(6, B, x)\frac{(13 - Z_{new})}{7} + I(13, B, x)\frac{(Z_{new} - 6)}{7}$$

b. If Z_new > 13

$$I(Z_{new}, B, x) = I(13, B, x)\frac{(26 - Z_{new})}{13} + I(26, B, x)\frac{(Z_{new} - 13)}{13}$$

3. The new tables are then included in the total set of calibration data used for effective Z processing.
4. All calibration tables are saved in a file format appropriate for input to the effective Z software.

There are some important points to note here:
1. For Z<6, the process is an extrapolation rather than interpolation—one of the coefficients becomes negative, while the other is greater than 1. While it appears to work acceptably well down to Z=3, some care needs to be taken with extrapolation as it may diverge quickly.
2. Similarly for Z>26, the process is extrapolation. Here it would be better to include calibration data for tin (Sn) and then also lead (Pb) to fill out the available calibration data. The challenge with these higher Z materials is to get reliable calibration curves at 90% transmission—the material sample must be very thin to achieve this transmission.
3. By including values of Z below 3, the cost function behaves reasonably well in the region of interest around Z=6. This ensures the process for computing continuous/floating point effective Z is able to correctly determine Z values around 6—essentially avoiding anomalies at the edges, or at least pushing them to Z values outside the range of interest.
4. More sophisticated interpolation may be required to avoid common point of intersection—this is acceptable for lower Z but ceases to hold true when moving into the metals. It may be necessary to interpolate several spectra to obtain each new interpolated material.
5. The overall performance is somewhat limited by the use of just 3 actual measured materials. In fact it is quite remarkable that such excellent performance has been achieved given the spacing of the calibration materials.
6. Higher Z materials such as lead have absorption edges, and so some consideration eventually needs to be given to these materials if accurate performance at high effective Z is to be achieved. To this point, absorption edges have not been specifically incorporated into the model.

The cost function C(Z) is a smooth function, and therefore an actual floating point or continuous value of Z which minimises this smooth function can be predicted from the curve via some form of interpolation.

Figure 19:
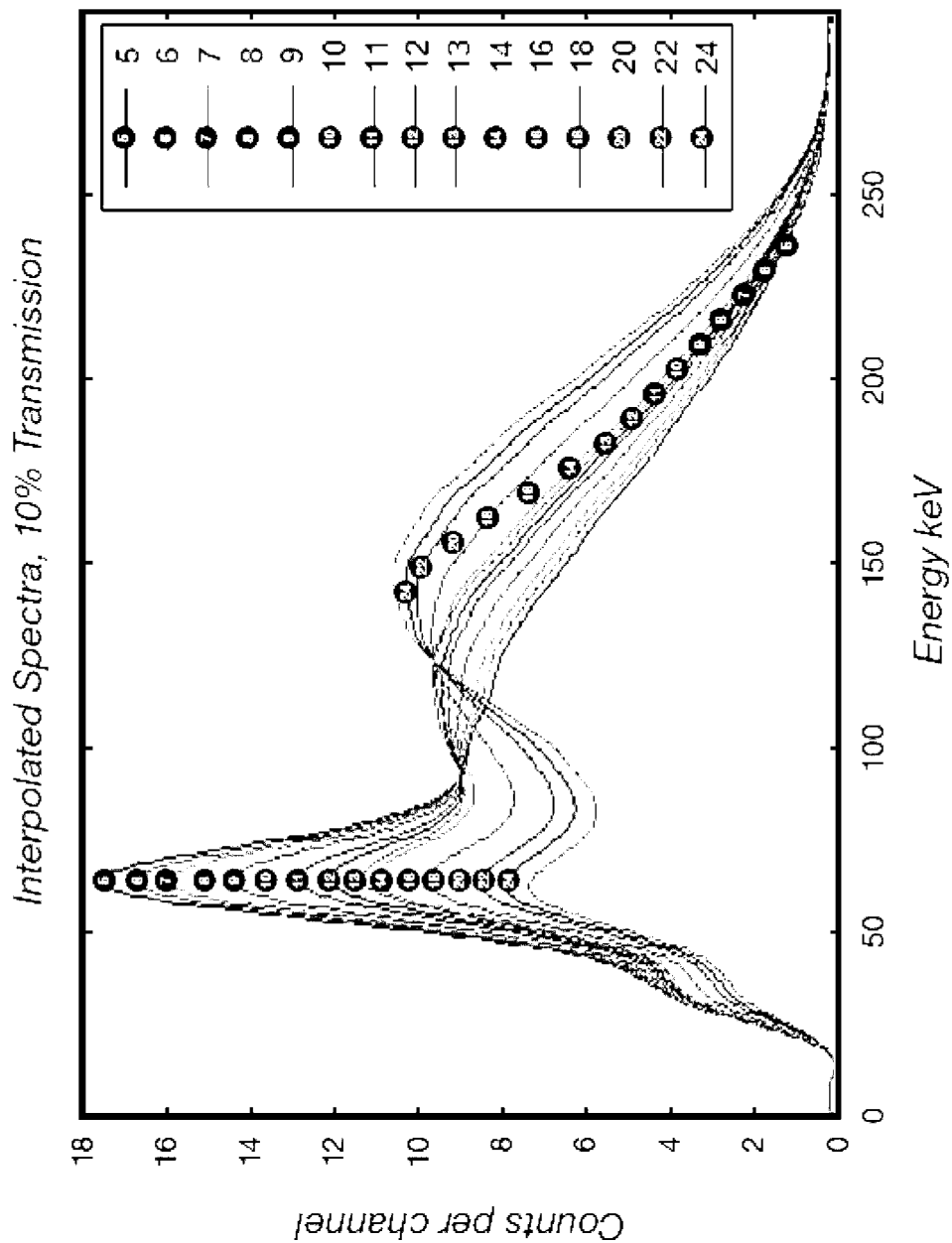
FIG. 19 illustrates results of the effective Z interpolation process for a 10% transmission case according to an embodiment.

The results of the interpolation process are shown in FIG. 19 for the 10% transmission case. It can be seen there is a very smooth progression through all of the materials, and this is what results in the discriminating power of the effective Z processing. Any measured material in the effective Z range can be placed somewhere in this set of curves, with the exact displacement from calibration curves used to determine a very accurate estimate of the material effective Z.

Implementation of floating point effective Z has been based around a quadratic interpolation, using the cost function values at the Z value that minimises the cost function, and the Z value either side of this, with some special consideration at the edges. This approach has yielded effective Z results which (with sufficient spectrum integration) have accurately resolved materials where the known effective Z difference is less than 0.2.

The process for computation of a continuous/floating point estimate of effective Z is as follows:
1. Compute the cost function C(Z) at every Z value in the calibration table.
2. Find the value of Z for which C(Z) is minimised.
3. Find the values of Z and associated cost function values for the Z values either side of the Z value which minimises C(Z).
4. The coefficients a quadratic model are estimated, where the model in the region of the minimum is:

$$C(Z) = a_0 + a_1 Z + a_2 Z^2 + n$$

where n is noise on the cost function. This is in turn modelled in matrix equation form for the 3 Z values $Z1$, $Z2$ and $Z3$ and associated cost function values $C1$, $C2$ and $C3$, with $$C = Ha + n$$

and where $$H = \begin{matrix} 1 & Z_1 & Z_1^2 \\ 1 & Z_2 & Z_2^2 \\ 1 & Z_3 & Z_3^2 \end{matrix}$$

$$a = \begin{matrix} a_0 \\ a_1 \\ a_2 \end{matrix}$$

$$C = \begin{matrix} C_1 \\ C_2 \\ C_3 \end{matrix}$$

and the solution is obtained via matrix inversion as:

$$\hat{a} = (H'H)^{-1} H'C$$

The general form inv(H'H)H'C is used to accommodate the case where more than 3 Z and C values are used to estimate the quadratic coefficients.

5. Compute the value of Z which minimises the quadratic function. The value of Z at which there is a turning point is simply:

$$\hat{Z} = \frac{-a_1}{2a_2}$$

By design, one of the Z values (usually $Z2$ except at edges) is a minimum, so the resulting optimal Z can be assumed to be a minimum rather than a maximum. At edges, there can be issues, but this needs to be treated separately.

In the disclosed embodiment, the following observations are made:
1. By design, one of the Z values (usually $Z2$ except at edges) is a minimum, so the resulting optimal Z can be assumed to be a minimum rather than a maximum. At edges, there can be issues, but this needs to be treated separately.
2. If the value of Z which minimises the cost function is at either edge, then it is necessary to use 2 values to one side of the minimum Z value. The floating point calculation may then become an extrapolation to a point outside the range of Z values in the calibration table. When this occurs, the Z estimate can diverge quickly, so care needs to be taken to put a limit on then maximum or minimum Z value estimate (i.e. how much extrapolation is allowed)
3. The inclusion of Z values below 6 and above 26 is designed to ensure the edge effects described above do not adversely affect the Z estimates, particularly in the region of interest around Z=6.
4. There are likely more computationally efficient ways of obtaining the quadratic coefficients and associated estimate of the minimum. This has not been explored at this stage.
5. In fact, for a given set of Z values, all necessary matrices and inverses can be computed offline and stored for more efficient use, since they only depend on the Z values and Z spacing, not the measured spectrum and cost function.
6. The quadratic model is acceptable where the cost function is well behaved, smooth and relatively noise free. Where very short integration times are used to collect the energy spectrum histograms, the cost function can become noisy and may converge on a local minimum due to noise. In this case, and in general, a more sophisticated interpolation model may be required to smooth the cost function and avoid noise effects. This may involve more than 3 points in the interpolation process.

The quadratic model is just a model to ensure a consistent effective Z is obtained for a particular material. It is not intended to be an accurate functional model of the cost function behaviour, and it is not considered necessary. The principle objective is to obtain an estimate of effective Z that is consistent for a particular material, and enables reliable separation of closely spaced materials. The quadratic model achieves this objective.

The floating point effective Z algorithm was tested on a range of material samples. There were several observations made about the performance.
1. At high transmission values—corresponding to very thin/low attenuation samples—the cost function could become noisy, and also the calibration curves for higher Z often poorly interpolated to >90% transmission. As a result, the output tended to over emphasise higher Z values.
2. At very low transmission, and in the vicinity of large changes in transmission levels such as near the edge of metal blocks, some scatter could be present in the received spectrum resulting in an output biased towards organic, even where the material was known to be metal.
3. A-priori knowledge of likely effective Z gave the following heuristics:
   a. High transmission is more likely to be an organic or lower Z material,
   b. Low transmission is more likely to be a higher Z material, since very large thicknesses of low Z material would be required.

As a result of these observations, a weighting $v(Z,I)$ was introduced in order to tune the cost function as a function of both intensity and Z. These cost function weights are tuned in order to ensure the effective Z output is as required for known test samples. In the disclosed embodiment the implementation has been confined to 3 discrete regions:
1. High transmission, I>high threshold
   For high transmission, the output was found to be somewhat biased towards high Z when fairly thin organic materials were scanned. Hence the cost weights were low for organics, and increasing at higher Z.
2. Mid Transmission, low threshold<I<high threshold
   In the mid range of transmission, the output was generally consistent with the expected effective Z, hence only a very slight cost function weighting was applied.
3. Low Transmission, I<low threshold
   At very low transmission, it was found that higher Z materials were occasionally mis-identified as low Z materials. This was especially true near edges of metal blocks, where scatter could allow an excess of low energy X-rays to reach the detector. As a result, at low transmission, the cost weights were designed to increase the cost of low Z materials to produce the higher Z output more consistently. One side effect of this approach is that very thick organic materials start to be identified as metals at low transmission. This can only really be overcome by removing the underlying source of the mis-identification, being an excess of low energy X-rays in the received spectrum.

8. Effective Z Processing Implementation

Figure 28:
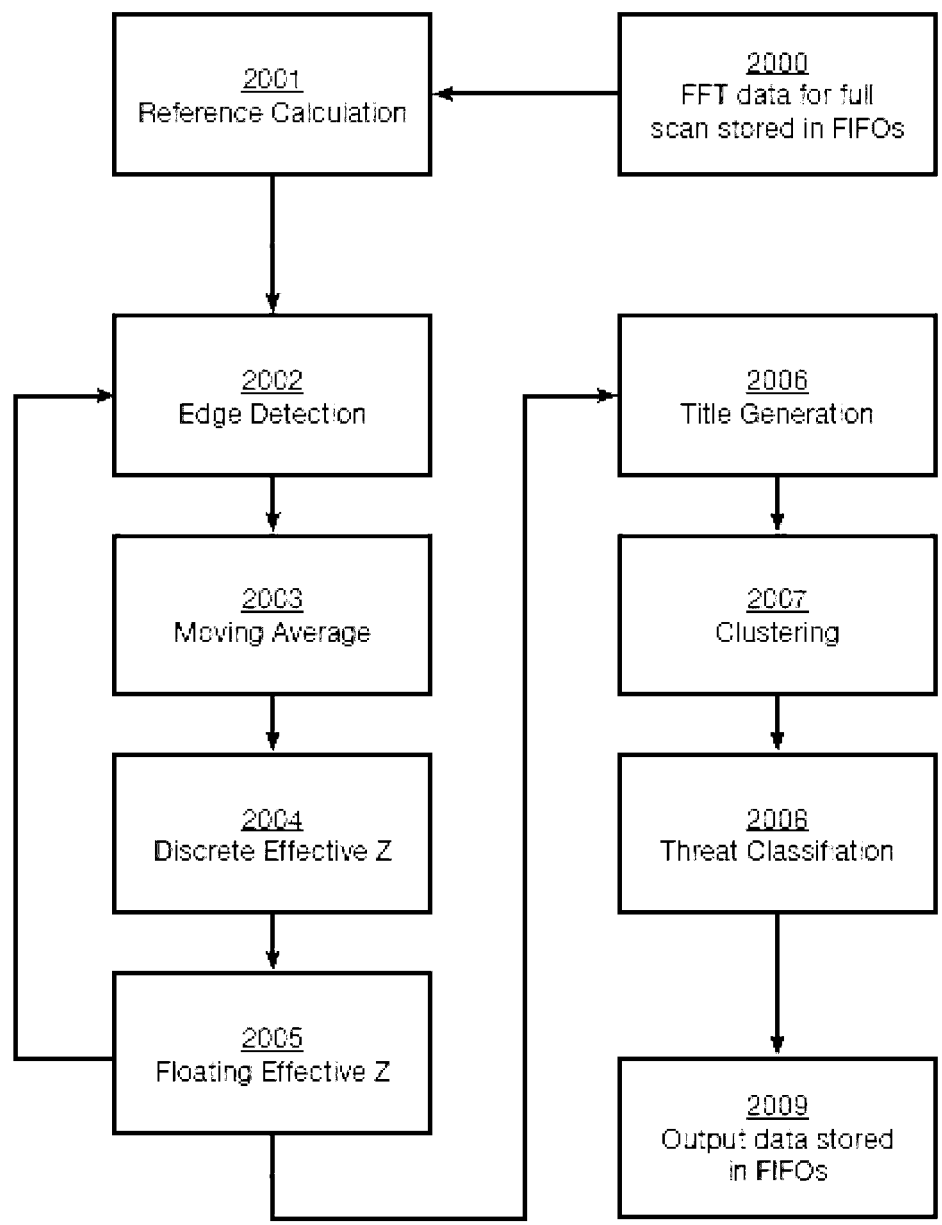
FIG. 28 illustrates an example of effective Z processing steps according to an embodiment.

The following sections outline in further detail the individual processing stages and algorithms. FIG. 28 indicates an overview of the various optional processing stages that may be implemented in the present method.

8.1. Tiling

The tiling algorithm is effectively a block averaging function. The purpose of the tiling algorithm is to average the floating effective Z image over an area (mm$^2$) that represents the smallest region required to be detected of a constant intensity and material composition. The tiling algorithm generates tiles with 50% overlap to ensure that we always capture the object of interest. The tiling algorithm estimates the mean and standard deviation over rectangular tiles in the floating effective Z image. The tile width and height are defined by the user. Tiles are overlapped by 50% in both vertical and horizontal dimensions. Given an image size $N_r$ by $N_c$ pixels, and a tile dimension $T_r$ by $T_c$ pixels, the number of tiles in the vertical dimension is $(N_r/T_r)*2$. The tile dimensions must be even valued to ensure 50% overlap. The tiling algorithm executes a loop that indexes into each tile and calculates the mean and standard deviation of all pixels in the tile.

The choice of tile dimensions essentially comes down to a compromise between:

1. The dimensions of the smallest object that must be detected, and
2. The effective Z resolution required. The effective Z variance has been observed to reduce almost linearly with number of effective Z pixels averaged, so larger areas yield better effective Z resolution.

In addition, the idea of tiling and clustering has been used to avoid the need to implement sophisticated image segmentation at this time. It was felt that to get accurate effective Z measurements would in any case require large contiguous blocks of uniform material, so the tiling and clustering approach would be only marginally inferior to full image segmentation. Nonetheless, image segmentation may ultimately prove advantageous for highly irregular shapes, especially where some more sophisticated object recognition approaches may be used in conjunction with effective Z measurement.

8.2. Clustering

The clustering algorithm groups tiles that have a common effective Z and are spatially connected. The purpose of the clustering algorithm is to detect objects that span areas larger than the minimum object size as defined by the tile dimensions. Connectedness is defined along edges. Connected tiles are assigned a common cluster ID. The output of the clustering algorithm is a cluster map and a cluster table. The cluster map is a matrix of connected tiles with associated cluster IDs. The cluster table holds information on each cluster ID including the number of tiles in the cluster, and the vertical and horizontal extent of each cluster.

The clustering algorithm performs row-wise scanning of the tiled image. If tile P(r,c) is connected to a tile in the set A={P(r,c−1), P(r−1,c+1), P(r−1,c), P(r−1,c−1)} then it is assigned the cluster ID. If P(r,c) is not connected to the set A but is connected a tile in the set B={P(r,c+1), P(r+1,c−1), P(r+1,c), P(r+1,c+1)} then the tile is assigned a new cluster ID. In the case of connectedness with tiles in set A, it is possible for the P(r−1,c+1) to have a different cluster ID to others in the set. In this case a cluster merge is performed. This is achieved by a simply replacing one cluster ID with the other, the specific order is unimportant. The sets A and B are adapted at eight boundary conditions, four along the image edges and four at the image vertices.

Figure 27:
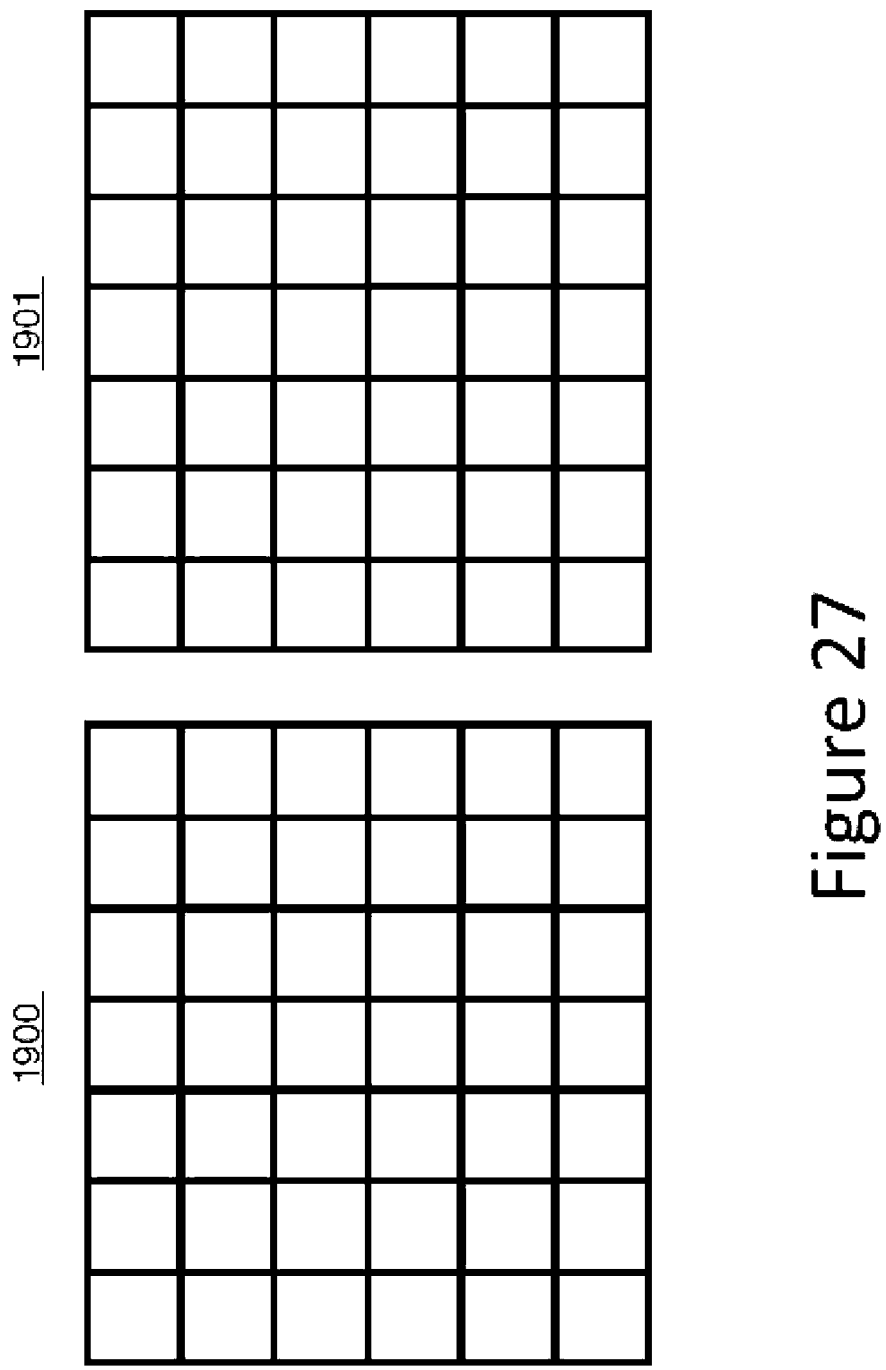
FIG. 27 illustrates an example of the formation of clusters, where single tiles are ignored according to an embodiment.

FIG. 27 depicts the formation of clusters, where single tiles are ignored.

8.3. Target Material Detection

The target material detection algorithm is a nearest neighbour classifier. The algorithm classifies individual tiles. There are two steps in the algorithm, training and classification. The training stage establishes a lookup table mapping normalised intensity to floating effective Z for a range of 'target' materials of interest. In the current implementation, the lookup table is approximated as a quadratic fit, for which only the quadratic coefficients are stored.

During the classification stage, the input is the normalised measured tile intensity (Imeas), the measured tile floating effective Z (Zmeas), and a maximum effective Z classification error (deltaZ). For each material in the training set, the classifier declares positive classification if $$\text{abs}(C_i(\text{Imeas})-\text{Zmeas})<\text{deltaZ},$$

where $C_i$ is the quadratic function associated with the i$^{th}$ target material.

The use of both intensity and effective Z in the target profile is an important aspect of this approach. The effective Z is typically not constant with material thickness, and so including the intensity (related to thickness) provides a two dimensional test with far superior discrimination than effective Z alone.

Figure 20:
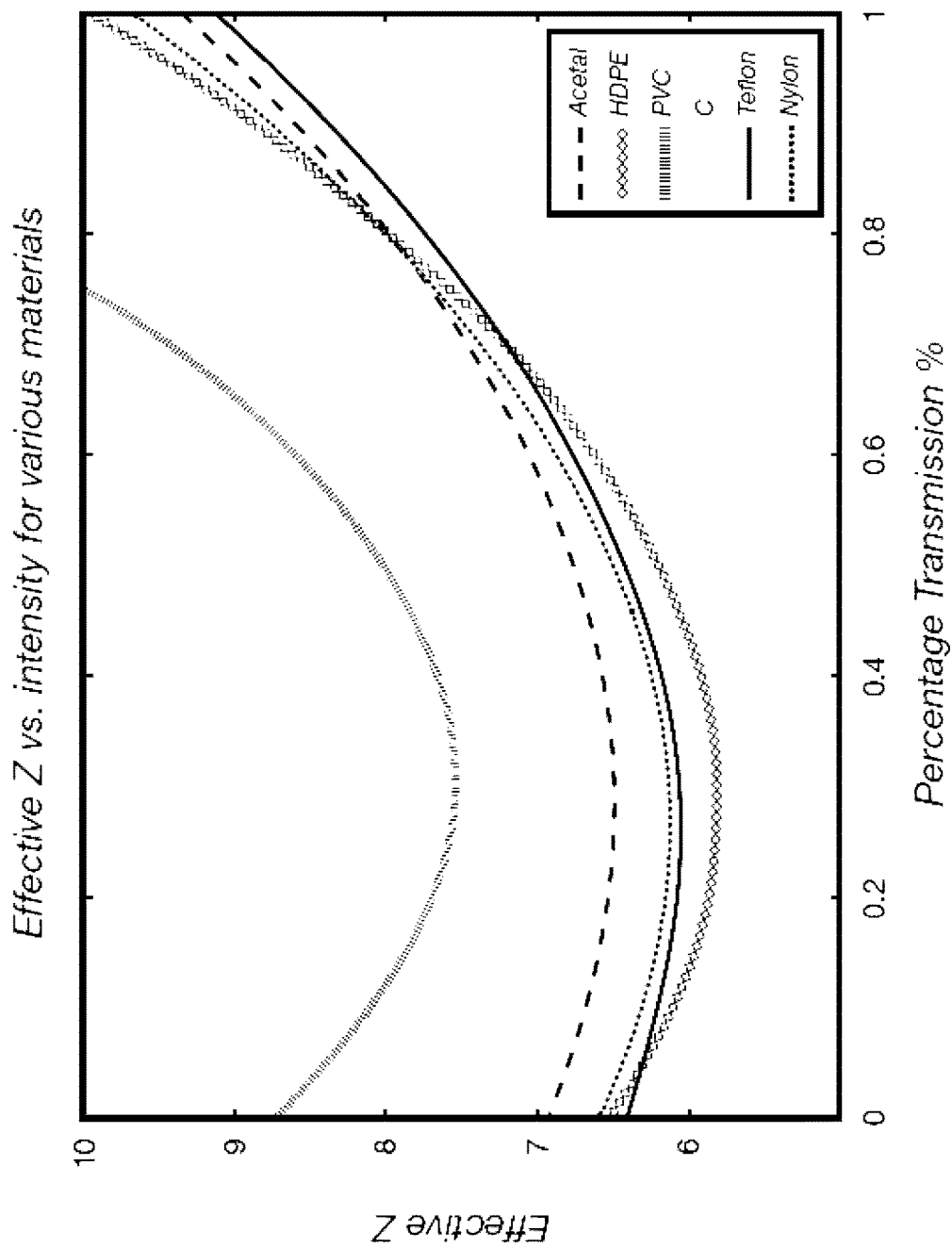
FIG. 20 illustrates effective Z plotted against intensity (percent transmission) for a range of material samples tested according to an embodiment.

FIG. 20 shows the effective Z vs intensity for a range of material samples tested, along with the quadratic interpolation. Here the variation of effective Z with intensity is clear. While the example materials are more relevant for a baggage scanning application, the principle is the same in relation to discrimination between mineral types.

8.4. Edge Detection

Figures 29, 30:
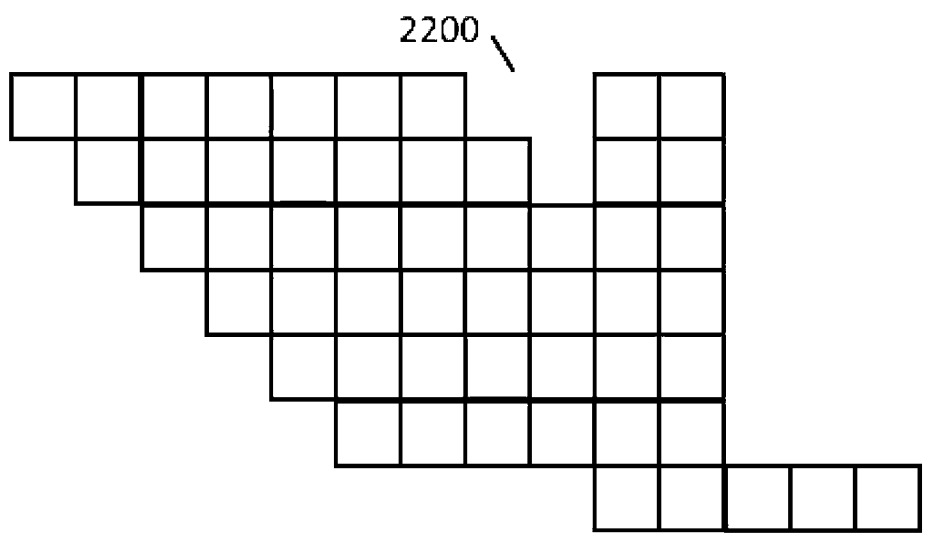
FIG. 29 illustrates a table relating to an edge mask L(c) indexed on columns according to an embodiment.
FIG. 30 illustrates the behaviour of the moving average as it transitions over an edge according to an embodiment.

The purpose of the edge detection algorithm is to ensure that the moving average window does not straddle material boundaries. The edge detection uses amplitude transitions in the intensity image to declare material edges. The input to the edge detection algorithm is the intensity image. Edges are only detected in the horizontal dimension. The reason for not detecting edges in the vertical dimension is that the moving average window only operates in the horizontal dimension. Edges in the intensity image are computed for each detector. A first order gradient operator is used to detect edges. The gradient operator mask width, and the gradient threshold, are defined by the user. Given the following edge mask L(c) indexed on columns as depicted in FIG. 29, the gradient is G=sum(L(c).*Inorm(c)) where Inorm is the normalised intensity, see section 2.6. An edge is declared when abs(G)>g where g is a user defined threshold.

8.5. Moving Average

The purpose of the moving average algorithm is to filter the intensity histograms for each detector so as to increase the effective signal-to-noise ratio. The algorithm generates a filtered intensity histogram a slice k, for each detector, by averaging the measured intensity histograms over a symmetric window centred on slice k. The edge detector plays an important role in ensuring the moving average window does not straddle different materials. If a window overlaps an edge the average is only calculated up to the edge boundaries. The width of the window can be set by the user. On edges, no averaging is performed. FIG. 30 illustrates the behaviour of the moving average as it transitions over an edge.

One embodiment that may be more computationally efficient is an adaptive moving average approach:
1. Compute effective Z on every slice in the presence of edges.
2. Compute effective Z based on 50% overlapping of moving average windows (eg every 5 pixels for 11 pixels MA length).

This can provide 3-5× improvement in computational speed depending on exact configuration.

Additional Details

1. High Rate Pulse Processing

In principle, any suitable method of high rate pulse processing can be used within the embodiments described herein. However, the high X-ray flux present in typical X-ray screening systems results in a high pulse count rate, and a high likelihood of receiving overlapping X-ray pulses.

Pulse pile-up has long been a problem to contend within applications of high rate radiation spectroscopy. Traditional approaches to pulse shaping use linear filters to shorten pulse duration which can significantly reduce SNR and are therefore limited to output rates of a few hundred kc/s. An alternate approach to processing the data from radiation detectors is based on the idea of mathematically modeling data corrupted by pulse pile-up and solving for the required model parameters. By recovering rather than discarding data corrupted by pulse pile-up this technique enables high throughput, low dead-time pulse processing without the traditional loss in energy resolution.

The disclosures of international patent publications WO2006029475, WO2009121130, WO2009121131, WO2009121132, WO2010068996, WO2012171059 and WO2015085372 are useful in the current invention achieving high rate pulse processing with reduction in pulse pileup rejection and are all incorporated herein by reference in their entirety as useful in embodiments of the current invention as if repeated here verbatim, and the applicant reserves the right to incorporate any terminology and concepts disclosed in the above international patent publications in future claim language amendments in the current application.

The following account includes a selection from the techniques disclosed in the above international patent publications adapted to the current invention, but persons skilled in the art will appreciate that all of these techniques are potentially useful and choice among the alternative approaches is guided by satisfaction of various competing performance constraints including processing speed, energy determination accuracy and maximum count rate.

1.1. Model-Based, High-Throughput Pulse Processing— Method 1

The algorithm briefly described here, and in more detail in WO2006029475 (incorporated by reference), for processing the data from radiation detectors is a model-based, real-time, signal-processing algorithm that characterises the output of the radiation detector y[n] as shown below:

$$y[n] = \sum_{i=1}^{N} \alpha_i h[n - \tau_i] + \omega[n] \quad i = 1, 2, 3, \ldots, N \quad \text{(Equation 18)}$$

The digitised radiation detector time series (y) is modeled as the sum of an unknown number of radiation events (N), with random times of arrival ($\tau$), and amplitudes ($\alpha$), interacting with a radiation detector, that have an expected pulse shape (h) and with a noise process ($\omega$).

Therefore, so as to fully characterise the digitised output of the radiation detector, it is desirable to estimate: the expected impulse response of the detector; the number of events in the digitised detector time series; the time of arrival of each of those radiation events; and the individual energies of each event. Once these parameters have been determined, the digitised detector data can be accurately decomposed into the individual component events and the energy of each event determined.

System Characterisation

Calibration of the detector is the first stage of the algorithm; it takes as input the detector time series data and determines the unit impulse response of the detector (the expected pulse shape from the detector). Refer to Pulse Parameter Calibration for a more detailed summary of the pulse calibration process.

Pulse Localisation

After the unit impulse response of the detector has been determined this is used by the Pulse Localisation stage to determine the number of events in the digitised detector data stream and their TOA relative to each other.

The detection of events in the digitised detector waveform is accomplished by fitting an exponential model to a fixed number of data points. After the System Characterisation stage the exponential decay of the pulse tail is well characterised. The detection metric (the signal ultimately used to make a decision as to whether a pulse has arrived or not) is formed by fitting an exponential curve to a specified number of data points. This fixed length 'detection window' is run continuously over the digitised detector data and the sum of the squares of the error is computed (this can also be thought of as the sum of the square of the fit residual). This operation results in three distinct modes of operation:

1. Baseline Operation: processing data samples when no signal is present. As the data can be quite accurately modeled by an exponent the sum square of the error is at a minimum and remains quite constant.
2. Event Detection: when a radiation event enters the detection window the data can no longer be accurately modeled as an exponent (the data could be consider non-differential at T=0 the exact arrival time of the radiation event). Consequently the sum square of the errors will increase. This detection metric will continue to increase until the radiation event is positioned in the middle of the detection window.
3. Tail Operation: when processing data on the tail of a radiation event the data points are quite accurately modeled as an exponent. Consequently the sum square of the error returns to the same level as the Baseline Operation mode.

Using such an exponent pulse fitting operation on the digitised detector produces an ideal detection metric. It remains low during baseline, rises rapidly in response to an event arrival and decays rapidly once the rising edge of the radiation event has subsided. Furthermore, by increasing the number of ADC samples in the fixed length detection window it is possible to suppress the detector noise and accurately detect very low energy events. However, the width of the detection metric (in samples) varies proportionally with the detection window. Consequently, as the detection window gets wider the ability to distinguish two closely separated pulses is diminished.

Quadratic Peak Detection

The final stage of Pulse Localisation is making a decision on the exact number and time of arrival of each of the radiation events in the detector data stream. One approach would be to apply a simple threshold to the detection metric and declare a pulse arrival at the nearest sample to the threshold crossing. However, a simple threshold crossing is susceptible to noise and only provides ±0.5 sample accuracy in determining the pulse arrival time. To have more accurate pulse arrival time and to be robust against noise (of particular importance when dealing with low energy signals close to the noise floor) a quadratic peak detection algorithm can be used. Such an approach fits a quadratic to a sliding window of N samples of the detection metric (N maybe equal to 5). In order for a peak to be declared we examine the decomposition and declare a peak if the curvature is within a permitted range, the constant is over a threshold, and the linear term has change from positive to negative. The coefficients can also be used to determine sub-sample time of arrival.

Pulse Energy Estimation

The Pulse Energy Estimation stage determines the energy of all the radiation events in the detector data stream. As its input it uses: the a priori knowledge of the detector unit impulse response; the number of events; and their individual time of arrival data. The digitised detector data of equation 18 (y[n]) may also be written in matrix form as:

$$y = Ax + b \qquad \text{(Equation 19)}$$

where A is an M×N matrix, the entries of which are given by $$A(n, i) = \begin{cases} h(n - \tau_i) & \tau_i \leq n < \min(m, \tau_i + T - 1) \\ 0 & \text{otherwise} \end{cases} \qquad \text{(Equation 20)}$$

Thus, the columns of matrix A contain multiple versions of the unit impulse response of the detector. For each of the individual columns the starting point of the signal shape is defined by the signal temporal position. For example, if the signals in the data arrive at positions 2, 40, 78 and 125, column 1 of matrix A will have '0' in the first row, the $1^{st}$ data point of the unit impulse response in the second row, the $2^{nd}$ data point of the unit impulse response in the $3^{rd}$ row, etc. The second column will have '0' up to row 39 followed by the signal form. The third column will have '0' up to row 77; the fourth column will have '0' up to row 124 and then the signal form. Hence the size of matrix A is determined by the number of identified signals (which becomes the number of columns), while the number of rows depends on the number of samples in the 'time series'.

Once the system matrix has been created it is possible to solve for the desired energies of each radiation event by calculating the pseudo inverse of matrix A:

$$x = \text{Inv}(A' \cdot A) \cdot A' \cdot y \qquad \text{(Equation 21)}$$

Data Validation

The final functional stage of the real-time, signal-processing algorithm is the Validation stage. At this stage all the parameters that have been estimated by previous algorithmic stages (pulse shape, number of events, time of arrival and event energy) are combined to reconstruct a 'noise-free' model of the detector data.

By subtracting this model of the detector data from the actual digitised detector time series, the accuracy of the estimated parameters can be determined. Much like examining the residual from a straight line fit of a data set, if the magnitude of the residuals is small, the parameters well describe the data. However, if large residuals are observed, the detector data has been poorly estimated and that portion of the data can be rejected.

1.2. Model-Based, High-Throughput Pulse Processing—Method 2

The algorithm briefly described here, and in more detail in WO2010068996 (incorporated by reference), for processing the data from radiation detectors is a model-based, real-time, signal-processing algorithm wherein the signal processing is at least in part conducted in a transform space.

In one embodiment, the method of WO2010068996 for resolving individual signals in detector output data comprises:

obtaining or expressing the detector output data as a digital series (such as a digital time series or a digitised spectrum);

obtaining or determining a signal form (or equivalently the impulse response) of signals present in the data;

forming a transformed signal form by transforming the signal form according to a mathematical transform;

forming a transformed series by transforming the digital series according to the mathematical transform, said transformed series comprising transformed signals;

evaluating a function of at least the transformed series and the transformed signal form (and optionally of at least one parameter of the transformed signals) and thereby providing a function output;

modelling the function output according to a model (such as by modelling the function output as a plurality of sinusoids);

determining at least one parameter of the function output based on the model; and determining a parameter of the signals from the at least one determined parameter of the function output.

It will be understood by the skilled person that individual signals in detector output data may also be described as individual pulses in a detector output or in a detector output signal (in which case signal form could be referred to as pulse form).

The signal form may generally be regarded as characterising the interaction between the detector and the radiation (or other detected input) that was or is being used to collect the data. It may be determined or, if known from earlier measurements, calibrations or the like, obtained from (for example) a database.

In some embodiments, transforming the digital series according to the mathematical transform comprises forming a model of the digital series and transforming the model of the digital series according to the mathematical transform.

In certain embodiments, the method includes determining a plurality of parameters of the transformed signals, such as frequency and amplitude.

In certain particular embodiments, the transform is a Fourier transform, such as a fast fourier transform or a discrete fourier transform, or a wavelet transform. Indeed, in certain embodiments the transform may be applied somewhat differently to the signal form and digital series respectively. For example, in one embodiment the mathematical transform is the Fourier transform, but the signal form is transformed with a discrete fourier transform and the digital series is transformed with a fast fourier transform.

In one embodiment, the transform is a Fourier transform and the function is representable as $$Y(k) = X(k)/H(k) \qquad \text{(Equation 22)}$$

where X(k) is the transformed series and H(k) is the transformed signal form.

Thus, this method endeavors to determine a parameter of the signals and hence of as much of the data as possible, but it will be appreciated that it may not be possible to do so for some data (which hence is termed 'corrupt data'), as is described below. It will be understood that the term 'signal' is interchangeable in this context with 'pulse', as it refers to the output corresponding to individual detection events rather than the overall output signal comprising the sum of individual signals. It will also be appreciated that the temporal position (or timing) of a signal can be measured or expressed in various ways, such as according to the time (or position in the time axis) of the maximum of the signal or the leading edge of the signal. Typically this is described as the arrival time ('time of arrival') or detection time.

It will also be understood that the term 'detector data' refers to data that has originated from a detector, whether processed subsequently by associated or other electronics within or outside the detector.

The signal form (or impulse response) may be determined by a calibration process that involves measuring the detector's impulse response (such as time domain response or frequency domain response) to one or more single event detections to derive from that data the signal form or impulse response. A functional form of this signal form may then be obtained by interpolating the data with (or fitting to the data) a suitable function such as a polynomial, exponential or spline. A filter (such as an inverse filter) may then be constructed from this detector signal form. An initial estimate of signal parameters may be made by convolution of the output data from the detector with the filter. Signal parameters of particular interest include the number of signals and the temporal position (or time of arrival) of each of the signals.

The particular signal parameters of interest can then be further refined.

The accuracy of the parameter estimation can be determined or 'validated' by comparing a model of the detector data stream (constructed from the signal parameters and knowledge of the detector impulse response) and the actual detector output. Should this validation process determine that some parameters are insufficiently accurate, these parameters are discarded. In spectroscopic analysis using this method, the energy parameters deemed sufficiently accurate may be represented as a histogram.

The data may include signals of different forms. In this case, the method may include determining where possible the signal form of each of the signals.

In one embodiment, the method includes progressively subtracting from the data those signals that acceptably conform to successive signal forms of a plurality of signal forms, and rejecting those signals that do not acceptably conform to any of the plurality of signal forms.

1.3. Model-Based, High-Throughput Pulse Processing— Method 3

The algorithm briefly described here, and in more detail in WO2012171059 (incorporated by reference), for processing the data from radiation detectors is a model-based, real-time, signal-processing algorithm wherein determining a location and amplitude of pulses within the signal is achieved by fitting a function to detector output data.

The method may comprise detecting a pulse or pulses in said detector output data by:

sliding a window across the data to successive window locations;

identifying possible pulses by performing pulse fitting to the data in the window at each window location;

determining which of the possible pulses have a pulse start falling before and near the start of the respective window location and a peak amplitude exceeding the standard deviation of the noise in the window at the respective window location; and identifying as pulses, or outputting, those of said possible pulses that have a pulse start falling one, two or three samples before the start of the respective window location and a peak amplitude exceeding the standard deviation of the noise in the window at the respective window location.

In many embodiments, the one or more functions are functions of time.

In some of those embodiments, however, the skilled person will appreciate that the one or more functions may not be functions exclusively of time.

The method may comprise providing the detector output data in, or converting the detector output data into, digital form before fitting the one or more functions to the detector output data.

In one embodiment, the one or more functions are of the form:

$$f(t)=av(t)+be^{-\alpha t} \quad \text{(Equation 23)}$$

In this embodiment, v(t) may be calculated numerically, such as by the formula $$v(t)=e^{-\alpha t}\sum_{k=0}^{t-1}e^{-(\beta-\alpha)k} \quad \text{(Equation 24)}$$

for t=0, 1, 2, . . . (with v(0)=0).

Although mathematically, $$v(t) = \frac{1}{1 - e^{-(\beta-\alpha)}}(e^{-\alpha t} - e^{-\beta t})$$

whenever β≠α, the above formula may be used to evaluate v(t) numerically. Furthermore, the above formula remains correct even when α=β, reducing in that instance to v(t)= te−$^{\alpha t}$.

In one embodiment, the one or more functions are of the form:

$$f(t)=av(t)+be^{-\alpha t} \quad \text{(Equation 25)}$$

and the method includes determining a location and amplitude of the pulse with a method comprising:

defining a reference pulse p(t) as a convolution of $e^{-\alpha t}u(t)$ with $e^{-\beta t}u(t)$, determining the location τ and amplitude A of f(t) from f(t)=Ap(t−τ), with τ≤0.

The skilled person will appreciate that the present aspect of the invention contemplates different but mathematically equivalent expressions of this approach.

The skilled person will also appreciate that:

$$p(t) = \frac{1}{\beta - \alpha}(e^{-\alpha t} - e^{-\beta t})u(t),$$

when α≠β, and $$p(t)=te^{-\alpha t}, \text{when } \alpha=\beta$$

Expanding $f(t)=Ap(t-\tau)$ gives the two equations:

$$\frac{1-e^{-(\beta-\alpha)\tau}}{\beta-\alpha} = \gamma\frac{-b}{a}, \quad \text{(Equation 26)}$$

$$A = \gamma^{-1}e^{-\beta\tau}a, \quad \text{(Equation 27)}$$

where $$\gamma = \frac{1-e^{-(\beta-\alpha)}}{\beta-\alpha}.$$

In the limit as $\beta$ becomes equal to $\alpha$, the constant $\gamma$ becomes 1, and equation (26) becomes $$\tau = \frac{-b}{a}.$$

This form is therefore suitable for use in a numerically stable method for a calculating $\tau$.

If $|\beta-\alpha|$ is very small, care needs to be taken with the calculation of $\gamma$. This may be done by summing the first few terms in the Taylor expansion:

$$\gamma = 1 - \frac{1}{2!}(\beta-\alpha) + \frac{1}{3!}(\beta-\alpha)^2 - \ldots \quad \text{(Equation 28)}$$

Solving equation (26) can be done numerically, such as with a bisection method, especially since the left hand side is monotonic in $\tau$. Determining the left hand side for different values of $\tau$ may be done by any suitable technique, such as with a Taylor series expansion for small $\tau$. (In practice, the value of $\tau$ will generally be small because noise will generally preclude accurate characterisation of a pulse that started in the distant past.)

The linear approximation in x of equation (26) is $$\tau = \gamma\frac{-\gamma}{a},$$

and is exact if $\beta=\alpha$. The exact, general solution (theoretically) is $$\tau = \frac{-1}{\beta-\alpha}\ln\left(1+\gamma(\beta-\alpha)\frac{b}{a}\right),$$

the Taylor series expansion of which is:

$$\tau = \gamma\frac{-\gamma}{a}\left(1 - \frac{1}{2}x + \frac{1}{3}x^2 - \frac{1}{4}x^3 + \ldots\right), \quad \text{(Equation 29)}$$

$$x = \gamma(\beta-\alpha)\frac{b}{a}$$

which is valid provided $|x|<1$.

The method may comprise constraining $\tau$ by requiring that $\tau\in[\tau^*, 0]$. Thus, because the left-hand side of the equation is monotonic in $\tau$, the constraint that $\tau\in[\tau^*, 0]$ is equivalent to the constraint on a and b that $0\le b\le ca$ where the scalar c is given by $$c = -\gamma^{-1}\frac{1-e^{-(\beta-\alpha)\tau^*}}{\beta-\alpha} \quad \text{(Equation 30)}$$

$$= \frac{e^{-(\beta-\alpha)\tau^*}-1}{1-e^{-(\beta-\alpha)}}. \quad \text{(Equation 31)}$$

Indeed, if $\tau^*=-1$ then $$c = \frac{e^{\beta-\alpha}-1}{1-e^{-(\beta-\alpha)}}$$

Thus, it is possible to provide a constrained optimisation. This constraint can be implemented in with the constraints that $\alpha$ and $\beta$ are not negative and $\alpha>\beta$.

The method may also comprise constraining the amplitude of the pulse. This can be used, for example, to prevent a fitted pulse from being too small or too large. Indeed, referring to equation (30) above, if x is constrained to lie between $-1$ and 0 then A lies between $\gamma^{-1}a$ and $\gamma^{-\alpha}e^\beta a$. Constraining a therefore constrains the amplitude A.

According to another particular embodiment, the function f is in the form of a function with three exponentials. In a certain example of this embodiment, the time constants $\tau_1, \ldots, \tau_3$ are known and dissimilar (so fewer problems of numerical imprecision arise), and the method includes fitting the curve:

$$A_1 e^{-\tau_1 t} + \ldots + A_3 e^{-\tau_3 t}. \quad \text{(Equation 32)}$$

In another example of this embodiment, the time constants $\tau_1, \ldots, \tau_3$ are known and in ascending order such that $\tau_1 \le \tau_2 \le \tau_3$, and fitting the function $f$ includes using basis vectors:

$$v_1(t) = e^{-\tau_1 t}\sum_{k=0}^{t-1}e^{-(\tau_1-\tau_2)k}\sum_{l=0}^{k-1}e^{-(\tau_3-\tau_2)l} \quad \text{(Equation 33)}$$

$$v_2(t) = e^{-\tau_1 t}\sum_{k=0}^{t-1}e^{-(\tau_1-\tau_2)k} \quad \text{(Equation 34)}$$

$$v_3(t) = e^{-\tau_1 t}. \quad \text{(Equation 35)}$$

For reference, if the time-constants differ, then $$v_1(t) = \frac{\gamma_{31}-\gamma_{21}}{\gamma_{32}}\frac{1}{\gamma_{31}\gamma_{21}}e^{-\tau_1 t} - \frac{1}{\gamma_{32}\gamma_{21}}e^{-\tau_2 t} + \frac{1}{\gamma_{32}\gamma_{31}}e^{-\tau_3 t}$$

$$v_2(t) = \frac{1}{\gamma_{21}}(e^{-\tau_1 t} - e^{-\tau_2 t}), \text{ and } v_3(t) = e^{-\tau_1 t}.$$

where $\gamma_{ij}=1-e^{-(\tau_j-\tau_i)}$.

Note, however, that—unlike the previous 'double-exponential' case, in which there were two unknowns (viz. the location and the amplitude of the pulse) and two equations (coming from the two basis vectors), in this 'three-exponential' case there are two unknowns but three equations. There are therefore many different ways of inverting these equations (thereby recovering the location and the amplitude of the pulse), and generally this will be the strategy that is robust to noise.

In another particular embodiment, the function $f$ is of the form:

$$f(t)=ae^{-\alpha t}-be^{-\beta t}, \quad \text{(Equation 36)}$$

wherein $\alpha$ and $\beta$ are scalar coefficients, and the method comprises determining a and b.

This approach may not be suitable in applications in which $\alpha \approx \beta$, but in some applications it may be known that this is unlikely to occur, making this embodiment acceptable.

In one example of this embodiment, determining the location comprises determining a location $t_*(a,b)$ where:

$$t_*(a, b) = \frac{\ln\alpha - \ln\beta}{\alpha - \beta} + \frac{\ln a - \ln b}{\alpha - \beta}. \quad \text{(Equation 37)}$$

It will be appreciated that this embodiment, which uses $e^{-\alpha t}$ and $e^{-\beta t}$ has the disadvantage that these terms converge as $\beta$ approaches $\alpha$ (unlike the terms $v(t)$ and $e^{-\alpha t}$ in the above-described embodiment, which remain distinct. Indeed, $e^t$ might be said to correspond to the tail of a pulse that occurred at $-\infty$ (whereas $v(t)$ represents a pulse occurring at time $0$).

The function $f$ may be a superposition of a plurality of functions.

The method may include determining the pulse amplitude by evaluating $\hat{f}=f(t)$ at $t=t_*(a,b)$.

Thus, the present invention may utilise a method and apparatus for estimating the location and amplitude of a sum of pulses from noisy observations of detector output data. It presented the maximum-likelihood estimate as the benchmark (which is equivalent to the minimum mean-squared error estimate since the noise is additive white Gaussian noise).

The method may comprise low-pass filtering the data before fitting the one or more functions.

In one embodiment, however, the method comprises adapting the one or more functions to allow for a low frequency artefact in the detector output data. This may be done, in one example, by expressing the one or more functions as a linear combination of three exponential functions (such as $f(t)=ae^{-\alpha t}-be^{-\beta t}+ce^{-\gamma t}$).

In a certain embodiment, the method comprises forcing any estimates having the pulse starting within the window to start at a boundary of the window.

In a particular embodiment, the method comprises maximizing window size or varying window size.

In one embodiment, the method comprises transforming the detector output data with a transform before fitting the one or more functions to the detector output data as transformed.

This approach may be desirable in applications in which the analysis is simplified if conducted in transform space. In such situations, the method may also comprise subsequently applying an inverse transform to the one or more functions, though in some cases it may be possible to obtain the desired information in the transform space.

The transform may be a Laplace transform, a Fourier transform or other transform.

In one embodiment, estimating the location of the peak comprises minimizing an offset between the start of a window and a start of the pulse.

In a particular embodiment, the method further comprises detecting a pulse or pulses in the data by:
sliding a window across the data to successive window locations;
identifying possible pulses by performing pulse fitting to the data in the window at each window location;
determining which of the possible pulses have a pulse start falling before and near the start of the respective window location and a peak amplitude exceeding the standard deviation of the noise in the window at the respective window location; and
identifying as pulses, or outputting, those of the possible pulses that have a pulse start falling one, two or three samples before the start of the respective window location and a peak amplitude exceeding the standard deviation of the noise in the window at the respective window location.

According to a second class of embodiments a method for locating a pulse in detector output data is implemented, comprising:
fitting a plurality of functions to the data;
determining a function of best fit, being whichever of said functions optimises a chosen metric when modelling said data; and
determining a location and an amplitude of a peak of said pulse from said function of best fit.

In one embodiment, each of the one or more functions is a superposition of a plurality of functions.

1.4. Model-Based, High-Throughput Pulse Processing—Method 4

The algorithm briefly described here, and in more detail in WO2015085372 (incorporated by reference), for processing the data from radiation detectors is a model-based, real-time, signal-processing algorithm wherein resolving individual signals in the detector output data comprises transforming detector data to produce stepped data, or using data that is already in a stepped form, and detecting at least one signal and estimating a parameter of the signal based at least partially on the stepped data.

The method comprises transforming the detector output data to produce stepped data or integral data, detecting at least one event, and estimating a pulse energy associated with the event.

In some embodiments detecting the at least one event occurs by fitting an expected pulse shape with a sliding window segment of the transformed pulse shape data.

In some embodiments the method further comprises the step of detecting peaks in the signal, wherein a detection metric is applied to the transformed data. In some embodiments, the detection metric is compared to a simple threshold—if the metric is less than the threshold, then no pulses are deemed present—if it exceeds the threshold, then one or more pulses may be present. Declaration of significant peaks in the detection metric is conducted, when the slope of the peak changing from positive to negative indicates an event.

It will be appreciated that it may not be possible to adequately characterise all data (uncharacterised data is termed 'corrupt data'); such corrupt data may optionally be rejected. It will be understood that the term 'signal' is interchangeable in this context with 'pulse', as it refers to the output corresponding to individual detection events rather than the overall output signal comprising the sum of individual signals. It will also be appreciated that the temporal position (or timing) of a signal can be measured or expressed in various ways, such as according to the time (or position in the time axis) of the maximum of the signal or the leading edge of the signal. Typically this is described as the arrival time ('time of arrival') or detection time.

The method optionally comprises deleting samples within a set window around the rising edge to ensure the edge region of each pulse, where the real transformed pulse data differs from an ideally transformed pulse, is excluded from the calculations.

The method optionally comprises an assessment of variance of the energy estimations in the data, and validation of the modeled data.

The method may include building a model of the data from the processed data output and determining the accuracy of the modeling based on a comparison between the detector output data and the model.

In one exemplary embodiment of method 4, the method includes creating a model of the detector output using the signal parameters in combination with the detector impulse response. In another exemplary embodiment, the method may include performing error detection by comparing the actual detector output with the model of the detector output, such as by using least squares.

The method may include discarding energy estimates deemed not sufficiently accurate. In one embodiment, the method includes presenting all sufficiently accurate energy estimates in a histogram.

2. Pulse Pileup Reduction

Even where an appropriate high rate pulse processing method is used, there will still be situations where it is not possible to distinguish between closely spaced pulse arrivals. Such a situation occurs when multiple pulses arrive within the window in which the pulse detection algorithm is able to determine the arrival of distinct pulses. Depending on the ADC sampling rate, pulse arrival statistics, and detector electronics, the total amount of pileup may still be in the order of 5% at 1 Mc/s. Pileup can be the result of detecting 2 pulses as a single pulse, however detecting 3 pulses as 1 pulse is also possible, while detecting 4 or more pulses as 1 pulse is possible but much less likely.

2.1. Problem Solution—Two Pulse Pileup Removal

If the underlying X-ray energy spectrum is denoted x then the spectrum with two pulse pileup is:

$$y = x + k_1 x * x \quad \text{(Equation 38)}$$

where * denotes convolution, and $k_1$ is the pileup coefficient that is estimated from data observation or computed from theory. In order to estimate the underlying spectrum x, the following process is performed:

1. Take the FFT of each side, where convolution now becomes multiplication, so $$Y(n) = X(n) + k_1 X(n)^2 \quad \text{(Equation 39)}$$

2. At each FFT bin n, solve the quadratic equation $k_1 X(n)^2 + X(n) - Y(n) = 0$, bearing in mind both $X(n)$ and $Y(n)$ are complex. The solution is $$\hat{X}(n) = \frac{-1 \pm \sqrt{1 - 4k_1 Y}}{2k_1} \quad \text{(Equation 40)}$$

3. The correct solution to take is the "positive" solution. It also relies on taking the correct solution to the complex square root.

4. Now compute the spectrum without pileup by taking the inverse FFT of $\hat{X}$.

$$\hat{x} = \text{IFFT}(\hat{X}) \quad \text{(Equation 41)}$$

Using the correct pileup coefficient, it is shown that the pileup is completely removed.

2.2. Problem Solution—Two and Three Pulse Pileup Removal

In practice, for spectra measured on an X-ray scanning system, when only two pulse pileup was removed, it was observed that there was still some residual pileup at higher energies. This indicated there was some unremoved three (or more) pulse pileup at these higher energies. In order to remove some, and hopefully most, of this residual pileup, the model is now extended to include 3 pulse pileup, so the received spectrum is given by:

$$y = x + k_1 x * x + k_2 x * x * x \quad \text{(Equation 42)}$$

where * denotes convolution, and $k_1$ and $k_2$ are the pileup coefficients for two and three pulse pileup respectively. In order to estimate the underlying spectrum x, the following process is performed:

1. Take the FFT of each side, where convolution now becomes multiplication, so $$Y(n) = X(n) + k_1 X(n)^2 + k_2 X(n)^3 \quad \text{(Equation 43)}$$

2. For each of N bins in the FFT, Solve the cubic equation $$k_2 X(n)^3 + k_1 X(n)^2 + X(n) - Y(n) = 0 \quad \text{(Equation 44)}$$

bearing in mind both X and Y are complex. Like the quadratic, there is a closed form solution, however the solution to the cubic is considerably more complicated as follows:

a. Divide through by $k_2$ so each equation is now of the form $$X(n)^3 + a X(n)^2 + b X(n) + c(n) = 0 \quad \text{(Equation 45)}$$

noting that $X(n)$ and $c(n)$ are complex.

b. Compute $$Q = \frac{a^2 - 3b}{9} \quad \text{(Equation 46)}$$

$$R = \frac{2a^3 - 9ab + 27c}{54}$$

c. Compute $$P = \sqrt{R^2 - Q^3} \quad \text{(Equation 47)}$$

d. Check P, and negate if desirable. If $\text{Re}(\text{conj}(R) \cdot P) < 0$, then $P = -P$. This is to ensure the correct cube roots are obtained at the next step.

e. Compute $$A = -\sqrt[3]{R + P} \quad \text{(Equation 48)}$$

f. Compute $$B = 0 \quad \text{if } A = 0 \quad \text{(Equation 49)}$$

$$B = \frac{Q}{A} \quad \text{otherwise}$$

g. Compute the 3 solutions to the cubic equation:

$$r_1 = (A + B) - \frac{a}{3} \quad \text{(Equation 50)}$$

-continued $$r_2 = -\frac{A+B}{2} - \frac{a}{3} + i\frac{\sqrt{3}}{2}(A-B)$$

$$r_3 = -\frac{A+B}{2} - \frac{a}{3} - i\frac{\sqrt{3}}{2}(A-B)$$

3. Choose the solution to allocate to $\hat{X}(n)$. The correct solution is that with smallest magnitude of $r_2$ and $r_3$.

$$\hat{X}(n)=r_2 \text{ if } |r_2|\leq|r_3|$$

$$\hat{X}(n)=r_3 \text{ if } |r_2|>|r_3|  \quad\text{(Equation 51)}$$

4. Now compute the spectrum without pileup by taking the inverse FFT of $\hat{X}$ $$\hat{x}=\text{IFFT}(\hat{X}) \quad\text{(Equation 52)}$$

Figure 11:
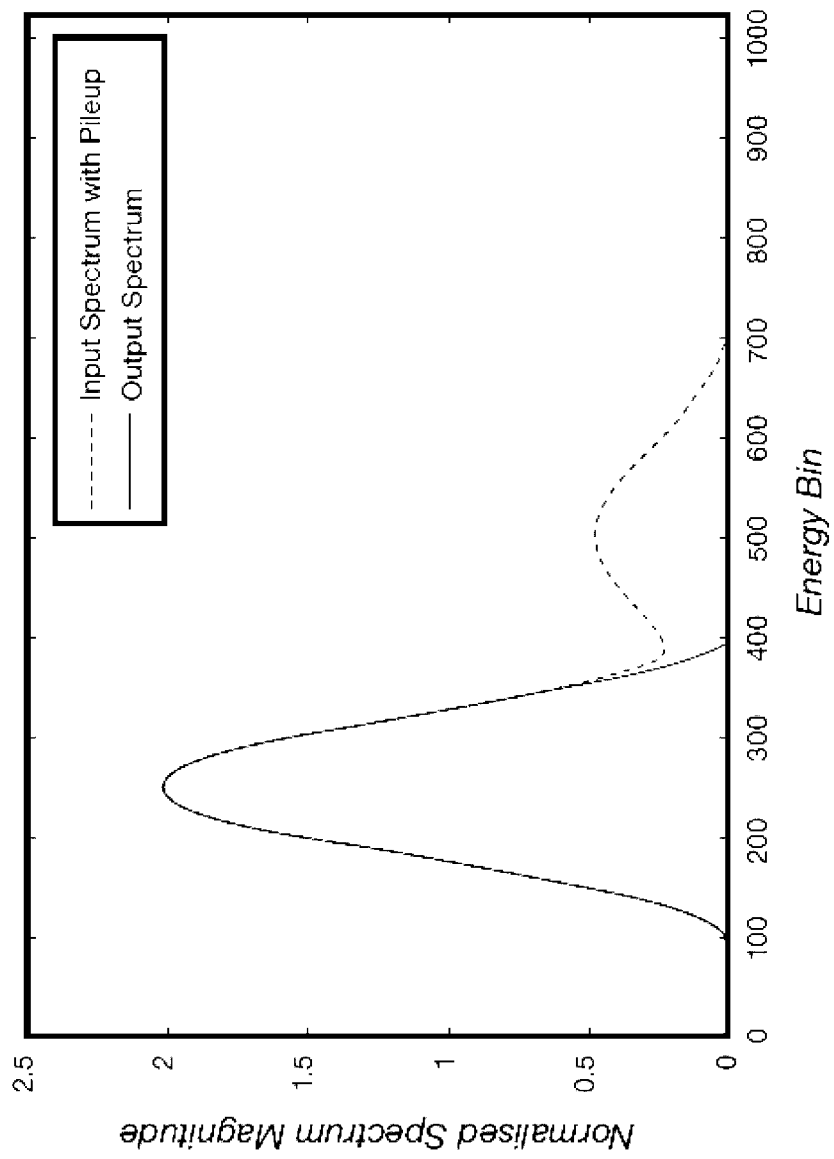
FIG. 11 is a graph illustrating the removal of pileup of two pulses from a spectrum according to an embodiment.
Figure 12:
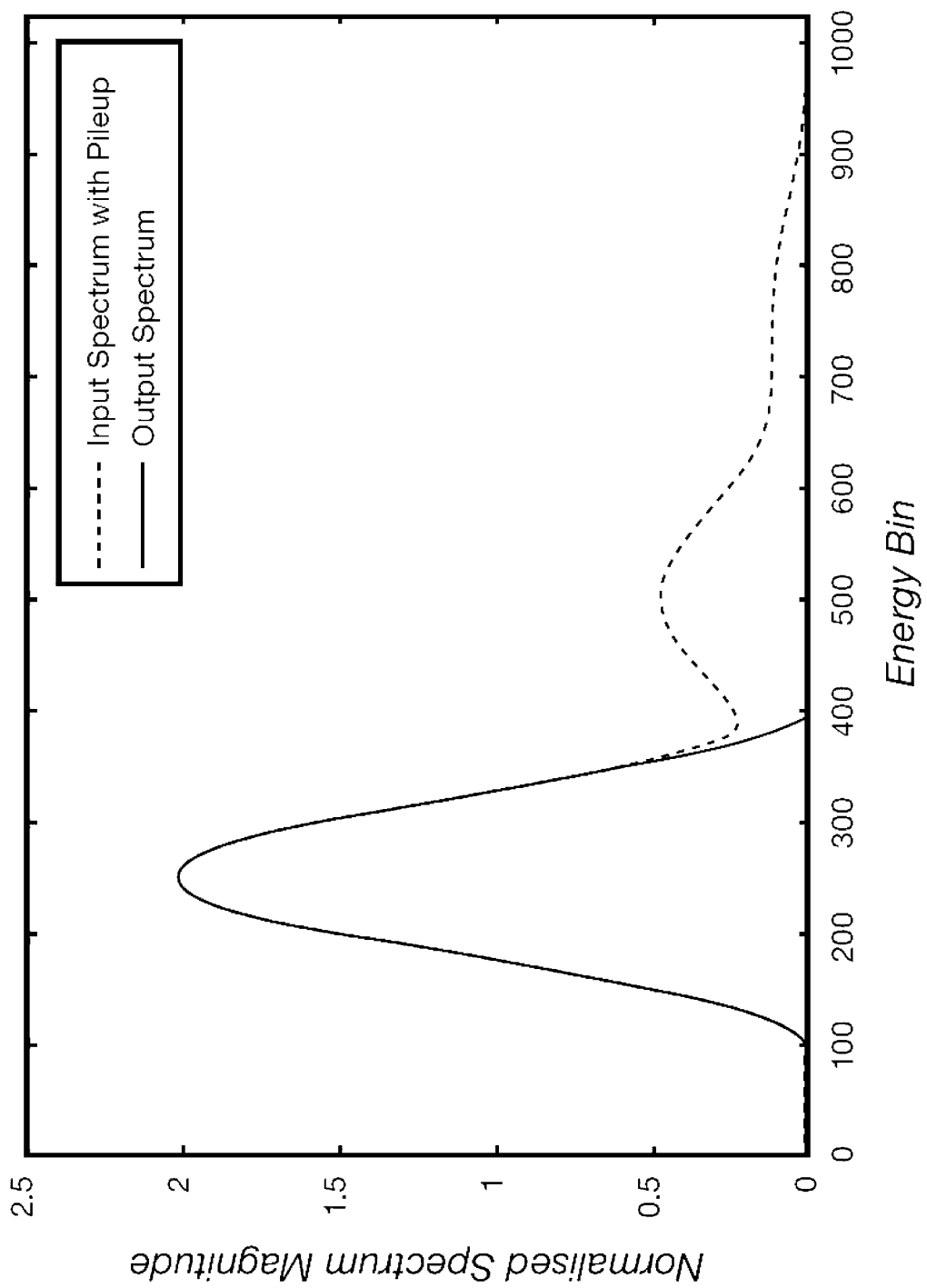
FIG. 12 is a graph illustrating the removal of pileup of two and three pulses from a spectrum according to another embodiment.
Figure 13:
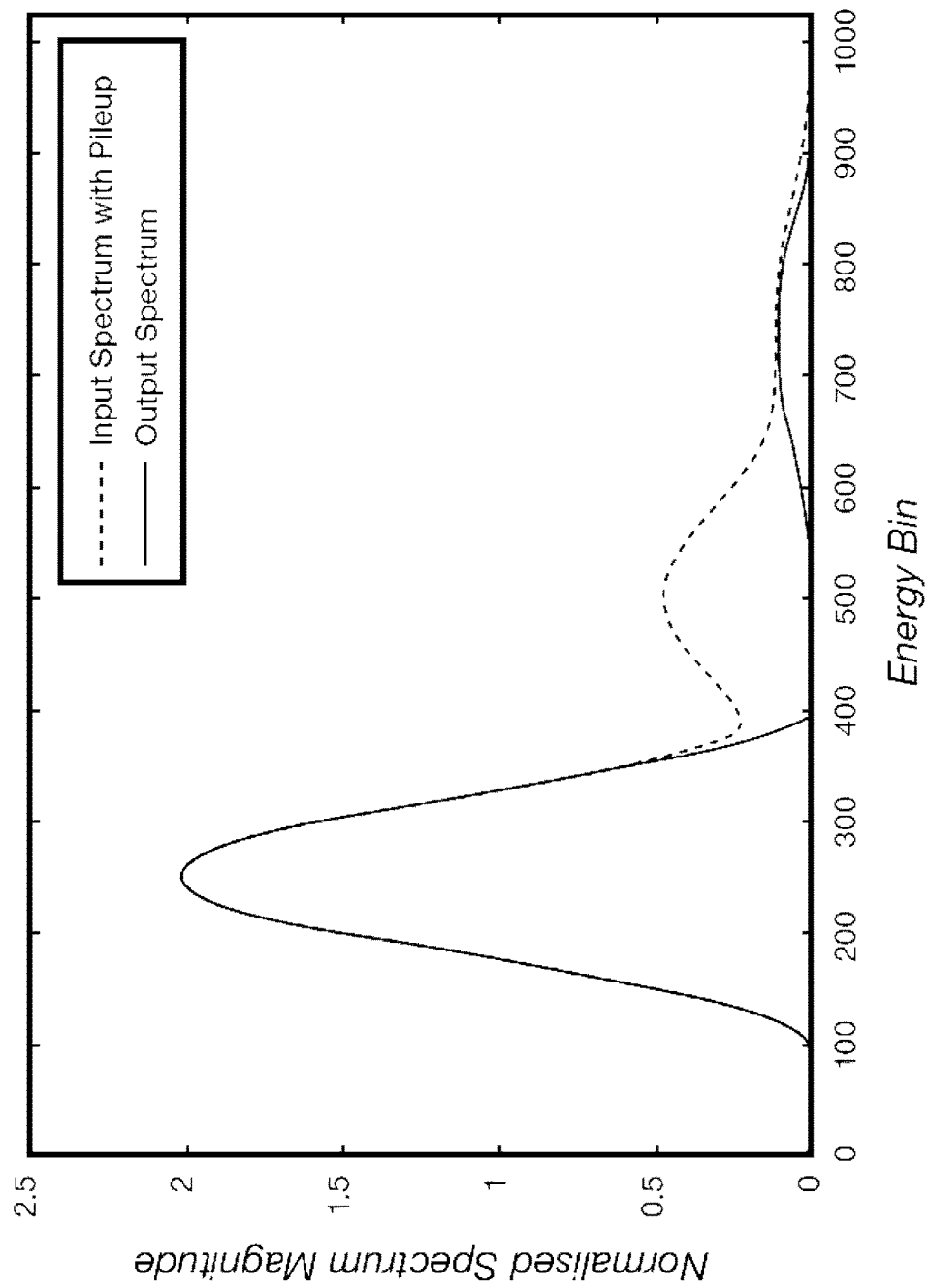
FIG. 13 is a graph illustrating the partial removal of pileup of two and three pulses from a spectrum when assuming only 2 pulse pileup according to an embodiment.

Using the correct pileup coefficients, it is shown in FIG. 11 that the pileup is completely removed. If the same data is processed with the quadratic solver, which assumes only two pulse pileup, it can be seen in FIG. 12 there is still residual pileup in the spectrum at higher energy values, and slight distortion of the spectrum at lower energy.

3. Design of Optimal Spectral Smoothing Window

Smoothing of the energy spectrum is particularly useful in X-ray screening systems where the duration for spectrum measurement may be very short in order to achieve a high spatial resolution in the sample image. It has been found that typical energy spectra produced by a broad energy X-ray scanning system tend to have almost exclusively low frequency components. Initially to reduce communication bandwidth, but also to reduce computational requirement and provide the added benefit of smoothing the spectrum, the spectrum data are passed through an FFT.

After FFT, the majority of the FFT bins are discarded, as it is only necessary to keep approximately ⅛ of the FFT bins in order to accurately reconstruct the energy spectrum. For example if there are 512 histogram bins computed, only 32 complex FFT bins are retained. The last 32 complex FFT bins are just the complex conjugate of these bins, and the remaining 448 bins contain (almost) no information.

The effect of discarding these FFT bins is to:
1. Provide noise rejection.
2. Filter the reconstructed spectrum (after iFFT)

However, if a rectangular FFT window is applied, after iFFT the measured spectrum is substantially convolved with a sinc function. This is not desirable due to the long extent of the sinc function, and large ringing.

To improve the FFT window function design, the following approach was adopted:
1. Specify the desired "time domain" window. In this example, a raised cosine pulse is used.
2. Take the FFT of the desired window (made symmetric about 0 to give only real FFT output).
3. Multiply this result by the existing rectangular window only.
4. Further multiply the result by a window that has a slight tapering on the edge to further reduce ringing resulting from multiplying by a rectangular window.

Figure 14:
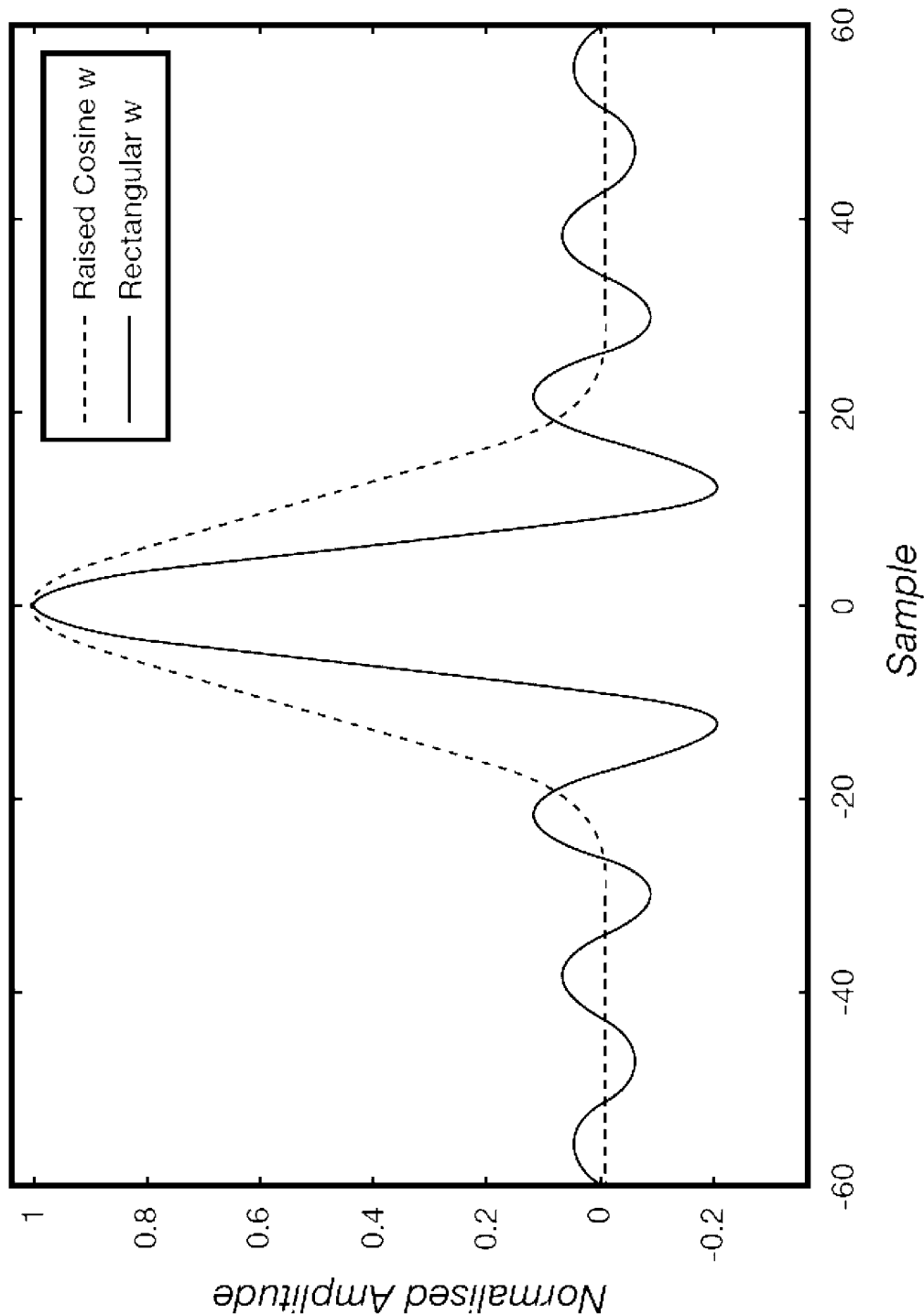
FIG. 14 is a graph illustrating the shape of the spectral smoothing filter when using a rectangular window or a raised cosine pulse window according to an embodiment.

FIG. 14 illustrates the result achieved. The rectangular window if used on its own, results in the measured spectrum being convolved with a sinc function, with width at the mid amplitude of approx 10 samples, but significant oscillations—around 22% at the first negative going peak. By careful definition of user window w it is possible to achieve a "time" domain response that is approximately raised cosine in nature, with very little oscillatory nature—around 0.2%. However, the width at mid amplitude increases to around 20 samples.

While the FFT and data truncation were used to reduce communication and computational burden, the additional benefit of an appropriately designed window function is that the received energy spectra are smoothed before processing, resulting in a significant reduction in noise in the effective Z estimates, and the potential for using less bins in the effective Z estimate while achieving a similar result.

4. Pulse Parameter Calibration

The following is a suitable method for the calibration of the received pulse parameters $\alpha$ and $\beta$ for pulses of the form:

$$p(t)=\int_{t-T_a}^{t} A[\exp(-\alpha(\tau-t_0))-\exp(-\beta(\tau-t_0))]d\tau \quad\text{(Equation 53)}$$

where $\alpha$ and $\beta$ are the falling edge and rising edge time constants respectively, $t_0$ is the pulse time of arrival, $T_a$ is the pulse averaging window, and A is a pulse scaling factor related to the pulse energy.

The pulse parameters may be estimated from a time series capture of the digitised detector signal as follows:
1. Obtain a number of samples of the digitised detector signal, obtained during a period with X-rays on, and overall pulse rate is low enough that isolated pulses can be extracted. Depending on the pulse parameters, with fast pulses it may be adequate to use approx 500 k samples at 100 MHz sample rate, and at a count rate of up to 500 k pulses per second.
2. Extract a block of samples of length (nump0×sampleRate/nominalCountRate). For nump0=40, sample Rate 100 MS/s, nominal count rate 100 kcs, this is 40,000 samples.
3. Calculate the noise threshold nthr
   a. Histogram the data block—the histogram bins are integers in the range of the sampled data +/−2^13 for 14 bit signed data.
   b. Find the bin with the highest value. This is the estimated noise mean.
   c. Find the bin where the level falls to 0.63 of the peak. The difference from the peak is the estimated noise std deviation (sigma)
   d. Set the noise threshold at 2 sigma from the mean. nthr=noiseMean+2×noiseSigma. Factors other than 2 may also be used, depending on the application.
4. Calculate the signal threshold sthr
   a. Filter the data block with the "jump" filter of the form [−1−1 −1 0 1 1 1]
   b. Set the detection threshold at nthr, and increment in steps of 4×noise Sigma.
   c. Threshold the filtered data, and determine the number of runs where the data exceeds sthr. A "run" is a continuous sequence of samples that all exceed sthr, terminated on each end by a sample below sthr.
   d. Continue incrementing the detection threshold until at step k nruns(k)−nruns(k−1)>=−1. That is, until the number of runs stops decreasing. (Note: this stopping criteria might produce a pessimistic threshold at higher count rates).
   e. Set sthr to be the current threshold at step k.
5. Estimate the count rate as nruns(k)/(buffer length/sample Rate).
6. Optional step: If the count rate estimate is less than half or more than double the nominal count rate, redo the noise and signal threshold calculation with a data buffer length computed from the count rate estimate to get closer to nump0 detected pulses.

7. Implement the pulse detection state machine. First, detect nump1=50 pulses to estimate the pulse length lenp (initially set lenp to 0). Then detect nump2=600 pulses for full parameter estimation and optimisation. The pulse detection state machined is as follows:
   a. Enter at "seekPulse" state
   b. When a value exceeds sthr, enter "detPulse" state
   c. In "detPulse" state, look for value below sthr. Enter "seekEndPulse" state
   d. In "seekEndPulse" state
      i. If value>sthr, a new detection has occurred before the end of the pulse. Enter "pulsePileUp" state
      ii. If value<nthr and pulseLength>lenp, end of a valid pulse is detected—record pulse start/end/length parameters and re-enter "seekPulse" state
   e. In "pulsePileUp" state, look for value below sthr, then enter "seekEndPileup" state
   f. In "seekEndPileup", change state
      i. If value>sthr, a new detection has occurred before the end of a pileup event, indicating further pileup. Return to "pulsePileUp" state.
      ii. If value<nthr and pulseLength>lenp, the end of the pileup event has been reached. Record the pulse details and mark as pileup so it is not used in calibration. In practice all details about this pulse event could be discarded as it will not be used in calibration.
8. For the first nump1 valid (isolated) pulses, do the following:
   a. Compute time of arrival (t0), rising edge exponent (beta), falling edge exponent (alpha), averaging time (Ta), maximum signal (Smax), time of maximum (tmax), pulse energy (E).
   b. Some pulses may be rejected at this point if it appears there is actually more than one pulse (undetected pileup)—this is indicated by multiple zero crossings in the derivative of the filtered data (zero derivative=local max/min location).
   c. Set the pulse length estimate to 7/median(alpha). This yields an approximate value for the sample at which the pulse will fall to 0.001 of the peak value. A more accurate computation can be obtained using alpha and beta if required, but the 0.001 threshold is somewhat arbitrary in any case, and in the tail the pulse is slowly converging to zero.
9. Return to step 8 and obtain nump2 pulses. nump2=600 has been used, but this is somewhat arbitrary and based on how many pulses were actually in the test data Only half of these pulses will eventually be used in the calibration, so nump2 needs to be double the number of pulses that are required (desired) in the calibration process.
10. For each of the nump2 pulses:
    a. Compute time of arrival (t0), rising edge exponent (beta), falling edge exponent (alpha), averaging time (Ta), maximum signal (Smax), time of maximum (tmax), pulse energy (E). Again, some pulses may be rejected if they appear to be undetected pileup.
    b. Sort the pulses into increasing energy sequence.
    c. Compute the upper and lower quartile energy values. Discard pulses in the upper and lower quartiles. This effectively removes outlier energy values from the sample, although in a mixture of pulse energies this may not be the best thing to do. In fact it may be better to sort on alpha, beta, or least squares cost function and discard on this basis. For now the Energy sort seems adequate.
    d. For the remaining pulses, now only half of nump2 (so about 300 if nump2=600)
       i. Compute an estimated pulse shape from the parameters alpha, beta, Ta, t0.
       ii. Normalise the actual received pulse by its energy.
       iii. Compute the cost function=sum of squared errors between the estimated and actual pulses (both are normalised to be nominally unit energy).
       iv. Perform an iterative least squares optimisation to obtain optimal estimates of alpha, beta, Ta, along with final cost function and number of iterations for convergence of the least squares optimiser. Note: An approximate Gauss Newton LS optimiser has been implemented. Instead of full 3×3 Jacobian, a series of 1D Jacobians on each dimension are computed. These are numerical derivatives, so could be subject to substantial error. This means the trajectory is not always in the optimal direction, with greater risk of divergence if the function is not well behaved. It is not recommended to use the function in this form, but if an efficient LS optimiser is not available a more robust implementation could be provided.
11. From the least squares optimised results, set the final values of alpha, beta, Ta. This can be either median or mean values of the optimised parameters. The value of t0 can be set arbitrarily such that either a) t0=0 (and the pulse therefore has some signal for sample k<0) or b) t0=ceil(Ta), in which case the pulse is zero at k=0 and has positive value from k>=1.
12. The pulse form p(t) can be computed directly from the formula and the estimated Ta, $\alpha$ and $\beta$.

5. Method for Baseline Tracking

In order to correctly determine the energy of the pulses, it is desirable to account for DC offset (or signal baseline, used interchangeably) in the signal from the detector. This DC offset can arise from various sources including the bias levels of analog electronics, the analog to digital conversion, and the detector itself. Control theory suggests the DC offset error may be tracked and reduced to zero by generating a feedback signal that is proportional to the integral of the signal—however there is a significant problem in the case of pulse processing. Pulses introduce additional features to the signal that have non-zero mean. This introduces a bias dependent on pulse energy, count rate and pulse shape, which corrupts the feedback signal and prevents standard control loop tracking from successfully removing the DC offset.

To overcome this problem, the detector signal output is digitally processed to remove the pulse shaping effects introduced by analog electronics. When no DC offset is present, this processed signal results in a signal shape that has constant value in the regions between pulse arrivals, and a rapid change in value where pulses arrive. If a residual DC offset is present in the detector signal the processed signal changes linearly with time in the regions between pulse arrivals. An error feedback signal that is proportional to the slope of this signal may be formed by taking the difference between two samples. These samples need not be consecutive, but may be separated by 'N' samples in time. By choosing an appropriate value for a signal with a suitable signal to noise ratio may be found for driving a feedback loop.

In order to reduce the impact of bias introduced by pulse events, the baseline tracking loop is not updated when a pulse has arrived between the two samples used to generate the feedback error signal.

The impact of bias may be further reduced by preventing the baseline tracking loop from updating when a pulse has arrived within a guard region on either side of the samples used to generate the feedback error signal.

It should be noted that due to the biasing caused by pulse arrival, the value of the processed detector signal increases whenever a pulse arrives. This eventually causes the internal registers used to store the value of the signal to overflow. The value of the processed signal is monitored, and when overflow is detected, the baseline tracking loop is prevented from updating until the effects of overflow have passed.

Denoting the processed pulse signal at sample n as x(n), the following steps summarise the procedure for computing the update to the DC offset estimate, denoted DC(n):

1. Compute the difference between signal samples N samples apart
2. Determine if the update is to be applied. Do not apply the DC update if
   a. A pulse arrival is detected at a sample between samples n and n+N.
   b. Transient from a previous detected pulse has not decayed. Transient can be considered to last M samples after a pulse is detected.
   c. The processed signal x(n) is about to reach positive overflow and wrap around to a large negative value. Do not process if x(n) is within a threshold $\Delta$ of positive or negative overflow.
3. If the DC update is to be applied, then compute the DC offset update as $$DC(n)=DC(n-1)+k[x(n)-x(n-N)] \quad \text{(Equation 54)}$$

where k≪1 is the update gain, and is chosen to achieve the desired balance between fast response and noise on the DC estimate.

Finally, the same hardware can be used for tracking multiple baseline offsets in multiple channels in a time division multiplexed scheme. The values for the tracking loop variables for each channel are stored/loaded when switching between channels. The baseline tracking loop is prevented from updating until transient effects of the detector channel change has passed.

6. Collimation

Very tight collimation may be used within the scanner in order to minimise the effect of scatter on the measured spectrum. This is particularly important where transitions from high to low or low to high intensity occur. The overall results of the system have shown that scatter has been largely addressed through the inclusion of tight collimation.

7. Reference Calculation

The purpose of the reference calculation is to establish the mean intensity for each detector. This value is used to scale all intensity histograms to unit energy. This is commonly referred to as normalisation. A reference intensity is calculated for each detector. The reference intensity is calculated as the mean intensity over the first N slices in a scan. The intensity is the 1st bin in the FFT or the sum of all complex-valued elements in the FFT vector.

There is also a reference histogram computed in the same way—by averaging the measured energy histograms for the first N slices. The reference histogram is used to normalise all measured histograms to ensure any run to run variations in X-ray flux do not impact the effective Z computation.

The reference is measured during an interval where:
1. X-rays are stabilised, so X-ray flux is not varying and will not vary for the duration of the scan (in practice the Smiths source does vary—especially when failing—and this can impact results)
2. Before the arrival of the sample under test.

The current implementation uses a duration measured in slices. This can cause problems when the slice rate is slowed below 5 ms for example—the reference collection can run into the sample under test. This needs to be corrected in 2 ways to be fully robust:
1. Use the configured slice rate and scanning speed to compute a duration for which the reference is collected, not a set number of slices.
2. Incorporate the object detection signal to ensure reference collection is stopped immediately if a sample is detected before the reference duration completes—the user should be warned when this occurs as performance would not be guaranteed.

More accurate and consistent effective Z may be obtained if a longer reference collection duration was used.

CONCLUSION

Persons skilled in the art will also appreciate that many variations may be made to the invention without departing from the scope of the invention, which is determined from the broadest scope and claims.

For example, while the invention is described with reference to a material characterisation system which forms an image as the material passes through the detector, as discussed above the formation of an image is not an essential element of the broadest aspect. The more detectors which are provided, the more accurate will be the materials characterisation. The number of detectors needs to be determined on the basis of processing speed, cost and accuracy requirements of the application.

Further, while the invention is described with reference to energy resolved photon counting X-ray transmission spectroscopy, as discussed above the broadest aspect of the invention encompasses any materials characterisation detection strategy utilising a source of incident radiation.

Further still, while the above example relates to characterisation of mineral ore, in its broadest aspect the invention relates to characterisation of any material, which may include solid or liquid materials, including resources such as minerals, petroleum, soil, or water; and the material may be located anywhere including underground, on the ground or in the sea. The material may include particulate substance, non-particulate substance, ore, coal, cement, mineral sand, fluid, hydrocarbon fluid, agricultural material, soil, food or beverage, pharmaceuticals, metals, plastics, glass, timber, contaminated material, hazardous material, waste, sewage or effluent.

The phrase "material exploration, identification, extraction or processing activity" includes within its scope any activity relating to recovering, removing, digging, leaching, mining, bore drilling, blasting, gouging, dredging, trenching, quarrying, pulling, sampling, remediating, beneficiating, measuring, classifying, assessing, or analysing, or the like.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention. Further, any method steps recited in the claims are not necessarily intended to be performed temporally in the sequence written, or to be performed without pause once started, unless the context requires it.

The invention claimed is:

1. A material characterization system for characterizing a stream of material emanating from a material identification, exploration, extraction or processing activity, the system comprising:
- a source device for providing incident radiation configured to irradiate the stream of material in an irradiation region;
- one or more detector circuits configured to detect radiation emanating from within or passing through the stream of material as a result of the irradiation by the incident radiation and thereby produce a detection signal;
- one or more digital processors configured to process the detection signal to characterize the stream of material; and
- a pipe configured to act as a conduit for the stream of material and configured to allow the stream of material to pass unimpeded through the system, the pipe being disposed between the source device and the one or more detector circuits,
- wherein the source device for providing incident radiation and the one or more detector circuits are configured to be disposed relative to the stream of material so as to irradiate the stream of material and detect the radiation emanating from within or passing through the stream as the stream passes through the irradiation region,
- wherein the source device and the one or more detector circuits are provided in a housing enclosing a chamber incorporating the irradiation region, the housing having an inlet and an outlet disposed at opposite ends of the chamber, the housing being configured to be installed in the stream of material so that the stream of material enters the housing at the inlet, passes through the chamber, and exits the housing through the outlet,
- wherein the source device comprises X-rays and the one or more digital processors are configured to accumulate at least one detector energy spectrum and perform energy resolved photon counting X-ray transmission spectroscopy analysis,
- wherein the material comprises a subsurface resource and the stream of material comprises rock, chip or powder material,
- wherein the one or more detector circuits comprise one or more scintillation detectors each composed of a scintillation material producing electromagnetic radiation by scintillation from the X-rays and a pulse producing element producing the electrical pulse from the electromagnetic radiation, and
- wherein the pulse producing element comprises a photon-sensitive material and the one or more scintillation detectors are a plurality of scintillation detectors arranged side-by-side in one or more detector arrays of individual scintillator elements of the scintillation material each covered with reflective material around sides thereof and disposed adjacent and optically coupled to a photon-sensitive material.

2. The material characterization system of claim 1, wherein the stream of material emanates from an outlet of a drilling rig.

3. The material characterization system of claim 1, wherein the stream is substantially falling under gravity at the irradiation region.

4. The material characterization system of claim 3, wherein the system is installed on a truck, and the stream falls under gravity into the inlet, through the chamber and exits through the outlet.

5. The material characterization system of claim 3, wherein the stream is produced manually by shoveling of a sample through the inlet.

6. The materials characterization system of claim 1, wherein the individual scintillator elements of one or more of the detector arrays present a cross-sectional area to the emitted radiation of greater than 2 square millimeters and less than 5 square millimeters, and the scintillation material is lutetium-yttrium oxyorthosilicate (LYSO).

7. The materials characterization system of claim 1, wherein the one or more digital processors is configured to compute an effective atomic number Z for each of at least some of the one or more detector circuits by:
- determining a predicted energy spectrum for a material with effective atomic number Z having regard to an estimated material thickness deduced from the detector energy spectrum and reference mass attenuation data for effective atomic number Z; and
- comparing the predicted energy spectrum with the detector energy spectrum; or
- determining a predicted energy spectrum for a material with effective atomic number Z having regard to a calibration table formed by measuring one or more materials of known composition; and
- comparing the predicted energy spectrum with the detector energy spectrum.

8. The materials characterization system of claim 7, wherein the one or more digital processors is configured to perform the step of comparing by computing a cost function dependent on a difference between the detector energy spectrum and the predicted energy spectrum for a material with effective atomic number Z.

9. The materials characterization system of claim 1, wherein a gain calibration is performed on each detector individually to provide consistency of energy determination among the detectors and the one or more digital processors is further configured to calculate the detector energy spectrum for each detector taking into account the gain calibration.

10. A method for characterizing a stream of material emanating from a material identification, exploration, extraction or processing activity, the method comprising the steps of:
- irradiating the stream of material in an irradiation region using a source device for providing incident radiation, wherein the source of incident radiation comprises X-rays;
- detecting, using one or more detectors, radiation emanating from within or passing through the stream of material as a result of the irradiation by the incident radiation;
- producing a detection signal;
- processing the detection signal to characterize the stream of material;
- disposing the source device for providing incident radiation and the one or more detectors relative to the stream of material so as to irradiate the stream of material and detect the radiation emanating from within or passing through the stream of material as the stream passes through the irradiation region;
- providing the source of incident radiation and the one or more detectors in a housing enclosing a chamber incorporating the irradiation region, the housing having an inlet and an outlet disposed at opposite ends of the chamber, the housing being configured to be installed in the stream of material so that the stream of material enters the housing at the inlet, passes through the chamber, and exits the housing through the outlet;

accumulating at least one detector energy spectrum and performing energy resolved photon counting X-ray transmission spectroscopy analysis;

performing a gain calibration on each of the one or more detectors individually to provide consistency of energy determination among the one or more detectors; and calculating the detector energy spectrum for each of the one or more detectors taking into account the gain calibration, wherein a pipe is disposed between the source device and the one or more detectors, the pipe configured to act as a conduit for the stream of material and configured to allow the stream of material to pass unimpeded through the system, and wherein the material is a subsurface resource and the stream of material comprises rock, chip or powder material.

11. The method of claim 10, wherein the stream of material emanates from an outlet of a drilling rig.

12. The method of claim 10, wherein the stream is substantially falling under gravity at the irradiation region.

13. A material characterization system for characterizing a stream of material emanating from a material identification, exploration, extraction or processing activity, the system comprising:

means for irradiating the stream of material in an irradiation region;

one or more means for detecting radiation emanating from within or passing through the stream of material as a result of the irradiation by the incident radiation and thereby producing a detection signal;

one or more means for processing the detection signal to characterize the stream of material; and a pipe configured to act as a conduit for the stream of material and configured to allow the stream of material to pass unimpeded through the system, the pipe being disposed between the source device and the one or more detector circuits, wherein the irradiating means and the one or more detecting means are configured to be disposed relative to the stream of material so as to irradiate the stream of material and detect the radiation emanating from within or passing through the stream as the stream passes through the irradiation region, wherein the means for irradiating the stream of material and the one or more means for detecting radiation are provided in a housing enclosing a chamber incorporating the irradiation region, the housing having an inlet and an outlet disposed at opposite ends of the chamber, the housing being adapted to be installed in the stream of material so that the stream of material enters the housing at the inlet, passes through the chamber, and exits the housing through the outlet, wherein the source of incident radiation comprises X-rays and the one or more means for processing the detection signal are configured to accumulate at least one detector energy spectrum and perform energy resolved photon counting X-ray transmission spectroscopy analysis, wherein the material is a subsurface resource and the stream of material comprises rock, chip or powder material, wherein a gain calibration is performed on each of the one or more means for detecting radiation individually to provide consistency of energy determination among the one or more means for detecting radiation, and wherein the one or more means for processing are further configured to calculate the detector energy spectrum for each of the one or more means for detecting radiation taking into account the gain calibration.

\* \* \* \* \*